(12) United States Patent
Ergun et al.

(10) Patent No.: US 9,743,757 B2
(45) Date of Patent: Aug. 29, 2017

(54) EDGE MOUNT POSITIONING APPARATUS, SYSTEM, AND METHOD

(71) Applicant: Ergotron, Inc., St. Paul, MN (US)

(72) Inventors: Mustafa A. Ergun, Plymouth, MN (US); John Cain, St. Cloud, MN (US); Peter Segar, Burnsville, MN (US); Shaun C. Lindblad, Lino Lakes, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 14/685,201

(22) Filed: Apr. 13, 2015

(65) Prior Publication Data

US 2015/0208799 A1    Jul. 30, 2015

Related U.S. Application Data

(63) Continuation of application No. 13/294,399, filed on Nov. 11, 2011, now Pat. No. 9,188,275.
(Continued)

(51) Int. Cl.
*A47B 21/02* (2006.01)
*A47B 21/04* (2006.01)
(Continued)

(52) U.S. Cl.
CPC ............... *A47B 21/04* (2013.01); *A47B 9/18* (2013.01); *A47B 17/033* (2013.01);
(Continued)

(58) Field of Classification Search
CPC . A47B 21/0073; A47B 21/0314; A47B 21/02; A47B 17/033; A47B 9/18; A47B 2009/185
(Continued)

(56) References Cited

U.S. PATENT DOCUMENTS

| 39,602 A | 8/1863 | Whipple |
| 151,083 A | 5/1874 | Buck |

(Continued)

FOREIGN PATENT DOCUMENTS

| AU | 2011282862 B2 | 10/2014 |
| CN | 1713839 A | 12/2005 |

(Continued)

OTHER PUBLICATIONS

"U.S. Appl. No. 14/635,353, Non Final Office Action dated Jun. 17, 2016", 16 pgs.
(Continued)

*Primary Examiner* — Eret McNichols
(74) *Attorney, Agent, or Firm* — Schwegman Lundberg & Woessner, P.A.

(57) ABSTRACT

Embodiments include an apparatus for positioning items such as an electronic display, a keyboard, and/or a work surface. The apparatus can be attached proximate an edge of a generally planar support member to provide a multi-position workstation. In some cases the apparatus includes a display mount coupled to a support column and configured to support an electronic display and a keyboard. The support column may be movable with respect to support member between a sitting position and a standing position. Methods for positioning an electronic display and a keyboard are also included.

17 Claims, 43 Drawing Sheets

Related U.S. Application Data

(60) Provisional application No. 61/412,456, filed on Nov. 11, 2010.

(51) Int. Cl.

| | | |
|---|---|---|
| *F16M 11/04* | (2006.01) | |
| *A47B 21/007* | (2006.01) | |
| *A47B 9/18* | (2006.01) | |
| *A47B 17/03* | (2006.01) | |
| *A47B 21/03* | (2006.01) | |
| *A47B 97/06* | (2006.01) | |
| *F16M 11/10* | (2006.01) | |
| *F16M 11/24* | (2006.01) | |
| *F16M 13/02* | (2006.01) | |
| *F16M 11/18* | (2006.01) | |
| *A47B 23/04* | (2006.01) | |
| *A47B 9/10* | (2006.01) | |
| *A47B 9/12* | (2006.01) | |
| *F16B 12/20* | (2006.01) | |

(52) U.S. Cl.
CPC .......... *A47B 21/0073* (2013.01); *A47B 21/02* (2013.01); *A47B 21/0314* (2013.01); *A47B 97/06* (2013.01); *F16M 11/04* (2013.01); *F16M 11/046* (2013.01); *F16M 11/10* (2013.01); *F16M 11/105* (2013.01); *F16M 11/18* (2013.01); *F16M 11/24* (2013.01); *F16M 13/02* (2013.01); *F16M 13/022* (2013.01); *A47B 9/10* (2013.01); *A47B 9/12* (2013.01); *A47B 23/04* (2013.01); *A47B 2009/185* (2013.01); *A47B 2021/0321* (2013.01); *A47B 2023/049* (2013.01); *A47B 2200/0076* (2013.01); *F16B 12/2009* (2013.01); *F16M 2200/041* (2013.01); *F16M 2200/048* (2013.01); *F16M 2200/065* (2013.01); *F16M 2200/068* (2013.01); *Y10T 29/49826* (2015.01)

(58) Field of Classification Search
USPC .................. 248/919, 123.11, 295.11
See application file for complete search history.

(56) References Cited

U.S. PATENT DOCUMENTS

| | | | |
|---|---|---|---|
| 2,168,209 A | 8/1939 | Haupt et al. | |
| 2,713,530 A | 7/1955 | Chisholm | |
| 2,876,362 A | 3/1959 | Foderaro | |
| 3,140,559 A * | 7/1964 | Grow ..................... | A47B 27/06 108/10 |
| 3,517,625 A | 6/1970 | Swett et al. | |
| 3,575,368 A | 4/1971 | Thomas et al. | |
| 3,741,131 A | 6/1973 | Leadbetter | |
| 3,896,744 A | 7/1975 | Goebl | |
| 4,496,200 A | 1/1985 | Hagstrom et al. | |
| 4,533,096 A | 8/1985 | Baker et al. | |
| 4,612,863 A * | 9/1986 | Vonhausen ............. | A47B 21/03 108/28 |
| 4,844,387 A | 7/1989 | Sorgi et al. | |
| 4,852,500 A | 8/1989 | Ryburg et al. | |
| 5,114,109 A | 5/1992 | Fitz et al. | |
| 5,174,223 A | 12/1992 | Nagy et al. | |
| 5,271,320 A * | 12/1993 | Reneau .................... | A47B 9/04 100/147 |
| 5,277,392 A | 1/1994 | Rossman et al. | |
| 5,381,738 A | 1/1995 | Meyer et al. | |
| 5,400,721 A | 3/1995 | Greene | |
| 5,484,124 A | 1/1996 | Billings et al. | |
| 5,537,289 A | 7/1996 | Dahl et al. | |
| 5,568,773 A | 10/1996 | Hung | |
| 5,630,566 A | 5/1997 | Case | |
| 5,735,222 A | 4/1998 | Webb et al. | |
| 5,765,797 A | 6/1998 | Greene et al. | |
| 5,779,209 A * | 7/1998 | Rello ..................... | F16M 11/10 248/278.1 |
| 5,799,917 A | 9/1998 | Li et al. | |
| 5,911,178 A | 6/1999 | Alexander | |
| 5,918,841 A | 7/1999 | Sweere et al. | |
| 5,967,631 A | 10/1999 | Ko | |
| 5,975,469 A | 11/1999 | Chen | |
| 6,042,064 A | 3/2000 | Hong | |
| 6,042,075 A | 3/2000 | Burch, Jr. | |
| 6,076,785 A * | 6/2000 | Oddsen, Jr. ......... | A47B 21/0314 248/118.3 |
| 6,085,665 A | 7/2000 | Smith et al. | |
| 6,196,354 B1 | 3/2001 | Anthony et al. | |
| 6,208,505 B1 | 3/2001 | Kuchta et al. | |
| 6,286,794 B1 * | 9/2001 | Harbin .................. | A47B 21/02 248/123.2 |
| 6,332,407 B1 | 12/2001 | Vardaro | |
| 6,374,752 B1 | 4/2002 | Walser | |
| 6,434,851 B1 | 8/2002 | Nishina | |
| 6,517,040 B1 | 2/2003 | Wen et al. | |
| 6,527,235 B1 | 3/2003 | Cotterill | |
| 6,536,728 B1 | 3/2003 | Hagglund et al. | |
| 6,637,350 B2 | 10/2003 | Mcksymick | |
| 6,712,008 B1 | 3/2004 | Habenicht et al. | |
| 6,783,105 B2 | 8/2004 | Oddsen, Jr. | |
| 6,913,332 B1 * | 7/2005 | Besterfield ......... | A47B 21/0073 108/50.01 |
| 6,994,306 B1 | 2/2006 | Sweere et al. | |
| 6,997,422 B2 | 2/2006 | Sweere et al. | |
| 7,032,523 B2 | 4/2006 | Forslund, III et al. | |
| 7,178,469 B2 | 2/2007 | Goza | |
| 7,252,277 B2 | 8/2007 | Sweere et al. | |
| 7,392,969 B2 | 7/2008 | Chiu et al. | |
| 7,448,800 B2 | 11/2008 | Steger | |
| 7,506,853 B2 | 3/2009 | Sweere et al. | |
| 7,546,811 B2 | 6/2009 | Owen et al. | |
| 7,597,299 B2 | 10/2009 | Papendieck et al. | |
| 7,621,500 B2 | 11/2009 | Ishizaki et al. | |
| 7,646,425 B2 | 1/2010 | Bohaker et al. | |
| 7,677,518 B2 | 3/2010 | Chouinard et al. | |
| 7,694,920 B2 | 4/2010 | Lien et al. | |
| 7,748,666 B2 * | 7/2010 | Oddsen, Jr. ............ | F16M 11/10 248/123.11 |
| 7,780,125 B2 | 8/2010 | Yen et al. | |
| D624,083 S | 9/2010 | Scheper et al. | |
| 7,823,973 B2 | 11/2010 | Dragusin et al. | |
| 7,854,417 B2 * | 12/2010 | Gan ..................... | F16M 11/24 248/122.1 |
| 7,922,132 B2 | 4/2011 | Saez et al. | |
| 7,997,211 B2 | 8/2011 | Peterson | |
| 8,051,782 B2 | 11/2011 | Nethken et al. | |
| 8,191,487 B2 | 6/2012 | Theesfeld et al. | |
| 8,201,782 B2 | 6/2012 | Fan | |
| 8,359,982 B2 * | 1/2013 | Lebel ..................... | A47B 3/00 108/44 |
| 8,695,510 B2 * | 4/2014 | Johnson ............. | A47B 21/0073 108/50.02 |
| 8,826,831 B2 | 9/2014 | Hazzard et al. | |
| 8,839,723 B2 | 9/2014 | Hazzard et al. | |
| 8,967,560 B2 | 3/2015 | Ergun et al. | |
| 8,985,032 B1 * | 3/2015 | Johnson .................. | A47B 21/02 108/106 |
| 9,046,213 B2 * | 6/2015 | Huang .................. | F16M 11/046 |
| 9,080,721 B2 | 7/2015 | Hazzard | |
| 9,188,275 B2 | 11/2015 | Ergun et al. | |
| 9,266,243 B2 * | 2/2016 | Swartz ..................... | B25J 18/00 |
| 9,470,357 B2 | 10/2016 | Hazzard et al. | |
| 2004/0188573 A1 | 9/2004 | Weatherly et al. | |
| 2004/0194669 A1 | 10/2004 | Forslund, III et al. | |
| 2004/0250635 A1 | 12/2004 | Sweere et al. | |
| 2005/0022699 A1 | 2/2005 | Goza | |
| 2005/0045788 A1 | 3/2005 | Mongeau | |
| 2005/0184215 A1 | 8/2005 | Lin | |
| 2005/0217540 A1 | 10/2005 | Novak | |
| 2006/0096505 A1 | 5/2006 | Sykes | |
| 2006/0130714 A1 | 6/2006 | Jones et al. | |

(56) References Cited

U.S. PATENT DOCUMENTS

| | | |
|---|---|---|
| 2006/0145036 A1 | 7/2006 | Jones et al. |
| 2006/0185563 A1 | 8/2006 | Sweere et al. |
| 2006/0278770 A1 | 12/2006 | Macleod |
| 2007/0001076 A1 | 1/2007 | Asamarai et al. |
| 2007/0102600 A1 | 5/2007 | Ishizaki et al. |
| 2007/0139870 A1 | 6/2007 | Lin |
| 2007/0145203 A1 | 6/2007 | Takada |
| 2007/0259554 A1 | 11/2007 | Lindblad |
| 2007/0295679 A1 | 12/2007 | Lu |
| 2008/0026892 A1 | 1/2008 | Asamarai et al. |
| 2008/0173774 A1 | 7/2008 | Saez et al. |
| 2008/0232059 A1 | 9/2008 | Allen et al. |
| 2009/0173847 A1 | 7/2009 | Dittmer et al. |
| 2009/0179121 A1 | 7/2009 | Lindblad et al. |
| 2010/0132122 A1 | 6/2010 | Hollingshead |
| 2010/0148647 A1 | 6/2010 | Burgess et al. |
| 2010/0327129 A1 | 12/2010 | Chen |
| 2012/0119040 A1 | 5/2012 | Ergun et al. |
| 2012/0187056 A1 | 7/2012 | Hazzard et al. |
| 2012/0187256 A1 | 7/2012 | Ergun et al. |
| 2013/0341476 A1 | 12/2013 | Hazzard et al. |
| 2014/0137773 A1 | 5/2014 | Mandel et al. |
| 2014/0332653 A1 | 11/2014 | Hazzard et al. |
| 2015/0198280 A1 | 7/2015 | Ergun et al. |
| 2015/0320202 A1 | 11/2015 | Hazzard et al. |
| 2016/0309890 A1 | 10/2016 | Hazzard et al. |
| 2017/0112276 A1 | 4/2017 | Hazzard et al. |

FOREIGN PATENT DOCUMENTS

| | | | |
|---|---|---|---|
| CN | 101433403 A | 5/2009 | |
| CN | 201308251 Y | 9/2009 | |
| CN | 103068279 A | 4/2013 | |
| CN | 103080626 A | 5/2013 | |
| DE | 1091279 B | 10/1960 | |
| DE | 1611809 A1 | 1/1971 | |
| DE | 3610612 A1 | 10/1987 | |
| DE | 19539275 A1 | 4/1997 | |
| DE | 19635236 C1 | 3/1998 | |
| DE | 10252931 B3 | 7/2004 | |
| DE | 202009015569 U1 | 3/2010 | |
| EP | 0481159 A1 | 4/1992 | |
| EP | 2597993 A1 | 6/2013 | |
| EP | 2598790 A1 | 6/2013 | |
| JP | 59118776 A | 7/1984 | |
| JP | 6133127 U | 2/1986 | |
| JP | 61033127 U | 2/1986 | |
| JP | 62-115265 U | 7/1987 | |
| JP | 62-195820 U | 12/1987 | |
| JP | 05-265620 A | 10/1993 | |
| JP | 0614466 A | 1/1994 | |
| JP | 06181896 A | 7/1994 | |
| JP | 2000-047599 A | 2/2000 | |
| JP | 2000-105539 A | 4/2000 | |
| JP | 2000-267579 A | 9/2000 | |
| JP | 2000-338891 A | 12/2000 | |
| JP | 2002-258984 A | 9/2002 | |
| JP | 2003515193 A | 4/2003 | |
| JP | 2004-271595 A | 9/2004 | |
| JP | EP 1364596 A4 * | 8/2005 | ............ A47B 11/00 |
| JP | 2006-223364 A | 8/2006 | |
| JP | 2007-042063 A | 2/2007 | |
| JP | 2007-272605 A | 10/2007 | |
| JP | 2010-019893 A | 1/2010 | |
| JP | 2013534341 A | 9/2013 | |
| JP | 2013535287 A | 9/2013 | |
| JP | 2004-033415 A | 2/2014 | |
| WO | WO-0137070 A2 | 5/2001 | |
| WO | WO-03/000091 A2 | 1/2003 | |
| WO | WO-2007/130611 A2 | 11/2007 | |
| WO | WO-2010/004674 A1 | 1/2010 | |
| WO | WO-2012/015821 A1 | 2/2012 | |
| WO | WO 2016094731 A1 * | 6/2016 | ............ A47B 21/02 |

OTHER PUBLICATIONS

"U.S. Appl. No. 14/635,353, Preliminary Amendment dated Mar. 2, 2015", 3 pgs.

"U.S. Appl. No. 14/635,353, Response filed May 31, 2016 to Restriction Requirement dated May 3, 2016", 8 pgs.

"U.S. Appl. No. 14/635,353, Restriction Requirement dated May 3, 2016", 6 pgs.

"U.S. Appl. No. 14/795,627, Notice of Allowance dated Mar. 9, 2016", 5 pgs.

"U.S. Appl. No. 14/795,627, Response filed Feb. 18, 2016 to Final Office Action dated Dec. 31, 2015", 7 pgs.

"Chinese Application Serial No. 201180037431.X, Office Action dated Mar. 3, 2016".

"Chinese Application Serial No. 201180037431.X, Response filed Mar. 7, 2016 to Telephone Objections", (w/ English Translation), 6 pgs.

"Ergotron(r) 200 Series, Combination flat panel/keyboard arm", (c) 2005 Ergotron, Inc. [online]. [archived on Jul. 14, 2006]. Retrieved from the Internet: <URL: https://web.archive.org/web/20060714055438/http://www.ergotron.com/Portals/0/literature/productSheets/english/05-044.pdf>, (2005), 2 pgs.

"Ergotron(r) HD Series Arms, Height Adjustable Systems", (c) 2005 Ergotron, Inc. [online]. [archived on Jun. 18, 2006}. Retrieved from the Internet: <URL: https://web.archive.org/web/20060618051855/http://ergotron.com/Portals/0/literature/productSheets/english/05-046.pdf>, (2005), 2 pgs.

"Ergotron(r) Neo-Flex Lift Stands", (c) 2008 Ergotron, Inc. [online]. [archived on Oct. 8, 2008]. Retrieved from the Internet: <URL: https://web.archive.org/web/20081008180046/http://www.ergotron.com/Portals/0/literatire/productsheets/english/05-074-EA.pdf>, (2008), 2 pgs.

"Ergotron(r) Neo-Flextm, Neo-Flex Combo Lift Stand: 33-331-057", Dimensional & Range of Motion Illustrations, (c) 2008 Ergotron, Inc. [online]. Retrieved from the Internet: <URL: https://web.archive.org/web/20081119142557/http://www.ergotron.com/Portals/0/literature/dimensionIllustrations/DIM-074-A.pdf>, (2008), 1 pg.

"IOP Flat Panel Monitor Arm Model No. 9140", (c) 2003 Innovative Office Products, Inc. [online]. [archived on Aug. 3, 2004]. Retrieved from the Internet: <URL: https://web.archive.org/web/20040803232955/http://www.lcdarms.com/pdf/9140.pdf>, (2003), 2 pgs.

"U.S. Appl. No. 13/191,170, Notice of Allowance dated Jul. 17, 2013", 8 pgs.

"U.S. Appl. No. 13/191,170, Response filed Jun. 27, 2013 to Non Final Office Action dated Feb. 1, 2013", 20 pgs.

"U.S. Appl. No. 13/191,170, Response filed Dec. 18, 2013 to Non Final Office Action dated Sep. 17, 2013", 16 pgs.

"U.S. Appl. No. 13/191,182, Response filed Sep. 3, 2014 to Advisory Action dated Jul. 16, 2014", 17 pgs.

"U.S. Appl. No. 13/294,399, Notice of Allowance dated Jul. 10, 2015", 12 pgs.

"U.S. Appl. No. 13/964,870, Response filed Apr. 11, 2014 to Final Office Action dated Feb. 25, 2014", 6 pgs.

"U.S. Appl. No. 14/340,074, Final Office Action dated Mar. 3, 2015", 7 pgs.

"U.S. Appl. No. 14/340,074, Notice of Allowance dated May 15, 2015", 5 pgs.

"U.S. Appl. No. 14/340,074, Response filed Apr. 22, 2015 to Final Office Action dated Mar. 3, 2015", 10 pgs.

"U.S. Appl. No. 14/635,353, Preliminary Amendment filed Mar. 30, 2015", 7 pgs.

"Australian Application Serial No. 2011282863 Response filed Jun. 30, 2015 to Office Action dated Feb. 24, 2015", 16 pgs.

"Chinese Application Serial No. 201180037431.X Response filed May 19, 2015 to Office Action dated Mar. 4, 2015", (w/ English Translation of Claims), 30 pgs.

"Chinese Application Serial No. 201180037431.X, Office Action dated Mar. 4, 2015", 16 pgs.

"Chinese Application Serial No. 201180037431.X, Response filed Nov. 12, 2014 to Office Action dated Jun. 27, 2014", (w/ English Translation of Claims), 19 pgs.

(56) References Cited

OTHER PUBLICATIONS

"Ergotron Neo-Fiex LCD Arm Product Sheet", (Dec. 7, 2006), 2 pgs.
"European Application Serial No. 11813049.1, Office Action dated Aug. 7, 2014", 1 pg.
"European Application Serial No. 11813049.1, Response filed Feb. 10, 2015 to Office Action dated Aug. 7, 2014", 11 pgs.
"Japanese Application Serial No. 2013-523197, Argument and Amendment filed Feb. 20, 2015 in response to Office Action dated Oct. 7, 2014", (w/ English Translation of Amendment), 20 pgs.
"U.S. Appl. No. 13/191,170, Examiner Interview Summary dated Jun. 10, 2013", 3 pgs.
"U.S. Appl. No. 13/191,170, Examiner Interview Summary dated Oct. 24, 2013", 2 pgs.
"U.S. Appl. No. 13/191,170, Non Final Office Action dated Feb. 1, 2013", 9 pgs.
"U.S. Appl. No. 13/191,170, Non Final Office Action dated May 1, 2014", 6 pgs.
"U.S. Appl. No. 13/191,170, Non Final Office Action dated May 29, 2014", 5 pgs.
"U.S. Appl. No. 13/191,170, Non Final Office Action dated Sep. 17, 2013", 7 pgs.
"U.S. Appl. No. 13/191,170, Notice of Allowance dated Jan. 30, 2014", 7 pgs.
"U.S. Appl. No. 13/191,170, Notice of Allowance dated Aug. 1, 2014", 5 pgs.
"U.S. Appl. No. 13/191,170, Response filed Jan. 9, 2013 to Restriction Requirement dated Dec. 14, 2012", 2 pgs.
"U.S. Appl. No. 13/191,170, Response filed May 19, 2014 to Non Final Office Action dated May 1, 2014", 10 pgs.
"U.S. Appl. No. 13/191,170, Response filed Jul. 17, 2014 to Non Final Office Action dated May 29, 2014", 9 pgs.
"U.S. Appl. No. 13/191,170, Restriction Requirement dated Dec. 14, 2012", 7 pgs.
"U.S. Appl. No. 13/191,182, Advisory Action dated Jul. 16, 2014", 3 pgs.
"U.S. Appl. No. 13/191,182, Final Office Action dated Apr. 9, 2014", 23 pgs.
"U.S. Appl. No. 13/191,182, Non Final Office Action dated Jun. 21, 2013", 24 pgs.
"U.S. Appl. No. 13/191,182, Notice of Allowance dated Nov. 11, 2014", 10 pgs.
"U.S. Appl. No. 13/191,182, PTO Response to Rule 312 Communication dated Jan. 20, 2015", 2 pgs.
"U.S. Appl. No. 13/191,182, Response filed Jun. 9, 2014 to Final Office Action dated Apr. 9, 2014", 16 pgs.
"U.S. Appl. No. 13/191,182, Response filed Dec. 19, 2013 to Non Final Office Action dated Jun. 21, 2013", 14 pgs.
"U.S. Appl. No. 13/294,399, Advisory Action dated Aug. 8, 2014", 3 pgs.
"U.S. Appl. No. 13/294,399, Examiner Interview Summary dated Jun. 4, 2015", 3 pgs.
"U.S. Appl. No. 13/294,399, Final Office Action dated Apr. 9, 2015", 21 pgs.
"U.S. Appl. No. 13/294,399, Final Office Action dated Jun. 6, 2014", 19 pgs.
"U.S. Appl. No. 13/294,399, Non Final Office Action dated Nov. 6, 2014", 28 pgs.
"U.S. Appl. No. 13/294,399, Non Final Office Action dated Nov. 7, 2013", 19 pgs.
"U.S. Appl. No. 13/294,399, Preliminary Amendment filed Jan. 27, 2012", 2 pgs.
"U.S. Appl. No. 13/294,399, Response filed Jan. 29, 2015 to Non Final Office Action dated Nov. 11, 2014", 20 pgs.
"U.S. Appl. No. 13/294,399, Response filed Feb. 7, 2014 to Non Final Office Action dated Nov. 7, 2013", 18 pgs.
"U.S. Appl. No. 13/294,399, Response filed Jul. 14, 2014 to Final Office Action dated Jun. 6, 2014", 19 pgs.
"U.S. Appl. No. 13/294,399, Response filed Sep. 20, 2013 to Restriction Requirement dated Aug. 9, 2013", 4 pgs.
"U.S. Appl. No. 13/294,399, Response filed May 22, 2015 to Final Office Action dated Apr. 9, 2015", 16 pgs.
"U.S. Appl. No. 13/294,399, Restriction Requirement dated Aug. 9, 2013", 9 pgs.
"U.S. Appl. No. 13/964,870, Final Office Action dated Feb. 25, 2014", 6 pgs.
"U.S. Appl. No. 13/964,870, Non Final Office Action dated Oct. 1, 2013", 9 pgs.
"U.S. Appl. No. 13/964,870, Notice of Allowance dated May 14, 2014", 6 pgs.
"U.S. Appl. No. 13/964,870, Preliminary Amendment filed Aug. 12, 2013", 6 pgs.
"U.S. Appl. No. 13/964,870, PTO Response to Rule 312 Communication dated Aug. 18, 2014", 2 pgs.
"U.S. Appl. No. 13/964,870, Response filed Feb. 3, 2014 to Non Final Office Action dated Oct. 1, 2013", 11 pgs.
"U.S. Appl. No. 14/340,074, Non Final Office Action dated Nov. 28, 2014", 7 pgs.
"U.S. Appl. No. 14/340,074, Response filed Feb. 16, 2015 to Non Final Office Action dated Nov. 28, 2014", 9 pgs.
"Australian Application Serial No. 2011282862, Amendment filed Jul. 23, 2013", 101 pgs.
"Australian Application Serial No. 2011282862, Examiners Report dated Apr. 22, 2014", 3 pgs.
"Australian Application Serial No. 2011282862, Response filed Aug. 8, 2014 to Examiners Report dated Apr. 22, 2014", 197 pgs.
"Australian Application Serial No. 2011282862, Subsequent Examiners Report dated Aug. 11, 2014", 3 pgs.
"Australian Application Serial No. 2011282863, First Examiner Report dated Oct. 16, 2014", 3 pgs.
"Australian Application Serial No. 2011282863, Response filed Jan. 29, 2015 to First Examiner Report dated Oct. 16, 2014", 102 pgs.
"Australian Application Serial No. 2011282863, Subsequent Examiners Report dated Feb. 24, 2015", 3 pgs.
"Chinese Application Serial No. 201180037429.2, Office Action dated May 6, 2015", 3 pgs.
"Chinese Application Serial No. 201180037429.2, Office Action dated Aug. 21, 2014", 17 pgs.
"Chinese Application Serial No. 201180037429.2, Response filed Jan. 4, 2015 to Office Action dated Aug. 21, 2014", (w/ English Translation of Amended Claims), 18 pgs.
"Chinese Application Serial No. 201180037431.X, Office Action dated Jun. 27, 2014", 18 pgs.
"Ergo Desktop, Frequently Asked Questions, Copyright 2009", [online]. Retrieved from the Internet: <http://www.ergodesktop.com/contenl/ frequently-asked-questions>, (Jul. 29, 2010), 3 pgs.
"Ergo Desktop, Product Comparison", [online]. Retrieved from the Internet: <http://www.ergodesktop.com/content/product-comparison>, (Jul. 29, 2010), 3 pgs.
"Ergo Desktop, The Kangaroo Elite, Copyright 2009", [online]. Retrieved from the Internet: <http://www.ergodesktop.com/contenl/kangaroo-elite>, (Jul. 29, 2010), 3 pgs.
"Ergo Desktop, The Kangaroo Pro, Copyright 2009", [online]. Retrieved from the Internet: <http://www.ergodesktop.com/contenl/kangaroo- pro>, (Jul. 29, 2010), 3 pgs.
"Ergo Desktop, The Kangaroo, Copyright 2009", [online]. Retrieved from the Internet: <http:l/www.ergodesktop.com/contenl/kangaroo-O#>, (Jul. 29, 2010), 3 pgs.
"Ergo Desktop, The Wallaby, Copyright 2009", [online] Retrieved from Internet: <http://www.ergodesktop.com/contenl/wallaby>, (Jul. 29, 2010), 3 pgs.
"Ergotron 200 Series, Combination Flat Panel/Keyboard Arm, Product Sheet", (Aug. 2006), 2 pgs.
"Ergotron HD Series Arms, Height Adjustable Systems, Product Sheet", (Sep. 2007), 2 pgs.
"Ergotron LX, LX Wall Mount System, Dimensional Illustrations", (Dec. 2006), 3 pgs.
"Ergotron Notebook Arm Mount Tray", first available at Amazon.com on Jul. 7, 2004, [online]. Retrieved from the Internet: <http://www. amazon.com/Ergotron-Nolebook-Arm-Mount-Tray/dp/BOOOECUMTS>, (Aug. 23, 2013), 6 pgs.
"Ergotron Style View HD Combo, Product Sheet", (Oct. 2009), 2 pgs.

(56) References Cited

OTHER PUBLICATIONS

"Ergotron WorkFit C-Mod", Product Sheet, (Nov. 2009), 2 pgs.
"Ergotron WorkFit LD Assembly Instructions", (May 2009), 15 pgs.
"Ergotron, Dimensional and Range of Motion Illustrations", WorkFit C-Mod, Single LCD Mount, LD, (Aug. 2009), 4 pgs.
"Ergotron, Ergotron 45-216-216 styleView HD Combo System", [online]. Retrieved from the Internet: <http://www.ergotron.com/Products/tabid/65/PRDID/270/language/en-US/Default.aspx>, (Jul. 8, 2010), 3 pgs.
"European Application Serial No. 11813049.1, Extended European Search Report dated Jul. 21, 2014", 7 pgs.
"European Application Serial No. 11813049.1, Office Action dated May 10, 2013", 2 pgs.
"European Application Serial No. 11813049.1, Response filed Nov. 19, 2013 to Office Action dated May 10, 2013", 13 pgs.
"European Application Serial No. 11813050.9, Office Action dated Mar. 8, 2013", 2 pgs.
"European Application Serial No. 11813050.9, Response filed Feb. 13, 2015 to Office Action dated Jul. 22, 2014", 17 pgs.
"European Application Serial No. 11813050.9, Response filed Sep. 11, 2013 to Office Action dated Mar. 8, 2013", 14 pgs.
"European Application Serial No. 11813050.9, Supplementary European Search Report dated Jul. 22, 2014", 7 pgs.
"Furniture element for an office screen", EP481159A1 (Apr. 22, 1992). English-language machine translation. retrieved from Lexis-Nexis Total Patent, [online]. Retrieved from the Internet: <URL: https://www.lexisnexis.com/totalpatent>, (Oct. 8, 2013), 7 pgs.
"Geek Reviews, Ergodesktop's Kangeroo, An Adjustable Stand Up Desk", [online]. [retrieved on Aug. 26, 2010]. Retrieved from the Internet: <URL: http://www.geekculture.com/blurbs/reviews/kangaroo.html>, (2010), 4 pgs.
"Health Postures TaskMate 6100 with adjustable keyboard mechanism 6120", sales order dale Sep. 26, 2008, [online]. Retrieved from the Internet: <https://healthpostures.com/products/executive-computer-taskmate-61 00/ and http://www.ergocanada.com/delailed_specification_pages/health_postures_taskmate_executive.html>, (Aug. 23, 2013), 12 pgs.
"International Application Serial No. PCT/US2011/045369, International Preliminary Report on Patentability dated Feb. 14, 2013", 13 pgs.
"International Application Serial No. PCT/US2011/045369, International Search Report dated Jan. 4, 2012", 2 pgs.
"International Application Serial No. PCT/US2011/045369, Written Opinion dated Jan. 4, 2012", 11 pgs.
"International Application Serial No. PCT/US2011/045370, International Preliminary Report on Patentability dated Feb. 14, 2013", 9 pgs.
"International Application Serial No. PCT/US2011/045370, International Search Report dated Dec. 23, 2011", 2 pgs.
"International Application Serial No. PCT/US2011/045370, Written Opinion dated Dec. 23, 2011",7 pgs.
"Japanese Application Serial No. 2013-523197, Office Action dated Oct. 7, 2014", (w/ English Translation), 10 pgs.
"Japanese Application Serial No. 2013-523198 Response filed May 11, 2015 to Office Action dated Nov. 11, 2014", (w/ English Translation of Claims), 17 pgs.
"Japanese Application Serial No. 2013-523198, Response filed Oct. 15, 2014 to Office Action dated Jul. 15, 2014", (w/ English Translation of Claims), 18 pgs.
"Japanese Application Serial No. 2013-523198, Office Action dated Jul. 15, 2014", With English Translation, 13 pgs.
"Japanese Application Serial No. 2013-523198, Office Action dated Nov. 11, 2014", (w/ English Translation), 13 pgs.
"Neo-Flex LCD Arm", Ergotron, Product Sheet, (Dec. 7, 2006), 2 pgs.
"U.S. Appl. No. 13/294,399, Notice of Allowance dated Aug. 18, 2015", 8 pgs.
"U.S. Appl. No. 13/294,399, Supplemental Notice of Allowability dated Sep. 21, 2015", 4 pgs.
"U.S. Appl. No. 14/795,627, Non Final Office Action dated Sep. 9, 2015", 9 pgs.
"U.S. Appl. No. 14/795,627, Preliminary Amendment filed Jul. 28, 2015", 5 pgs.
"Chinese Application Serial No. 201180037429.2 Response filed Jul. 7, 2015 to Office Action dated May 6, 2015", (w/ English Translation of Claims), 9 pgs.
"Chinese Application Serial No. 201180037431.X, Office Action dated Sep. 9, 2015", (w/ English Translation), 39 pgs.
"U.S. Appl. No. 14/635,353, Examiner Interview Summary dated Nov. 4, 2016", 3 pgs.
"U.S. Appl. No. 14/635,353, Notice of Allowance dated Oct. 4, 2016", 9 pgs.
"U.S. Appl. No. 14/635,353, Response filed Sep. 2, 2016 to Non Final Office Action dated Jun. 17, 2016", 10 pgs.
"U.S. Appl. No. 14/795,627, Notice of Allowability dated Aug. 4, 2016", 2 pgs.
"U.S. Appl. No. 14/795,627, Notice of Allowance dated Jul. 20, 2016", 5 pgs.
"U.S. Appl. No. 15/135,156, Non Final Office Action dated Sep. 21, 2016", 8 pgs.
"Australian Application Serial No. 2015227496, First Examiner Report dated Aug. 3, 2016", 4 pgs.
"Canadian Application Serial No. 2,805,385, Office Action dated Aug. 15, 2016", 4 pgs.
"Chinese Application Serial No. 201510870758.5, Voluntary Amendment filed Jun. 17, 2016", (w/ English Translation of Claims), 19 pgs.
"U.S. Appl. No. 14/635,353, PTO Response to Rule 312 Communication dated Jan. 10, 2017", 2 pgs.
"U.S. Appl. No. 15/135,156, Final Office Action dated Mar. 2, 2017", 6 pgs.
"U.S. Appl. No. 15/135,156, Notice of Allowability dated Jun. 2, 2017", 2 pgs.
"U.S. Appl. No. 15/135,156, Notice of Allowance dated May 8, 2017", 5 pgs.
"U.S. Appl. No. 15/135,156, Response filed Jan. 19, 2017 to Non Final Office Action dated Sep. 21, 2016", 9 pgs.
"U.S. Appl. No. 15/135,156, Response filed Apr. 25, 2017 to Final Office Action dated Mar. 2, 2017", 8 pgs.
"U.S. Appl. No. 15/400,034, Final Office Action dated Apr. 24, 2017", 7 pgs.
"U.S. Appl. No. 15/400,034, Non Final Office Action dated Mar. 9, 2017", 10 pgs.
"U.S. Appl. No. 15/400,034, Preliminary Amendment filed Jan. 10, 2017", 7 pgs.
"U.S. Appl. No. 15/400,034, Response filed Apr. 5, 2017 to Non-Final Office Action dated Mar. 9, 2017", 12 pgs.
"Australian Application Serial No. 2015227496, Response filed Jan. 24, 2017 to Subsequent Examiners Report dated Jan. 4, 2017", 1 pg.
"Australian Application Serial No. 2015227496, Subsequent Examiners Report dated Jan. 4, 2017", 3 pgs.
"Canadian Application Serial No. 2,805,385, Response filed Feb. 1, 2017 to Office Action dated Aug. 15, 2016", 10 pgs.
"Canadian Application Serial No. 2,805,389, Office Action dated May 3, 2017", 5 pgs.
"Canadian Application Serial No. 2,904,750, Office Action dated Nov. 29, 2016", 5 pgs.
"European Application Serial No. 11813049.1, Communication Pursuant to Article 94(3) EPC dated Apr. 10, 2017", 3 pgs.
"European Application Serial No. 11813050.9, Communication Pursuant to Article 94(3) EPC dated May 2, 2017", 4 pgs.
"Japanese Application Serial No. 2015-217722, Office Action dated May 9, 2017", W/ English Translation, 21 pgs.
"Japanese Application Serial No. 2015-217722, Office Action dated Nov. 29, 2016", w/ English Translation), 16 pgs.
"Japanese Application Serial No. 2015-217722, Response filed Apr. 3, 2017 to Office Action dated Nov. 29, 2016", (w/ English Translation of Amended Claims), 13 pgs.
"U.S. Appl. No. 14/795,627, Final Office Action dated Dec. 31, 2015", 6 pgs.
"U.S. Appl. No. 14/795,627, Preliminary Amendment filed Jul. 9, 2015", 3 pgs.

(56) References Cited

OTHER PUBLICATIONS

1"U.S. Appl. No. 14/795,627, Response filed Dec. 9, 2015 to Non Final Office Action dated Sep. 9, 2015", 9 pgs.
"Chinese Application Serial No. 201180037431.X, Response filed Nov. 24, 2015 to Office Action dated Sep. 9, 2015", (w/ English Translation of Amended Claims), 20 pgs.
"Japanese Application Serial No. 2015-217722, Amendment filed Dec. 4, 2015", (w/ English Translation of Claims), 8 pgs.

* cited by examiner

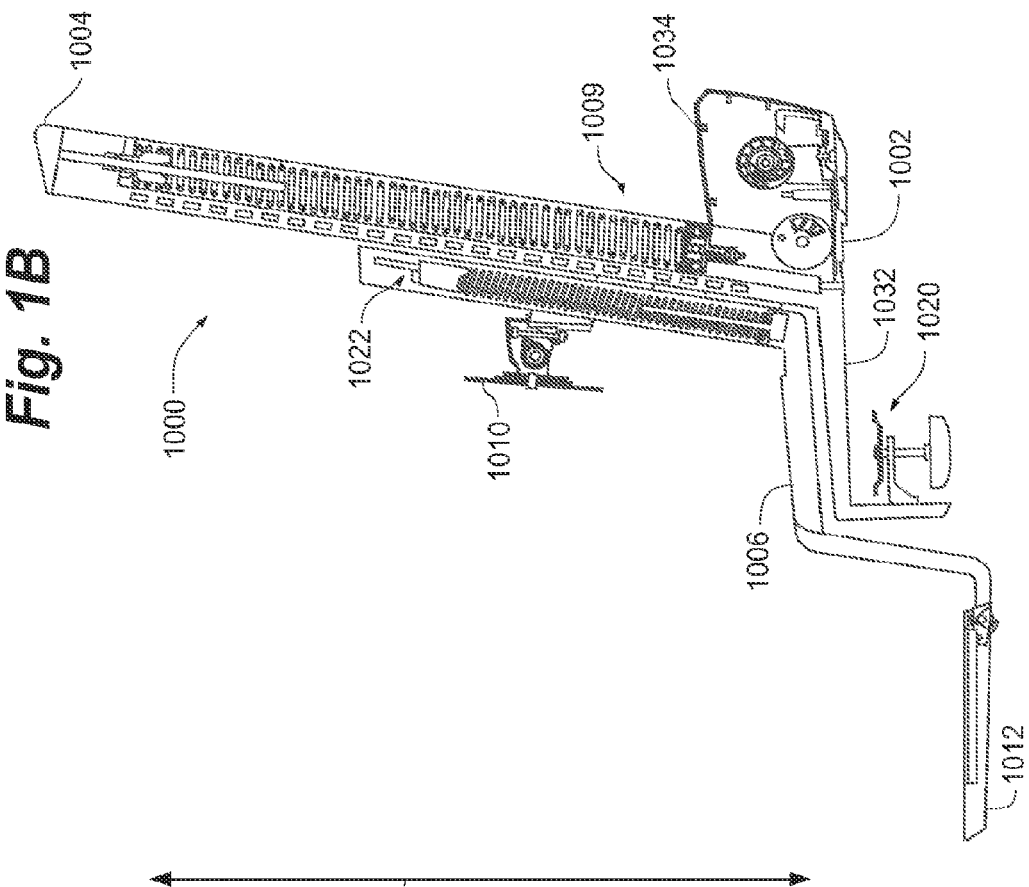
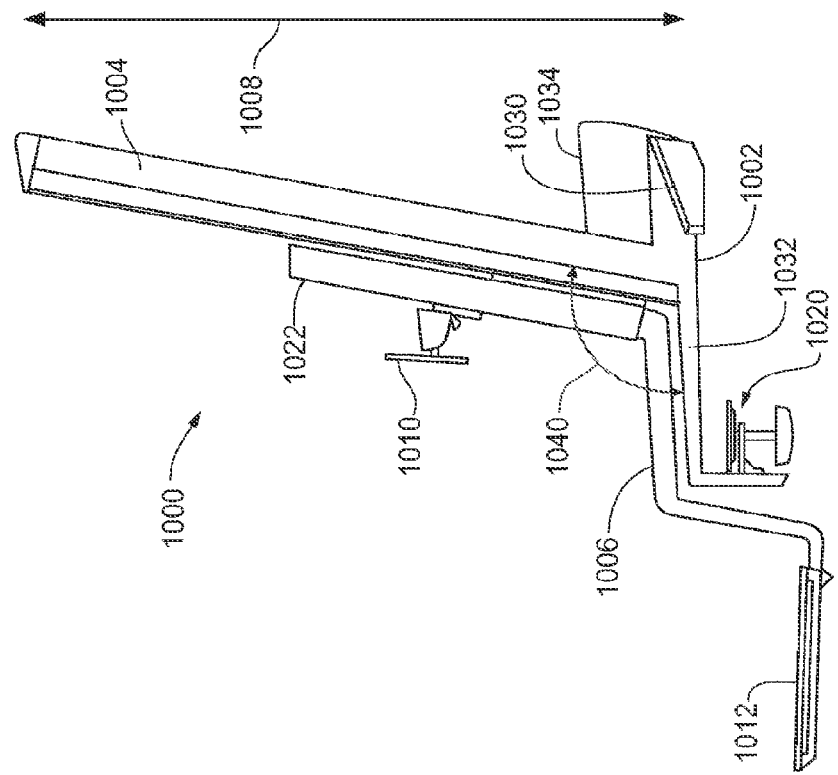

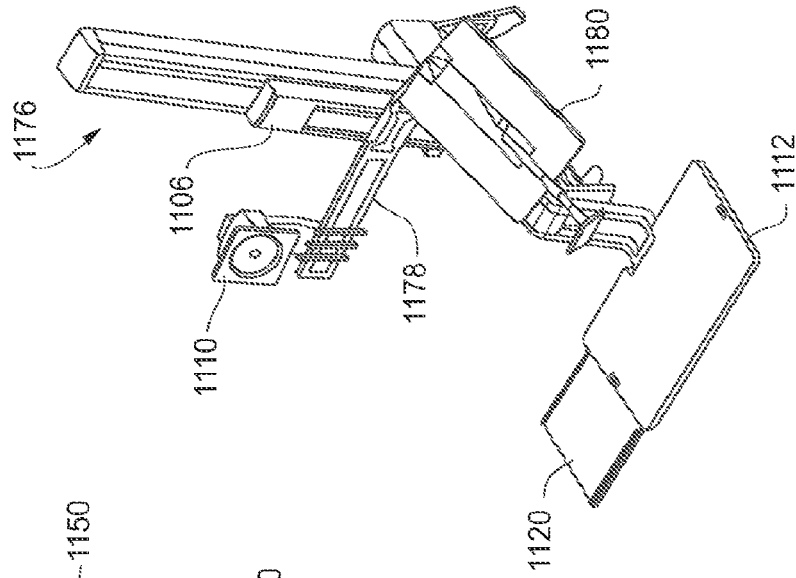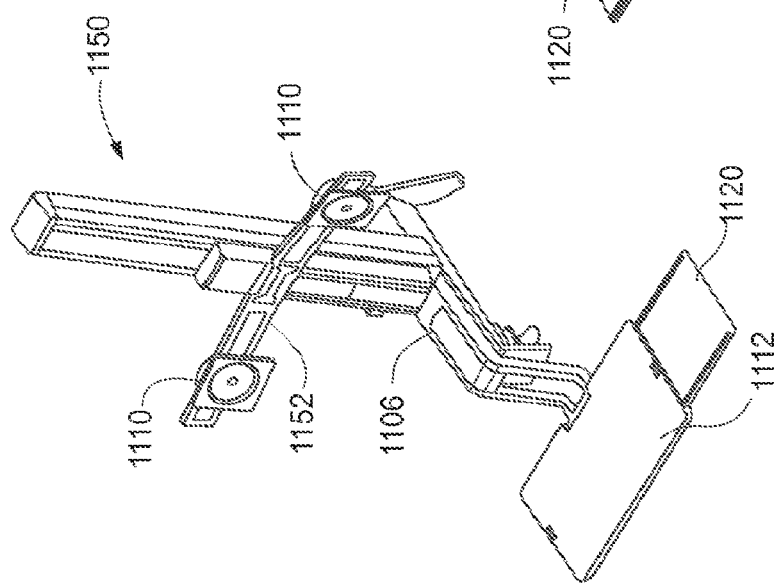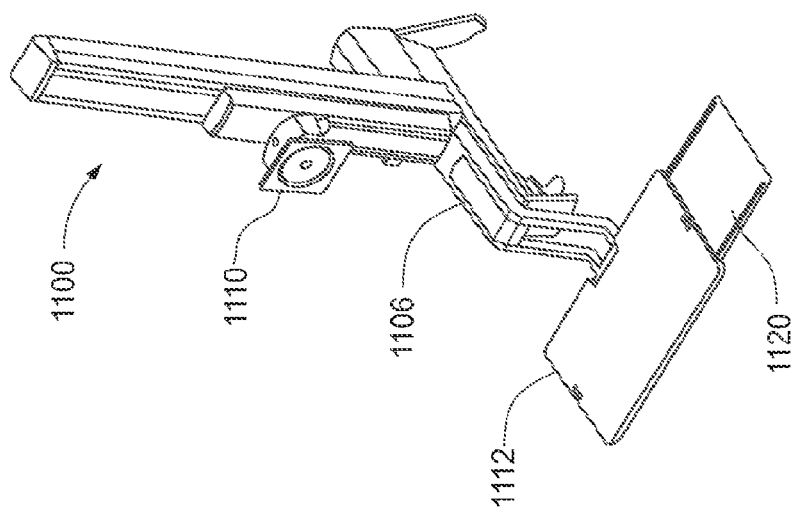

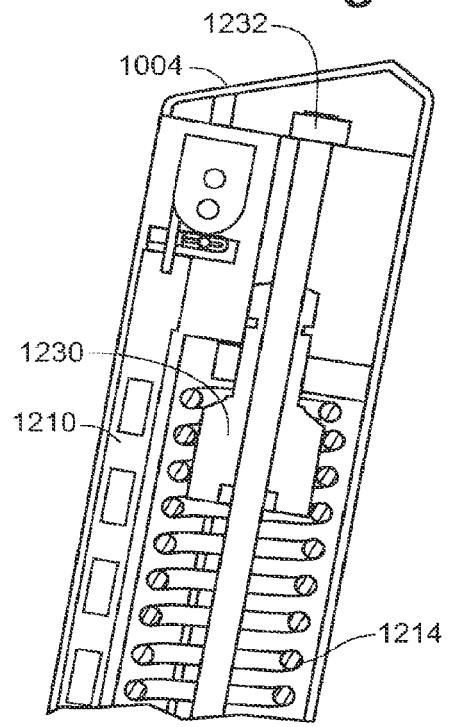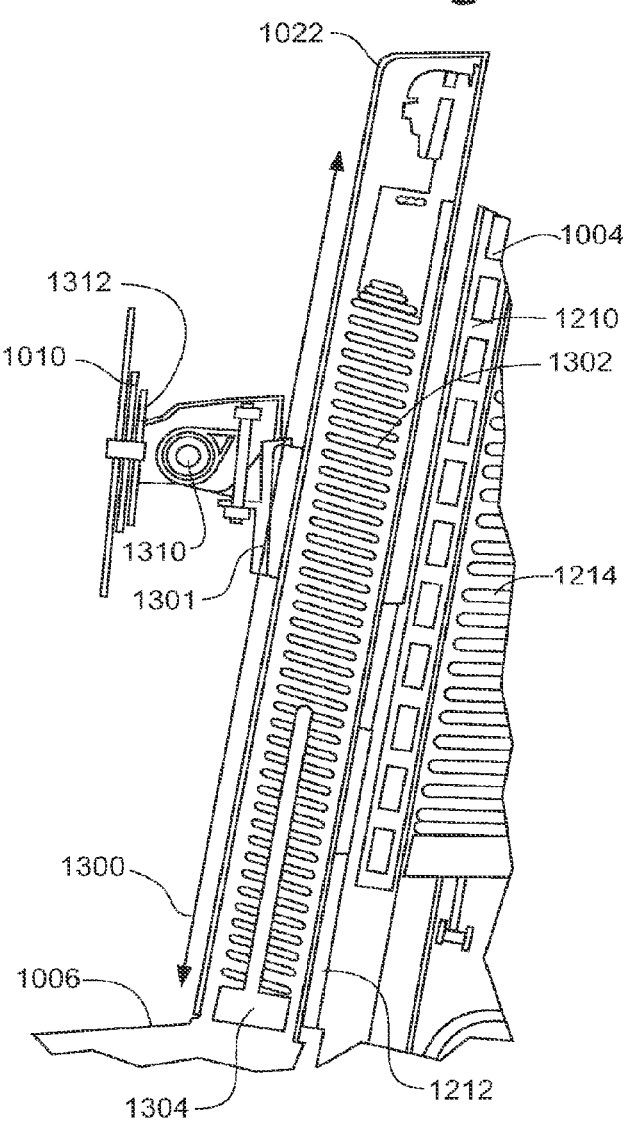

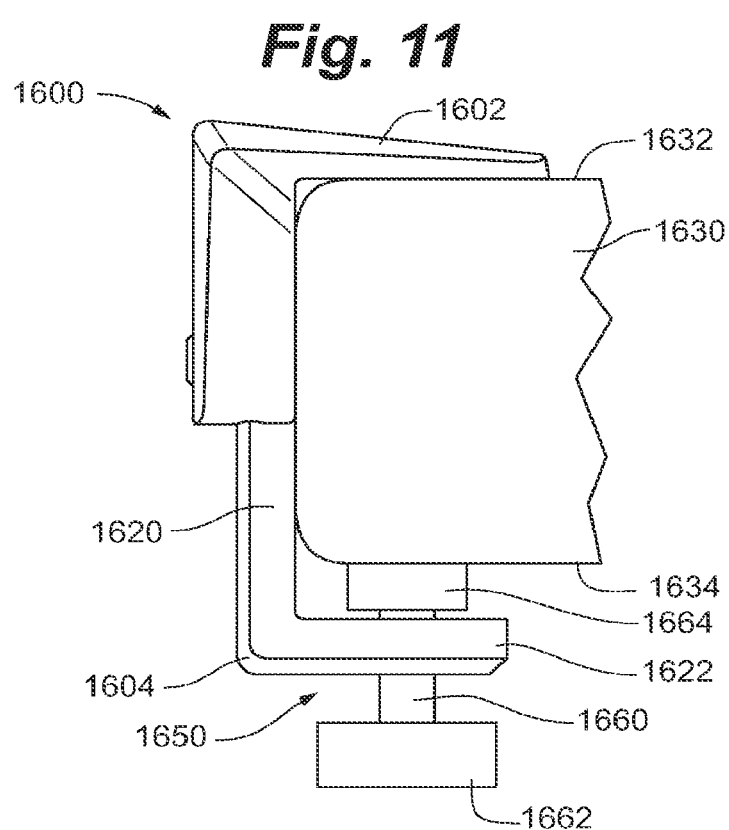

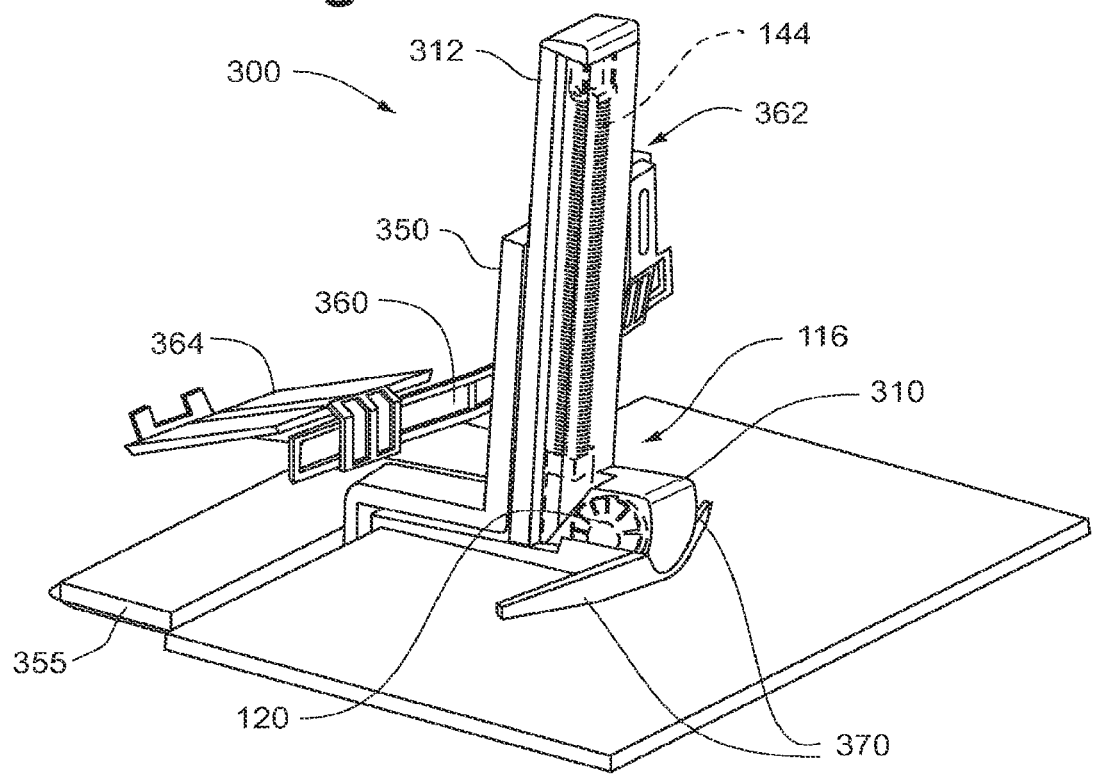

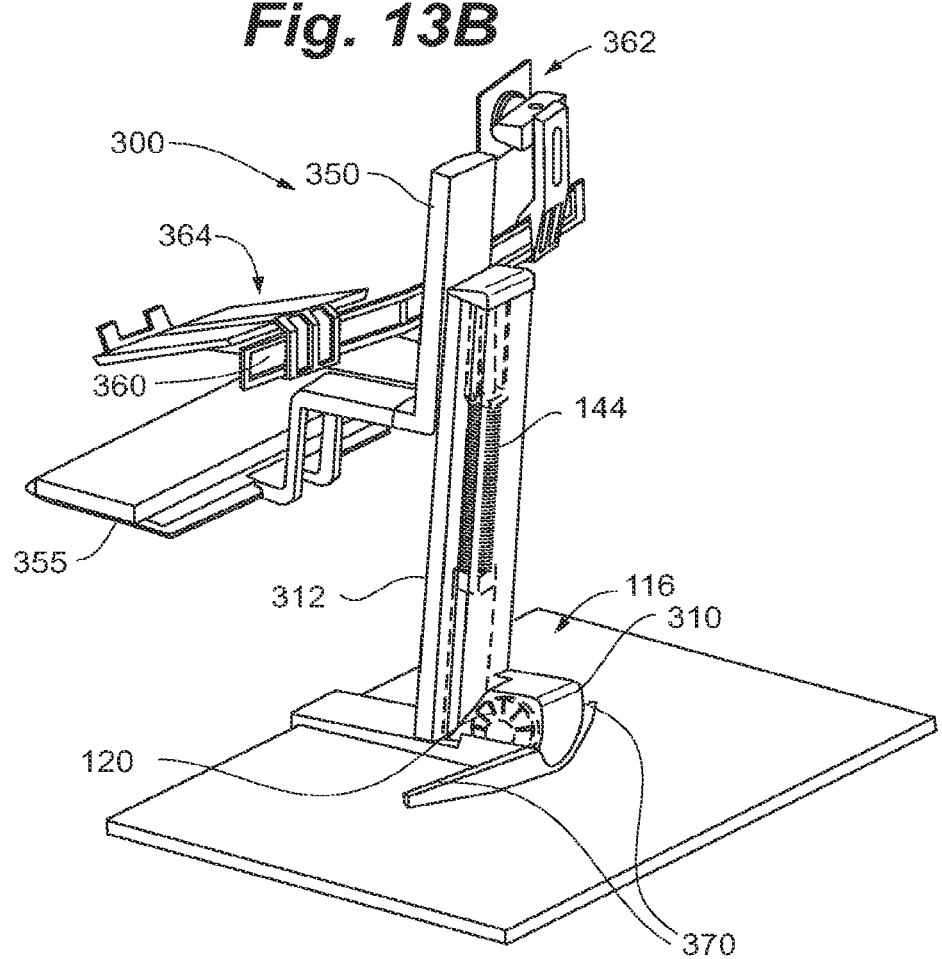

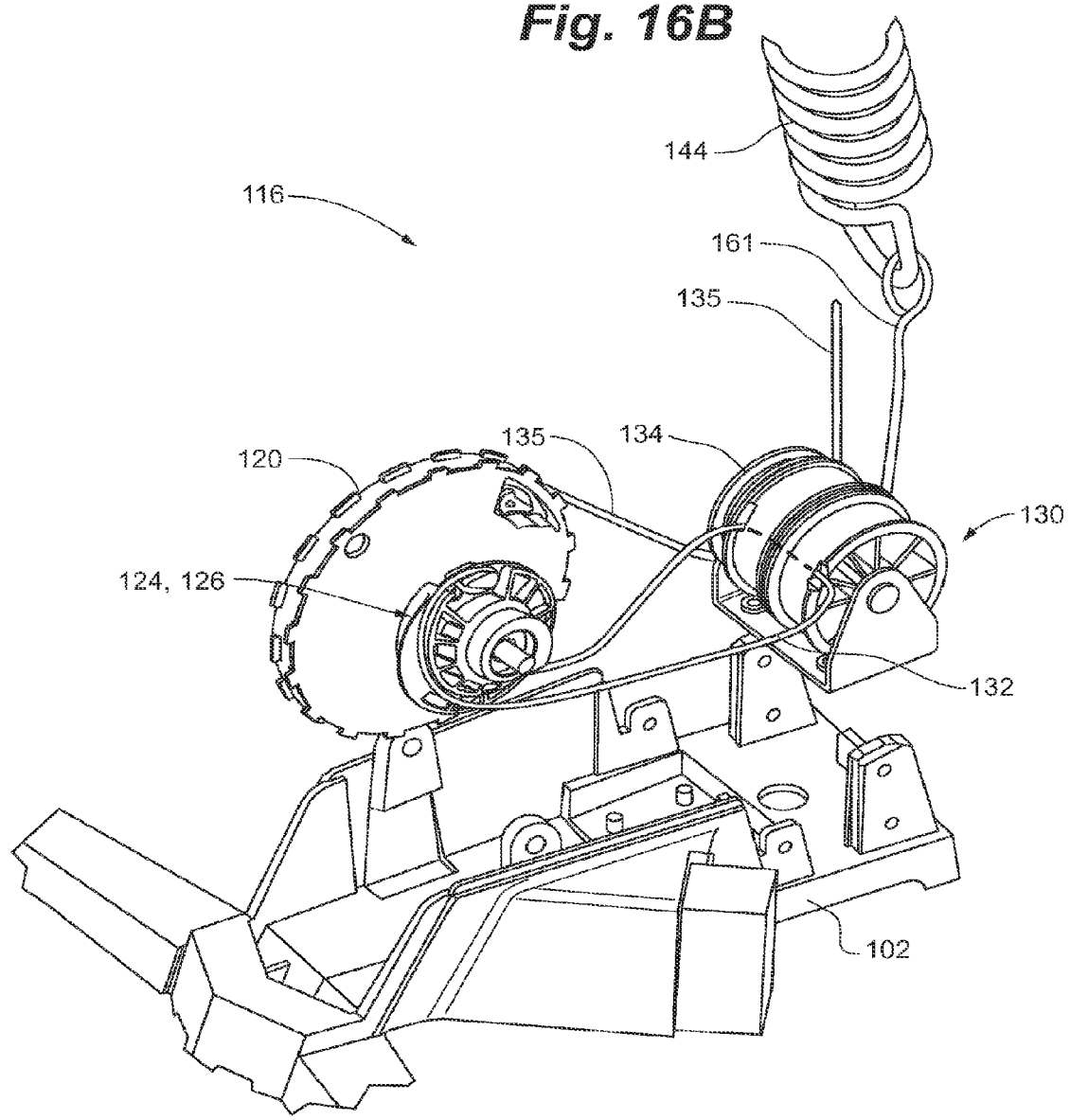

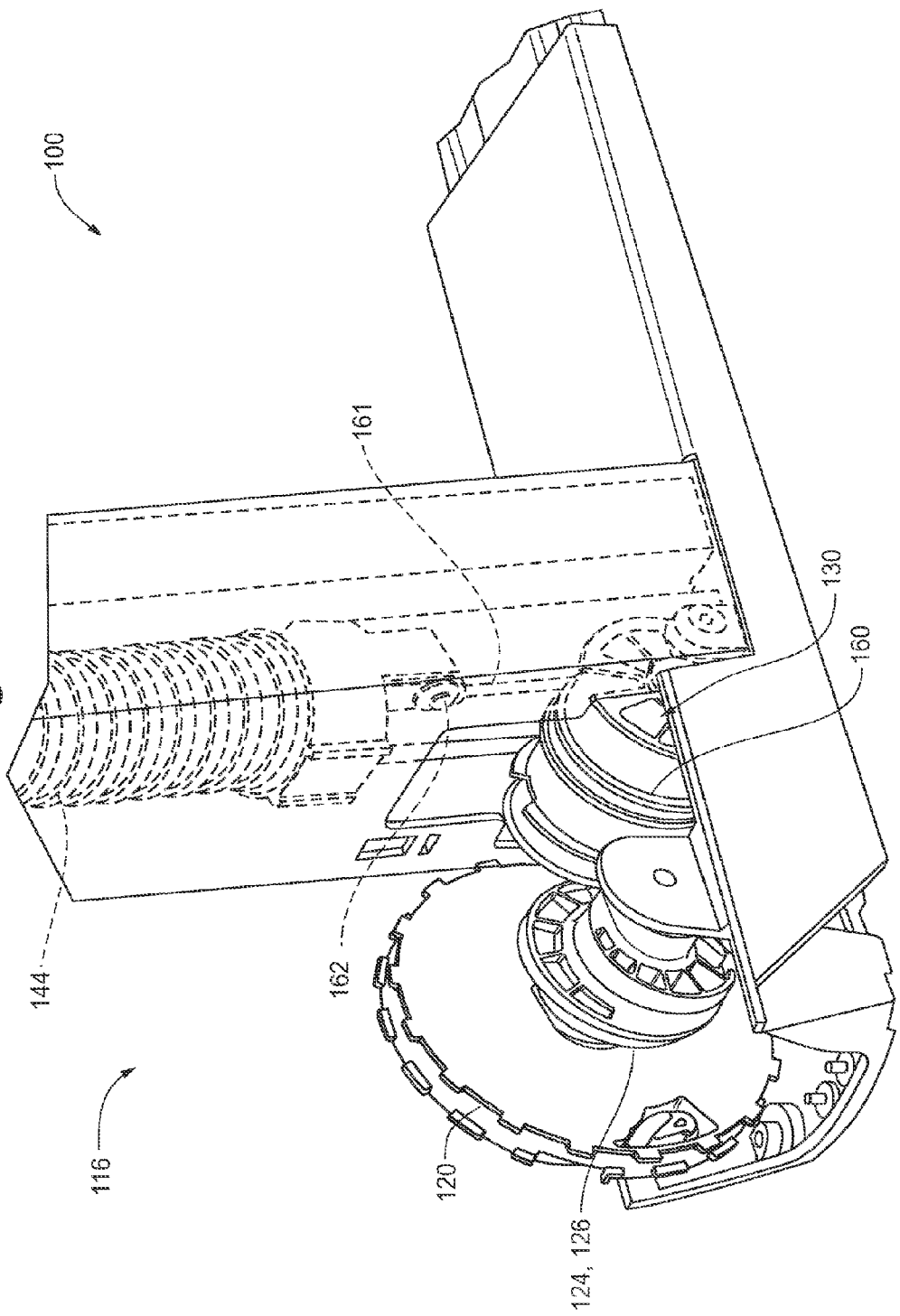

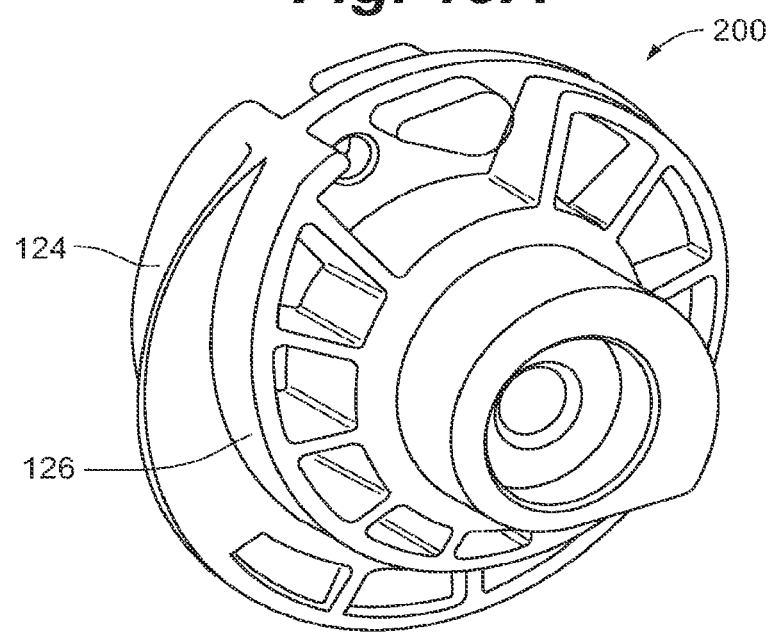

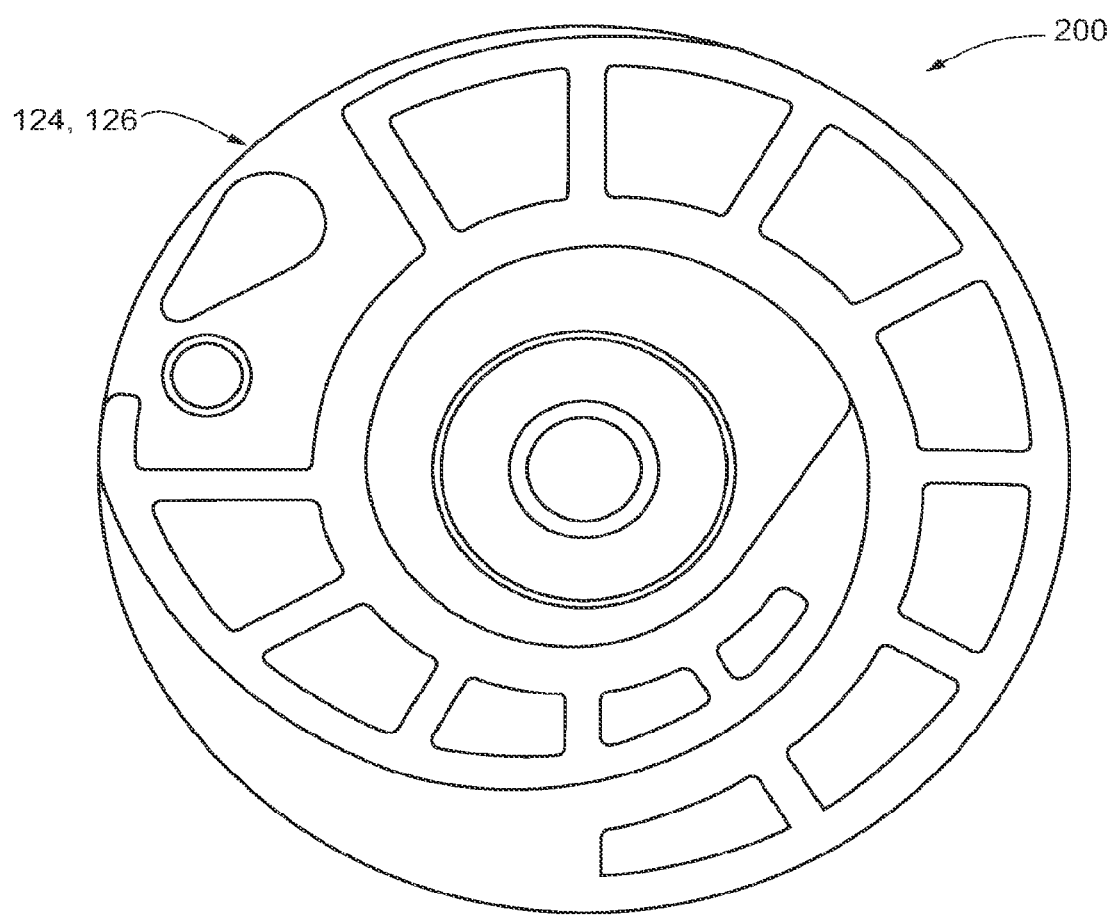

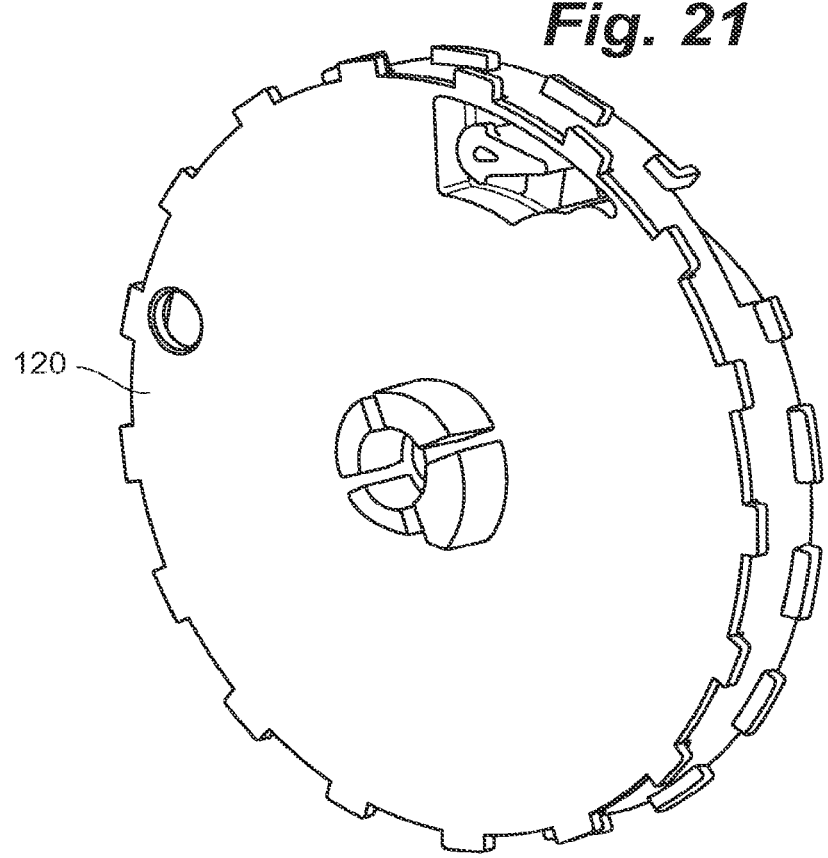

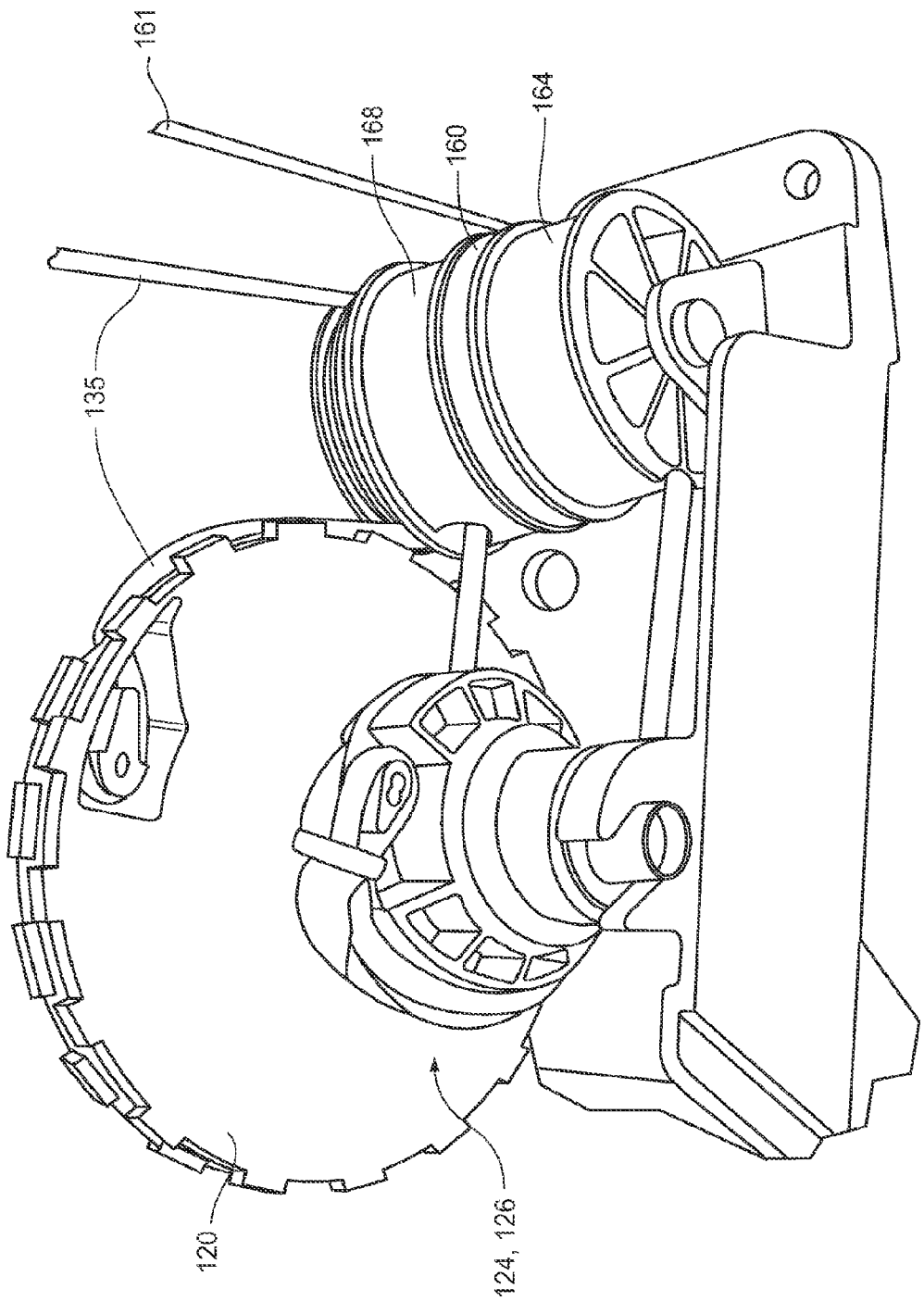

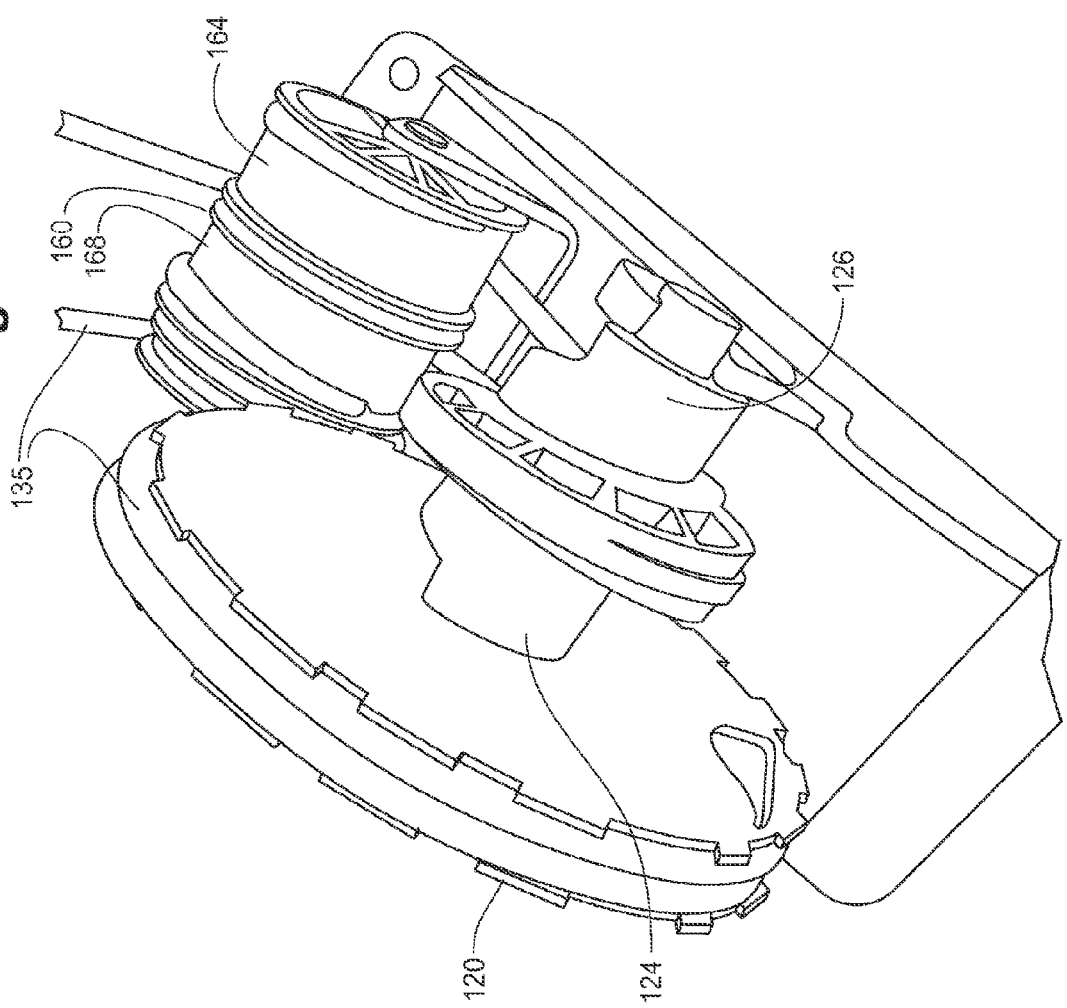

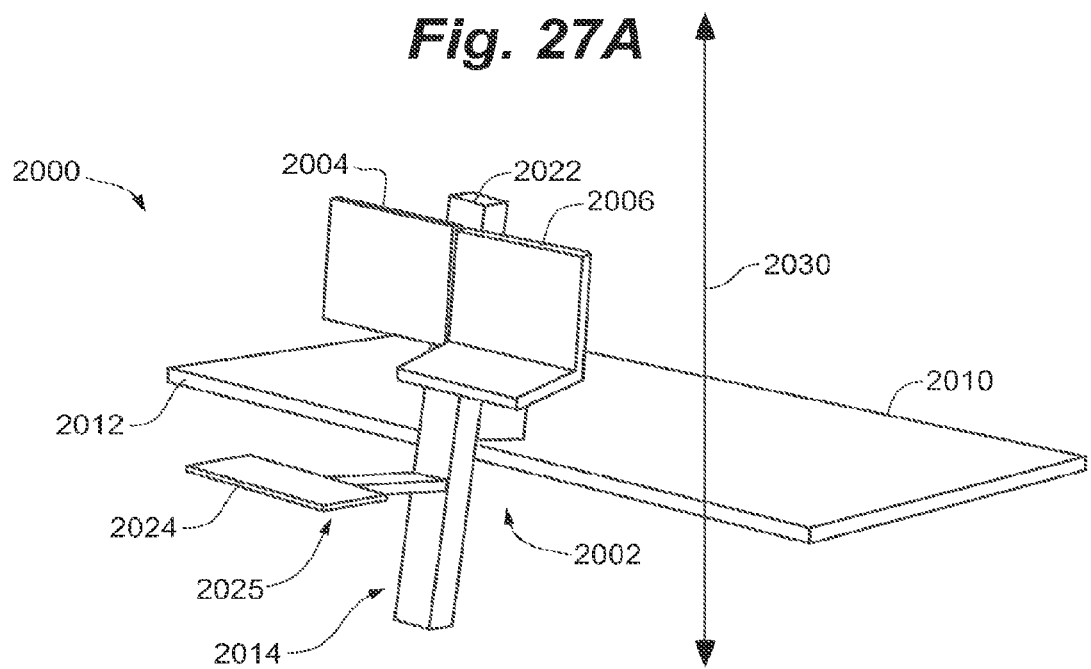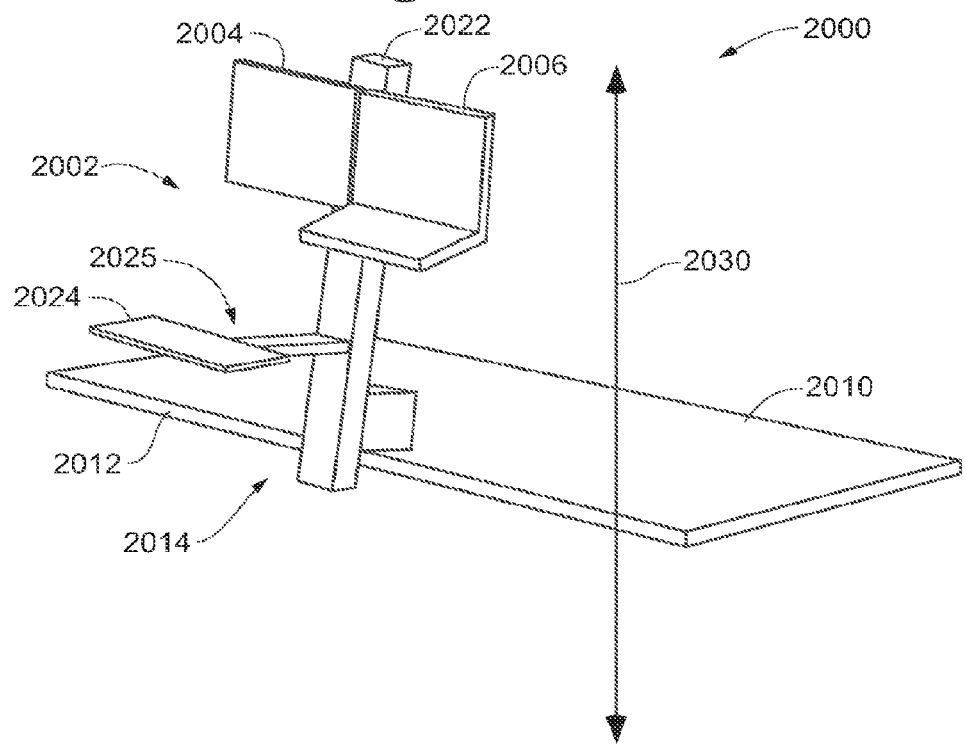

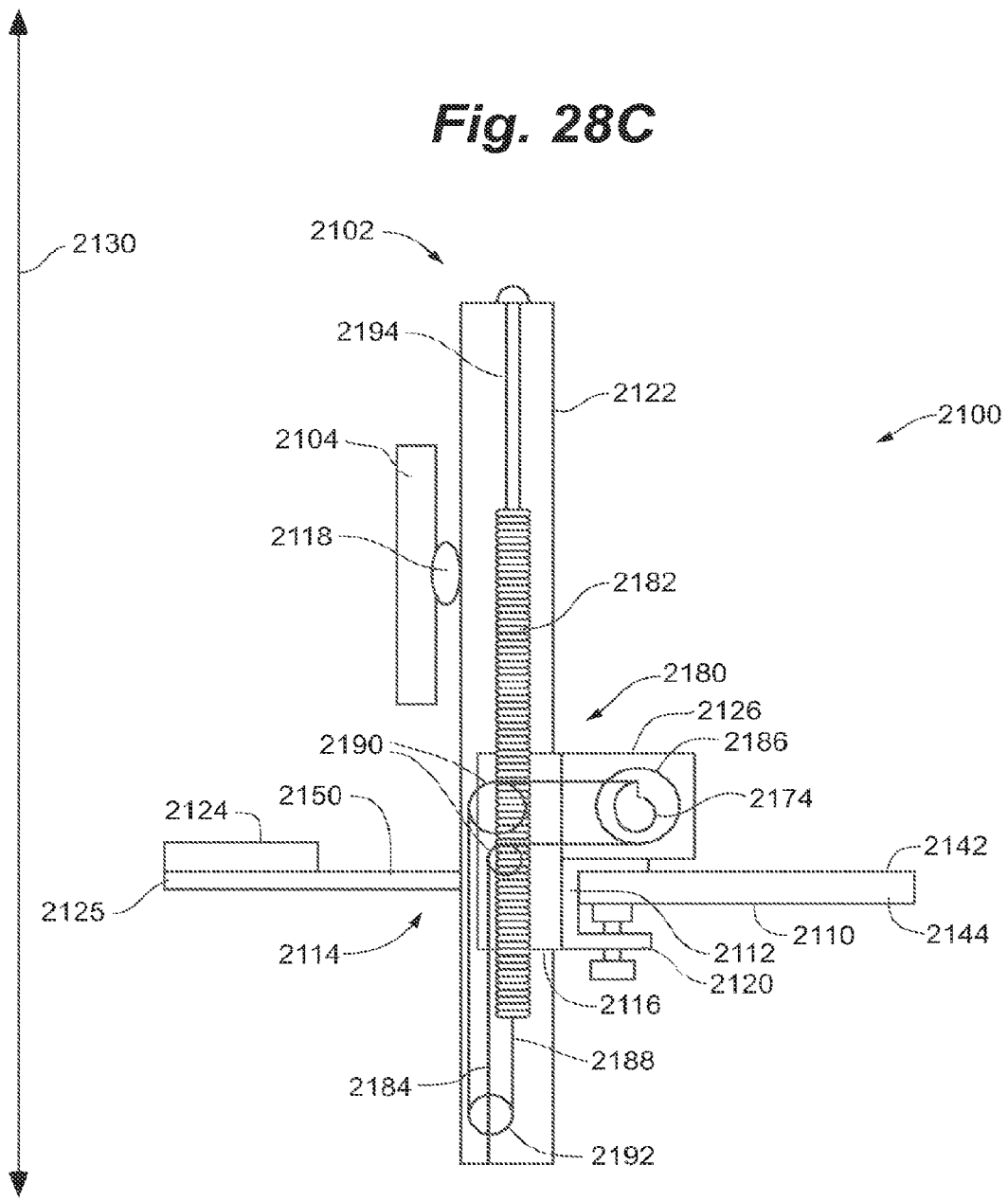

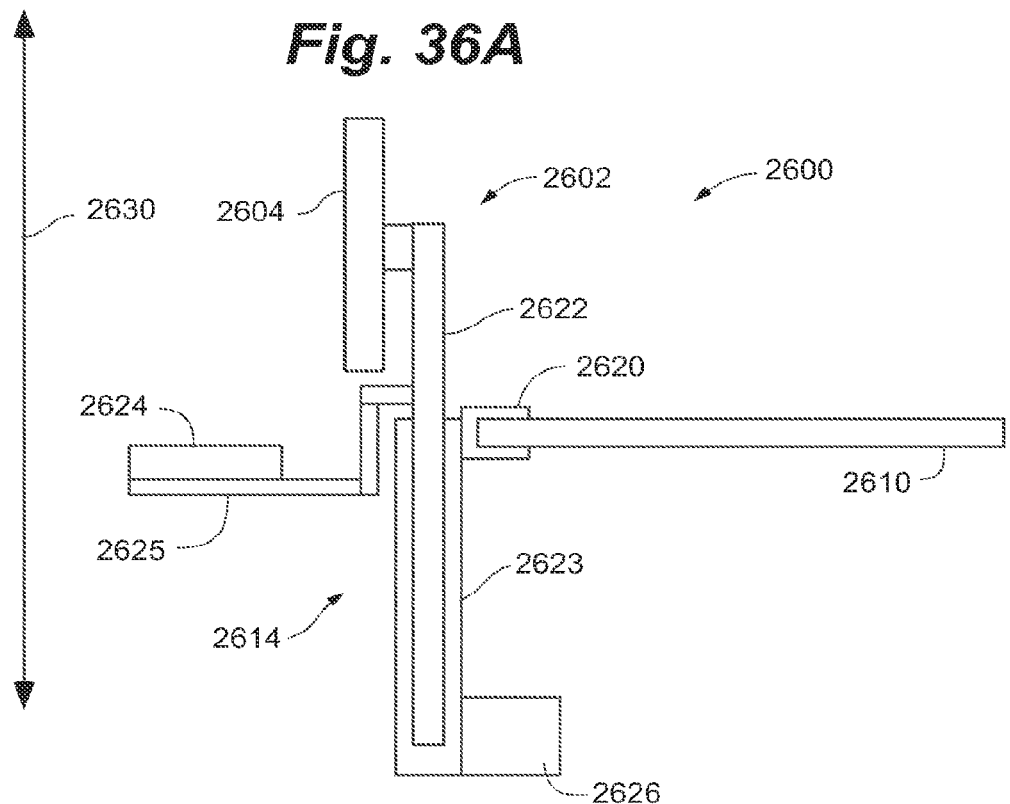
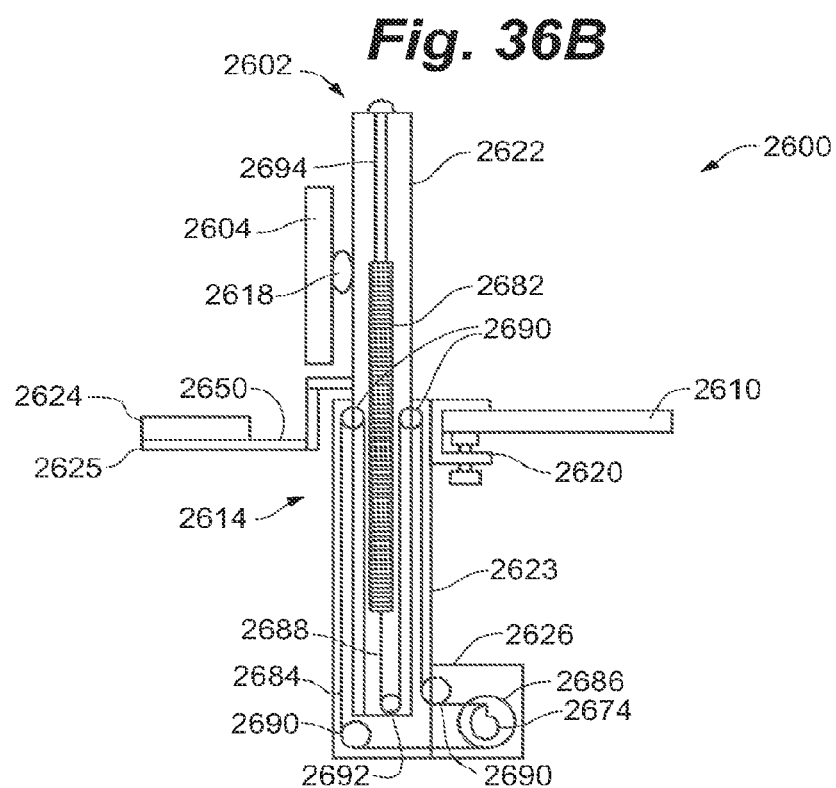

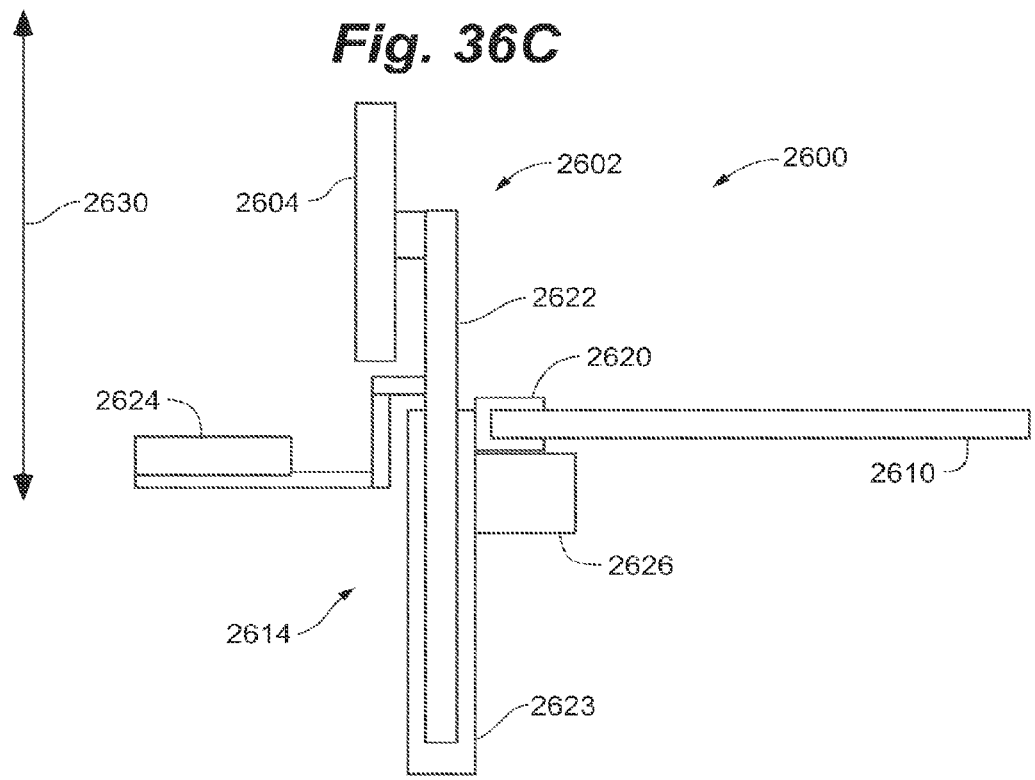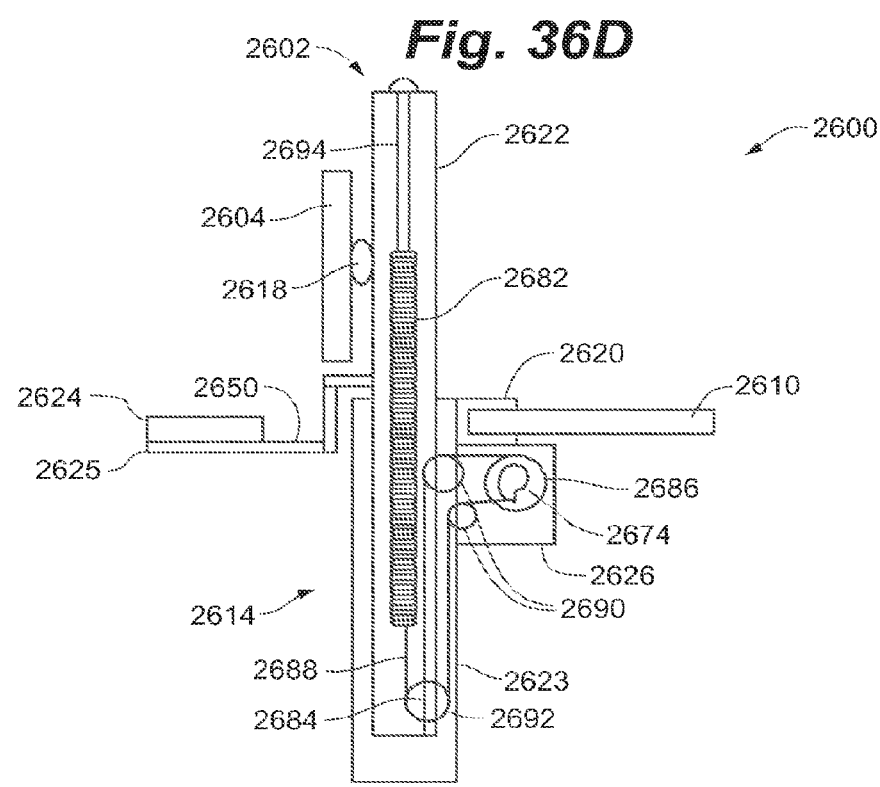

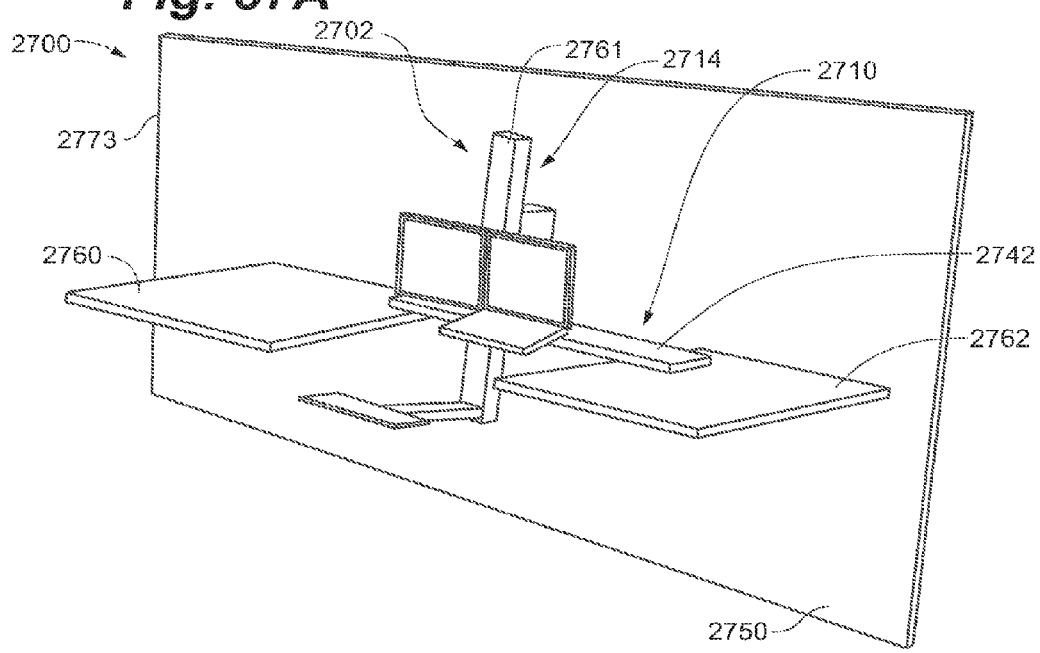
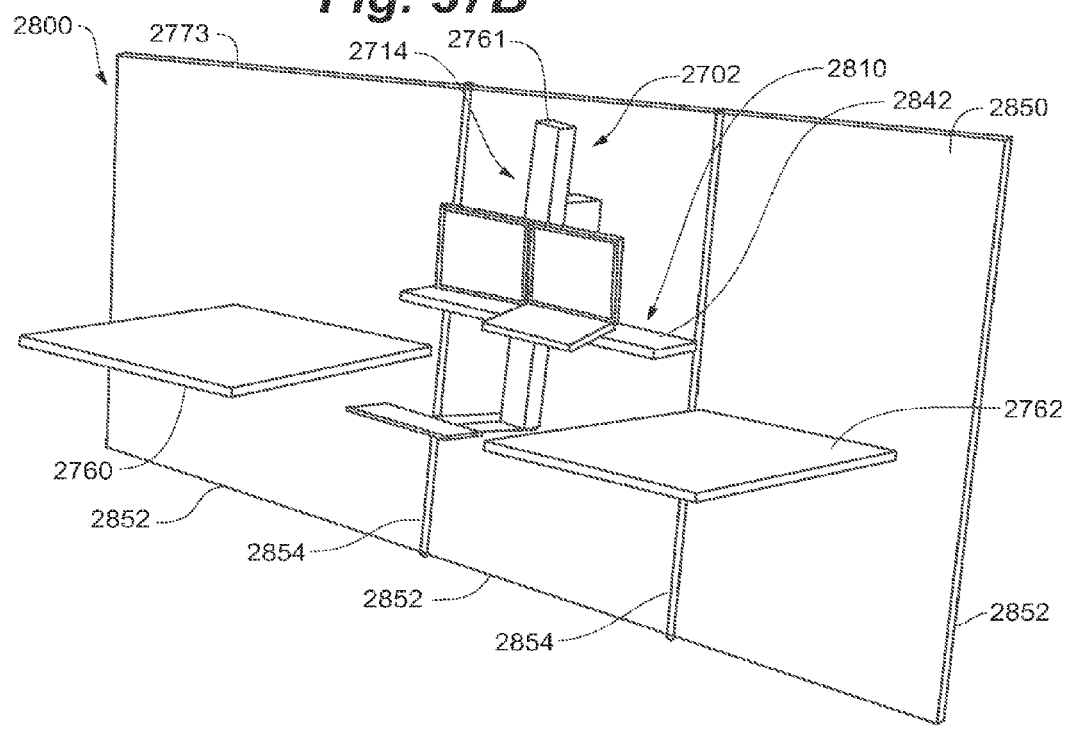

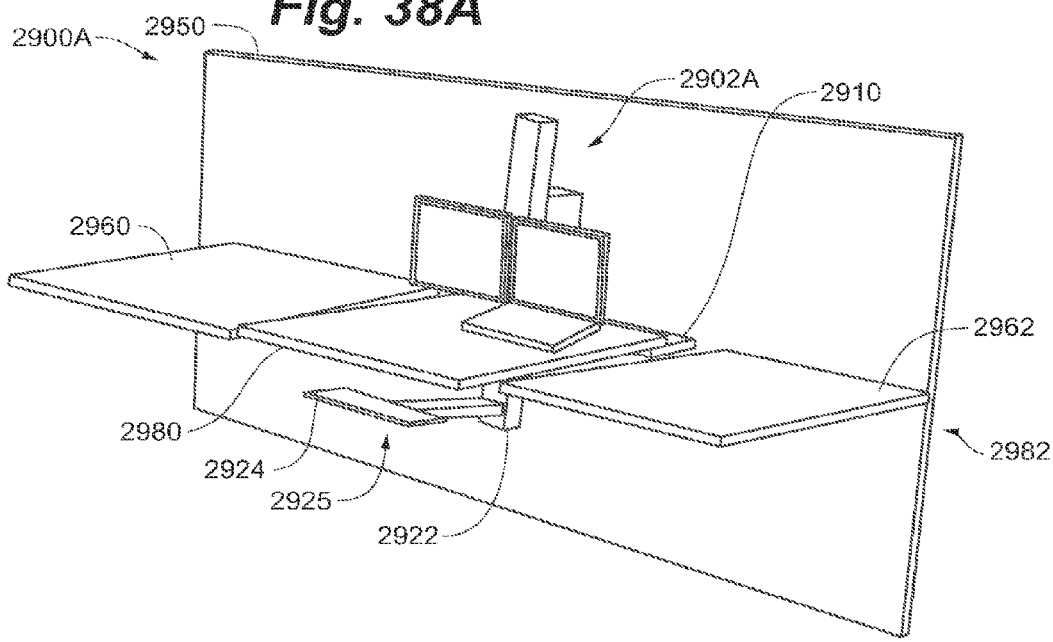
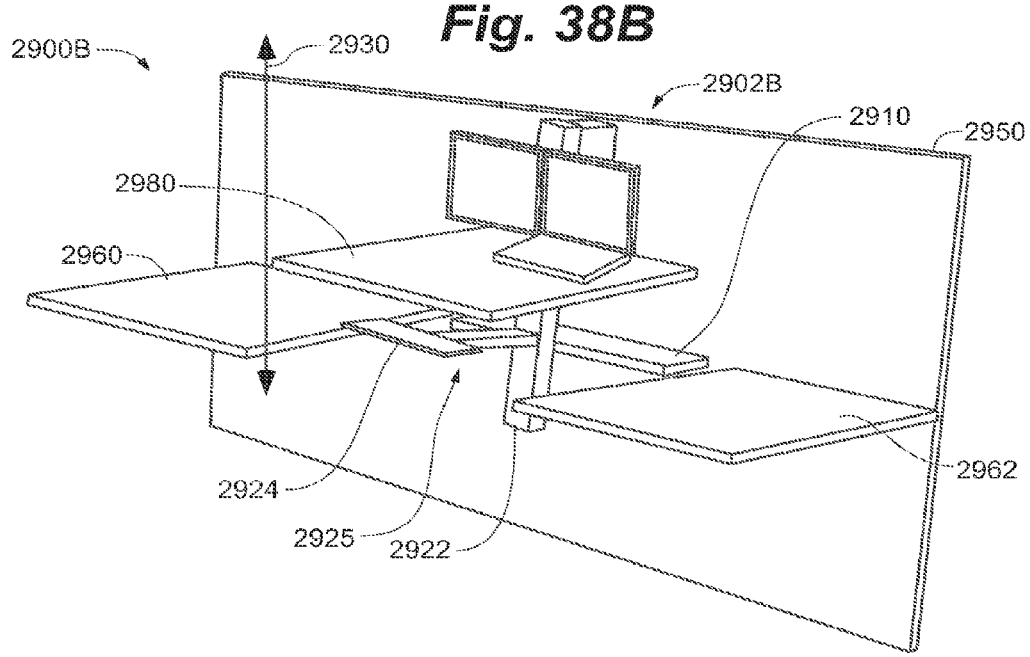

EDGE MOUNT POSITIONING APPARATUS, SYSTEM, AND METHOD

CROSS-REFERENCES

This application is a continuation of U.S. application Ser. No. 13/294,399, filed Nov. 11, 2011, and titled Edge Mount Positioning Apparatus, System, and Method, which claims the benefit of U.S. Provisional Application No. 61/412,456, filed Nov. 11, 2010, and titled Front Mount Positioning Apparatus and Method, the content of which are hereby incorporated by reference in their entirety. This application is related to U.S. application Ser. Nos. 13/191,182 and 13/191,170, each filed Jul. 26, 2011, and each of which claims the benefit of U.S. Provisional Application No. 61/369,430, filed Jul. 30, 2010, and U.S. Provisional Application No. 61/369,392, filed Jul. 30, 2010. The contents of each of the above mentioned applications are hereby incorporated by reference in their entirety.

FIELD

Embodiments of the invention generally relate to devices that can move work surfaces and/or equipment such as electronic displays, keyboards, and other items between multiple positions relative to an operator.

BACKGROUND

Many jobs involve working at desks, optionally with personal computers and/or display monitors. In such jobs, the desks, personal computers and/or display monitors may be used by multiple operators at different times during a day. In some settings, one computer and/or monitor may be used by multiple people of different sizes and having different preferences in a single day. Given the differences in people's size and differences in their preferences, a monitor or display adjusted at one setting for one individual may be inappropriate for another individual. For instance, a child would have different physical space needs than an adult using the same computer and monitor. The same can be true for the position of the desk surface itself. Further, a single user may wish to use equipment at multiple positions. For example, a single user may wish to periodically both sit and stand while using the desk surface and/or display monitor. In some situations, users desire to perform operations in various postures. For example, one may desire to perform some operations in a seated position and others in a standing position. In such situations, it may be required that both the seated operations and the standing operations be done at the same workstation, which may include a desk surface, computer monitor, a keyboard, and/or a mouse. Such a user will desire the desk surface, monitor and/or other equipment to be at different heights while sitting and standing.

As adjustable height mechanisms for displays have become more widespread and users have experienced their advantages, users are more frequently adjusting the height of their monitors and other equipment. Further, such adjustments are now more frequently desired over a wide range of travel.

SUMMARY

According to one aspect of the invention, an apparatus for positioning an electronic display and a keyboard is provided. The apparatus includes a riser that includes a bracket and a support column movably coupled together. An attachment member is coupled to the riser. The attachment member is configured to attach the riser proximate an edge of a support member having a planar surface. In an attached state, the bracket and the support column are movably coupled through a vertical range of travel relative to the support member. The apparatus also includes a display mount coupled to the riser that is configured to support the electronic display, and a keyboard tray coupled to the riser.

According to another aspect of the invention, a positioning apparatus is provided. The positioning apparatus includes an attachment member and a support column. The attachment member is configured to attach to a support member having a horizontal, planar surface and an edge. The support column has a first end and a second end, and is movably coupled to the attachment member through a vertical range of travel extending above and below the support member adjacent the edge of the support member. The first end of the support column remains level with or above the support member planar surface throughout the vertical range of travel and the second end of the support column remains below the support member planar surface as the support column moves through the vertical range of travel.

A system for positioning an electronic display and a keyboard is provided according to another aspect of the invention. The system includes a support member having a planar surface and an edge. The system also includes a riser, an attachment member, a display mount, and a keyboard tray. The riser includes a bracket and a support column movably coupled together. The attachment member is coupled to the riser and attached to the support member proximate the edge of the support member. The bracket and the support column are movably coupled through a vertical range of travel relative to the support member. The display mount is coupled to the riser and configured to support the electronic display. The keyboard tray is also coupled to the riser.

According to another aspect of the invention, a method for positioning an electronic display and a keyboard is provided. The method includes selecting a support member having a generally planar surface and an edge and attaching a positioning apparatus to the support member proximate the edge of the support member. The positioning apparatus has a riser having a bracket and a support column movably coupled together, an attachment member coupled to the riser and configured to attach the riser proximate the edge of the support member, a display mount coupled to the riser, and a keyboard tray coupled to the riser. After being attached to the support member, the bracket and the support column are movably coupled through a vertical range of travel relative to the support member. The method also includes supporting an electronic display with the display mount and a keyboard with the keyboard tray. The method also includes moving the electronic display and the keyboard relative to the support member within the vertical range of travel. The method optionally includes moving the electronic display and the keyboard relative to the support member between a sitting position and a standing position, moving the electronic display simultaneously with the keyboard, attaching the positioning apparatus about the edge of the support member, and/or one or more other optional steps.

Embodiments of the invention can provide one or more of the following features and/or advantages. In some cases the bracket of the positioning apparatus is coupled to the attachment member and the support column is moveable relative to the bracket and the attachment member. In some cases, the support column is coupled to the attachment member and the bracket is moveable relative to the support column and attachment member. Either case can allow simultaneous movement of the display mount and the keyboard tray within the vertical range of travel, both being coupled to the support column or the bracket, respectively. In some cases the ends of the support column may remain above and below, respectively, the surface of the support member during movement of the support column or bracket through the vertical range of travel. The path of travel of the support column, or optionally of the bracket, may be substantially vertical, or may include both vertical and horizontal movement with respect to the attachment member.

In some cases the vertical range of travel extends above and below the surface of the support member, and optionally, the keyboard tray is positioned below the surface of the support member in a lowest position in the vertical range of travel. The vertical range of travel may be at least about 14 inches, or in some cases between about 14 and about 24 inches. In some cases the vertical range of travel extends between a sitting position and a standing position.

In some cases a movable work surface is coupled to the riser, optionally positioned between the display mount and the keyboard tray. The movable work surface may be sized and shaped to replace an existing work surface. In some cases, a system includes first and second work surfaces positioned on opposite sides of the support member. In this case, a movable work surface may optionally provide a substantially continuous work surface from the first work surface to the movable work surface to the second work surface at a first vertical position. In some cases the support member is attached to a wall.

These and various other features and advantages will be apparent from a reading of the following detailed description.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIG. 1A is a side view of a positioning apparatus.
FIG. 1B is a side cross-section of FIG. 1A.
FIGS. 2A-2C are perspective views of positioning apparatuses with various mounting options.
FIG. 5 is an enlarged view of a portion of a lift mechanism shown in FIG. 1B.
FIG. 6 is an enlarged view of a portion of a lift mechanism shown in FIG. 1B.
FIG. 7A is a perspective view of a screw clamp.
FIG. 7B is a top view of the screw clamp of FIG. 7A.
FIG. 7C is a front view of the screw clamp of FIG. 7A.
FIG. 7D is a bottom view of the screw clamp of FIG. 7A.
FIG. 7E is a side view of the screw clamp of FIG. 7A.
FIG. 11 is a side view of a c-clamp attached to a support surface.
FIGS. 13A and 13B are rear perspective views of a positioning apparatus in a lowered position and a raised position, respectively.
FIGS. 16A and 16B are partial, exploded views of a bottom portion of the apparatus of FIG. 14.
FIG. 18 is a perspective view of a bottom portion of an apparatus.
FIGS. 19A and 19B are perspective views of a cam member including a first cam and a second cam.
FIG. 20 is a side plan view of the cam member of FIG. 19A.
FIG. 21 is a perspective view of a wheel pulley.
FIG. 25 is a perspective view of a portion of a balance mechanism in a state corresponding to a first position of a mounting portion.
FIG. 26 is a perspective view of a portion of a balance mechanism in a state corresponding to a second position of a mounting portion.
FIGS. 27A and 27B are perspective views of a representation of a positioning apparatus and system in accordance with an embodiment of the invention.
FIG. 28C is a schematic representation of a side cross-sectional view of the positioning apparatus and system of FIGS. 28A and 28B.

FIGS. 36A-B are side cross-sectional representations of a positioning apparatus and system in accordance with embodiments of the invention.

FIGS. 36C-D are side cross-sectional representations of a positioning apparatus and system in accordance with embodiments of the invention.

FIG. 37A is a perspective representation of a positioning apparatus and system in accordance with an embodiment of the invention.

FIG. 37B is a perspective representation of a positioning apparatus and system in accordance with an embodiment of the invention.

FIGS. 38A and 38B are perspective representations of a positioning apparatus and system in accordance with an embodiment of the invention.

DETAILED DESCRIPTION OF THE PREFERRED EMBODIMENTS

Figure 3:
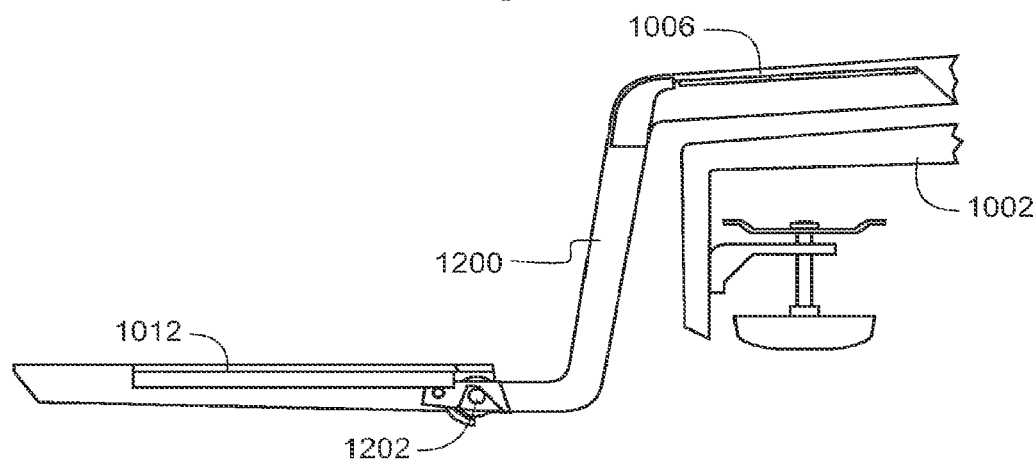
FIG. 3 is an enlarged view of a keyboard tray shown in FIG. 1B.

The following detailed description is exemplary in nature and is not intended to limit the scope, applicability, or configuration of the invention in any way. Rather, the following description provides some practical illustrations for implementing exemplary embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Some embodiments of the invention generally provide apparatuses capable of positioning various equipment relative to a human operator. For example, in some cases a positioning apparatus can support items such as work surfaces, electronic displays, a laptop computer (i.e., notebook), a keyboard, and/or other computing equipment, such as a mouse. As used herein, the term electronic display is used to refer to televisions, computer monitors, tablet computers, and other types of displays capable of displaying images from electronic signals. The embodiments discussed herein provide several examples of positioning apparatuses capable of positioning such types of computing equipment, however, it is contemplated that embodiments of the invention can be used for positioning a wide variety of items and the scope of the invention is not limited in this regard.

FIGS. 27A-40B disclose a number of embodiments of the invention, which will now be described in detail. FIGS. 1-26 depict a number of components, functionalities, and features that may be incorporated in embodiments of the invention. FIGS. 1-26 are described in detail below after the discussion regarding FIGS. 27A-40B.

FIGS. 27A and 27B are perspective views of a system 2000 and positioning apparatus 2002 for positioning equipment such as a display 2004, a laptop 2006, and/or a keyboard 2024 in accordance with an embodiment of the invention. It should be noted that the system 2000 may be configured to position a single display, multiple displays (e.g., two or three), and/or multiple displays and a laptop. The system 2000 generally includes a support member 2010 with the positioning apparatus 2002 attached to the support member 2010. FIG. 27A shows the system in a first downward position, while FIG. 27B shows the system in a first upward position. In some embodiments, the system is vertically adjustable to an infinite number of positions between the first upward position and the first downward position.

The positioning apparatus 2002 is configured to be removably or fixedly attached to the support member 2010 proximate an edge 2012 of the support member 2010. For convenience, the edge 2012 of the support member 2010 is sometimes referred to herein as a front edge (e.g., an edge of the support member most often approached or faced by a user), though it should be appreciated that the apparatus 2002 can be attached proximate any suitable edge and the invention is not limited in this regard. As just one example, the apparatus 2002 can be attached proximate a side edge of a support member and one or more portions of the apparatus can be fixedly or movably rotated or swiveled for viewing from a perspective other than directly facing the mounting edge.

Embodiments of the positioning apparatus 2002 can advantageously be configured to attach to a wide variety of support members. For example, in some cases the support member 2010 is an existing work surface such as a desk, table, tray, counter, or another type of furniture. As used herein, the term "work surface" is used to refer to both the outermost top surface of such articles, as well as the top planar member (e.g., table top or desk top) having a thickness and one or more edges. In some cases the support member 2010 may be part of a cubicle or other office furniture. In general, the support member 2010 has a generally planar, horizontal surface and one or more edges. The support member 2010 provides a platform for mounting the positioning apparatus 2002, and in some cases may be referred to as a mounting platform.

In some cases the support member 2010 is horizontal and substantially parallel to a floor. However it is contemplated that the positioning apparatus 2002 may be configured to be attached to an inclined or slightly inclined support member 2010 (e.g., an inclined desktop). The positioning apparatus 2002 provides one or more ranges of travel (e.g., the vertical range of travel 2030) for moving various items, including computer monitors and keyboards, relative to the support member 2010. Accordingly, the positioning apparatus 2002 can allow an operator to adjust the position of equipment relative to the support member. Mounting the positioning apparatus 2002 to such a support member can thus convert or transform a normally single-position (e.g., stationary or fixed-height) work surface into a multi-position workstation.

One example of a contemplated use includes transforming a traditional, stationary computer workstation into a multi-position (e.g., multi-height) computer workstation. In many traditional settings, computer workstations generally include a monitor and keyboard simply resting on an existing work surface such as a desk or table. While the positions of the monitor and the keyboard in such settings may sometimes be adjusted by small amounts relative to the work surface, computer operators are generally limited to a single working position by the height of the existing work surface. For example, a traditional desk may only accommodate sitting positions. According to some embodiments of the invention, the positioning apparatus 2002 can transform such a traditional, fixed height computer workstation into a multi-position (e.g., multi-height) computer workstation, allowing an operator to adjust the height of the workstation to accommodate multiple working positions, including a sitting position and a standing position.

Returning to FIGS. 27A and 27B, attaching the positioning apparatus 2002 near the edge 2012 of the support member 2010 provides a number of advantages over other mounting configurations. In some cases locating the attachment point near the edge of the support member can save space and free other portions of the support member for other uses. For example, attaching the positioning apparatus 2002 at the edge of a table or desk can allow use of other portions of the table or desk that could otherwise be occupied by a free-standing device positioned more centrally on the table or desk. In addition, because the apparatus is primarily attached near the edge of the support member, a support member having a smaller surface area (e.g., narrower) can be used, thus providing flexibility for mounting the apparatus to a wide variety of support members. Attaching the positioning apparatus 2002 to the support member 2010 also provides a secure and stable mount without a traditional base. The addition of a base can often require a large footprint upon the support surface in order to provide a stable, free-standing footing for the apparatus. This may be especially so for a positioning apparatus providing a large range of travel, which could necessitate a large, reinforced base. Thus attaching the positioning apparatus near the edge of the support member can provide a relatively simple and less costly option for securely mounting the apparatus. In addition, an edge-mounted configuration can advantageously allow a movable portion of the positioning apparatus to freely move below the support member, thus providing a potentially larger range of vertical travel. This configuration can also allow a portion of the apparatus to be positioned below the support member, e.g., for concealing portions of the apparatus to provide a more aesthetically pleasing appearance.

As shown in FIGS. 27A-27B, the positioning apparatus 2002 includes a riser 2014 that is configured to provide the display 2004, laptop 2006, and keyboard 2024 with vertical adjustability. As will be discussed further herein, the riser 2014 generally includes a bracket (not shown) moveably coupled with a support column 2022. The apparatus 2002 also includes an attachment member (not shown) coupled to the riser 2014 and configured to attach the riser 2014 to the support member 2010. In this example the positioning apparatus 2002 also includes equipment mounts similar to those shown in FIG. 2C, including a crossbar coupled to the riser 2014, a display mount configured to support the display 2004, a notebook tray configured to support the laptop 2006, and a keyboard tray 2025 configured to support the keyboard 2024.

The riser support column 2022 and the riser bracket are movably coupled through a generally vertical range of travel 2030, providing the display 2004, laptop 2006, and keyboard tray 2025 with vertical adjustability relative to the support member 2010. For example, in some cases rollers, slides, and optionally a lift mechanism (not shown) are provided to movably couple the support column 2022 and the riser bracket. In some cases the support column 2022 and the riser bracket are movably coupled to provide a linear path of travel, though this is not required in all cases and curved paths of travel are contemplated. The generally vertical range of travel 2030 allows the positioning apparatus 2002 to move various items, including for example, the display 2004, laptop 2006, and keyboard tray 2025 relative to the support member 2010. Accordingly, the positioning apparatus 2002 can allow an operator to adjust the position of equipment relative to the support member 2010. Mounting the positioning apparatus 2002 to such a stationary support member (e.g., a work surface) can thus provide a multi-position workstation.

Figure 28A:
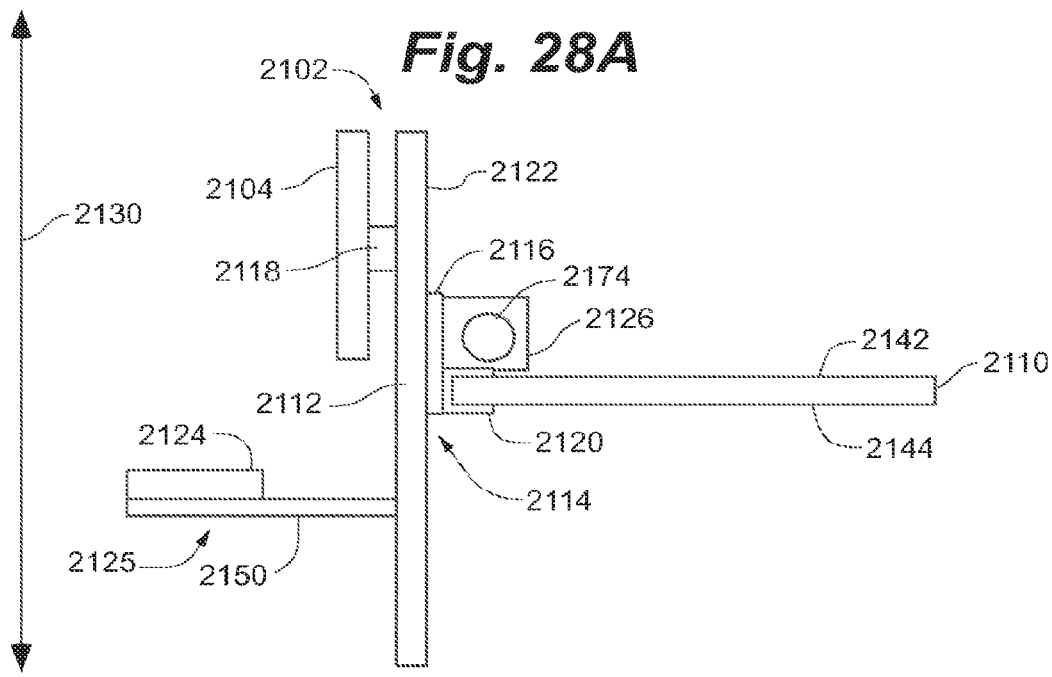
FIGS. 28A and 28B are side cross-sectional representations of a positioning apparatus and system in accordance with an embodiment of the invention.
Figure 28B:
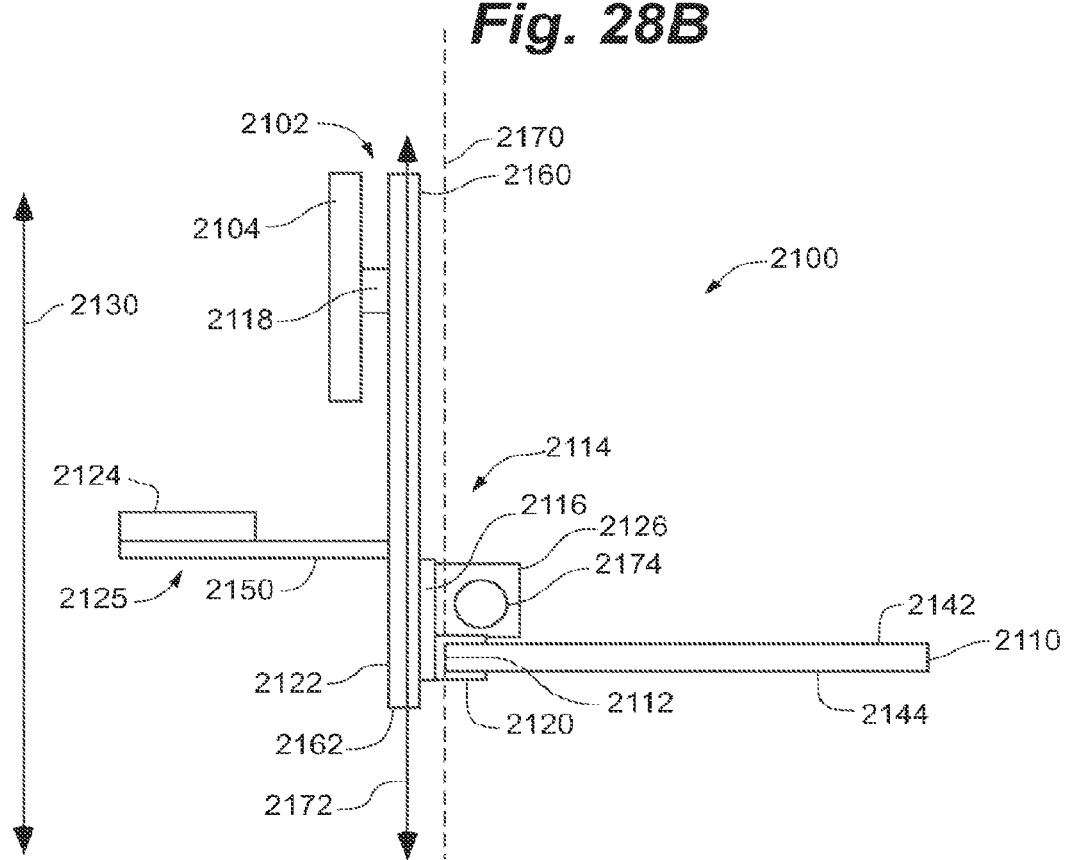

FIGS. 28A and 28B are schematic, side cross-sectional views of a system 2100 and positioning apparatus 2102 for positioning equipment such as a display 2104 and a keyboard 2124 in accordance with an embodiment of the invention. The system 2100 generally includes a support member 2110 with the positioning apparatus 2102 attached to the support member 2110. The positioning apparatus 2102 includes an attachment member 2120 that is configured to be removably or fixedly attached to the support member 2110 proximate an edge 2112 of the support member 2110.

The positioning apparatus 2102 includes a riser 2114 that is configured to provide the display 2104 and keyboard tray 2125 with vertical adjustability. The riser 2114 generally includes a bracket 2116 moveably coupled with a support column 2122, for example, via rollers and/or slides. The apparatus 2002 also includes an attachment member 2120 coupled to the riser 2114 and configured to attach the riser 2114 to the support member 2110. In this example, the bracket 2116 is coupled to the attachment member 2120, and thus remains stationary with respect to the support member 2110 while the support column 2122 is movable through a vertical range of travel 2130 relative to the bracket 2116, the attachment member 2120, and the support member 2110. The generally vertical range of travel 2130 allows the positioning apparatus 2102 to move various items, including the display 2104 and the keyboard tray 2125, relative to the support member 2110. Accordingly, the positioning apparatus 2102 can allow an operator to adjust the position of equipment relative to the support member 2110. Mounting the positioning apparatus 2102 to such a stationary support member (e.g., a work surface) can thus provide a multi-position workstation.

The positioning apparatus 2102 also includes a display mount 2118 configured to support the display 2104 and a keyboard tray 2125 configured to support a keyboard, similar in some respects to those shown in FIG. 2A. In this embodiment the display mount 2118 and keyboard tray 2125 are coupled to the support column 2122 and thus move with the column as it moves through the vertical range of travel 2130.

As shown in FIGS. 28A-28B, in some cases the display mount 2118 attaches directly to the support column 2122 and the keyboard tray 2125 is attached directly to the support column 2122 via an extension arm 2150. However, equipment can be coupled to the support column in any suitable manner and the invention is not limited in this regard. For example, one or more pieces of equipment may be coupled directly to the support column or through a secondary riser or lift mechanism (e.g., see FIGS. 30-31) and/or a common mounting frame (e.g., see FIGS. 35A-35E). In some cases a positioning apparatus includes a crossbar having various mounting structure (e.g., a display mount configured as a standard VESA connector) for mounting equipment to the riser 2114 (see, e.g., FIGS. 2A-2C, FIGS. 13A-B, and FIGS.

33, 34A-B). In some embodiments a common frame is configured to support both a display mount and a keyboard tray (and/or other equipment) in a spaced relationship, with the keyboard tray set apart from the display mount in order to allow an operator to comfortably use a keyboard on the tray while viewing a display mounted to the mount. For example, referring to FIG. 2A-2C, a keyboard tray 1012 may be attached to a common frame or mounting portion 1006 at a generally lower and more forward position (closer to the operator) than the display mount 1010.

Returning to FIGS. 28A-28B, the attachment member 2120 is configured to attach the riser 2114 and the positioning apparatus 2102 to the support member 2110 proximate the edge 2112 of the support member 2110. The attachment member 2120 can have a variety of configurations depending, for example, upon the type of support member 2110 and whether a removable or fixed attachment is desired. In some embodiments the attachment member 2120 includes a clamp for removably attaching the positioning apparatus 2102 about the front edge 2112 of the support member 2110. Many types of clamps can be used to removably couple the positioning apparatus to the support member 2110. As just a few examples, the attachment member 2120 may include the clamp 1020 described with respect to FIGS. 1A and 1B, or any of the clamps described with respect to FIGS. 7A-11. The attachment member 2120 may also or instead be fixedly attached to the support member 2110 with a more permanent type of fastener such as an adhesive and/or a screw/bolt, grommet, and/or mounting hole. For example, the attachment member 2120 may be fixedly attached to a top surface 2142 of the support member. In some cases the attachment member 2120 may also or instead be fixedly attached to a bottom surface 2144 of the support member.

The riser 2114 can be dimensioned to provide the positioning apparatus with a vertical range of travel 2130 of any desired length, thus allowing the support column 2122 to be moved through a wide range of heights. As will be appreciated, in cases where the support column 2122 is positioned at an angle with respect to the attachment member 2120 and support member 2110, the apparatus may also provide an amount of horizontal movement as the support column 2122 moves through the vertical range of travel 2130. For example, the support column 2122 may move both vertically and horizontally with respect to the attachment member 2120 as the support column moves through the vertical range of travel 2130.

In a preferred embodiment, the vertical range of travel 2130 extends between a sitting height and a standing height, thus allowing an operator to use the positioning apparatus from both a sitting position and a standing position. For example, in certain embodiments the vertical range of travel 2130 provides at least about 14 inches of vertical adjustment (e.g., the display/keyboard can be moved at least about 14 inches). In some embodiments the vertical range of travel provides between about 14 inches and about 24 inches of vertical adjustment. More than 24 inches of vertical adjustment may also be provided. A lift mechanism in the positioning apparatus may also provide multiple positions at intermediate heights (e.g., at an infinite number of heights) between the lowest and highest extents of the range of travel 2130, thus accommodating other working positions and/or operators of different heights. In some cases a discrete number of intermediate positions are provided. In some cases a lift mechanism provides an infinite number of intermediate positions within the vertical range of travel 2130.

Continuing with reference to FIGS. 28A and 28B, according to some embodiments, the vertical range of travel 2130 extends both above and below a surface of the support member 2110 (e.g., the top surface 2142 and/or the bottom surface 2144). As shown in FIG. 28B, in this case a first end 2160 of the support column 2122 extends above the support member 2110 when the support column 2122 is at an uppermost height along the range of travel 2130, while a second end 2162 of the support column 2122 extends below the support member 2110 when the support column 2122 is at a lowermost height along the range of travel 2130. In some embodiments, the first end 2160 remains above the top surface 2142 of the support member 2110 and the second end 2162 remains below the top surface 2142 as the support column 2122 moves throughout the vertical range of travel 2130.

According to some embodiments of the invention, the attachment of the positioning apparatus 2102 proximate to the front edge 2112 of the support member 2110 allows the support column 2122 to be positioned adjacent the support member 2110 while also extending both below and above the support member 2110. The movable coupling between the bracket 2116 and the support column thus advantageously allows the support column 2122 to move through a vertical range of travel 2130 that extends both below and above the support member 2110.

Referring to FIG. 28B, the edge 2112 of the support member 2110 defines a vertical edge plane 2170, which in this case is perpendicular to the top surface 2142 of the support member. In some cases the vertical edge plane 2170 separates movement of the support column from the support member. For example, as the support column 2122 moves through the vertical range of travel 2130 it follows a path of travel 2172 that is located opposite the vertical edge plane 2170 from the support member 2110. For example, the path of travel 2172 may be substantially vertical and parallel to the vertical edge plane 2170. In other cases the path of travel may be angled, but limited in length such that it does not intersect the vertical edge plane 2170. In some cases, though, the support column 2122 follows a path of travel that intersects the vertical edge plane. For example, the support column 2122 may be movably coupled to the attachment member 2120 at an angle, so that the support column 2122 moves toward the support member 2110 as it also moves up and away from the support member 2110 as it also moves down.

According to some embodiments, a lift mechanism is provided that movably couples the support column 2122 and the bracket 2116. The lift mechanism can provide an operator with a degree of assistance to move the support column 2122 through the range of travel 2130. For example, in some embodiments an energy storage member such as an extension spring provides a biasing force that aids an operator in adjusting the height of the support column 2122.

In some cases, a lift mechanism includes a balance mechanism incorporating an energy storage member that can counterbalance some or all of the weight of an electronic display and/or other equipment supported by the support column 2122. As just one example, a lift mechanism can incorporate a cam 2174 (e.g., a rotary cam) that is coupled to the energy storage member and the bracket 2116 with one or more tension members (e.g., a line, cable, rope, chain, etc., not shown in FIGS. 28A-B).

FIG. 28C illustrates a schematic, cross-sectional representation of the positioning apparatus 2102 with an integrated balanced lift mechanism 2180 according to an embodiment of the invention. The balanced lift mechanism 2180 includes an extension spring 2182 that provides lift assistance for moving the support column 2122 relative to the support member 2110, and a cam 2174 that balances the varying force created by the extension spring 2182. A first tension member 2184 (sometimes referred to herein as a flexible element) is connected between the support column 2122 and a wheel 2186. The wheel 2186 rotates with the cam 2174 within the cam housing 2126. As the support column moves down relative to the cam housing 2126, the first tension member 2184 rotates the wheel 2186 and the cam 2174 clockwise as shown in FIG. 28C. As the cam rotates, it pulls a second tension member 2188 coupled to the extension spring 2182, which provides a force countering the downward movement of the support column 2122. Directional pulleys 2190 fixed to the bracket 2116 guide the first and the second tension members along with a pulley 2192 fixed to the support column 2122. When moving the support column upward, the tension members, wheel, and cam move in opposite directions and the extension spring contracts, providing a force assisting the support column's upward movement. In some cases a weight adjustment screw 2194 can tighten or loosen the extension spring 2182 for lifting different sized loads.

One example of a lift/balance mechanism 116 that can be configured for use with embodiments of the present invention is described with respect to FIGS. 14-26. FIGS. 14-26 illustrate a variation in which the riser is configured such that the support column is attached or fixed to a base that remains stationary with respect to a support surface, while a bracket or movable portion 150 is movable through a vertical range of travel relative to the support column, base, and support surface. In some cases, such as with the embodiment illustrated in FIGS. 28A-28B, the movable portion 150 may instead be attached or fixed relative to the support surface with the support column being movable relative to the support surface. Another example of a balanced lift mechanism that can be configured for use with embodiments of the present invention is described with respect to FIGS. 14-18 in presently co-owned U.S. Patent Application Publication US 2006/0185563 A1, filed Sep. 28, 2005, the entire contents of which is incorporated by reference herein.

While a few examples of possible configurations for a lift/balance mechanism are described herein, it should be appreciated that a wide variety of lift mechanisms and/or balanced lift mechanisms can be used to movably couple the support column 2122 with the attachment member 2120 to provide the vertical range of travel 2130 and that the scope of the invention is not limited to a particular lift configuration. For example, in some cases a lift mechanism includes a telescoping configuration (e.g., see FIGS. 36A-36D). In some cases the lift mechanism includes a rotary cam coupled with an energy storage member such as an extension spring, a compression spring, a torsion spring, or a spiral spring. In some cases the lift mechanism includes a constant force spring and/or a gas spring.

According to some embodiments, the lift mechanism may be provided according to embodiments described in one or more of presently co-owned US Patent Application Publication US 2008/0026892 A1, filed Jul. 26, 2007; US Patent Application Publication US 2007/0259554 A1, filed May 4, 2007; U.S. Pat. No. 6,997,422, filed Aug. 20, 2003; U.S. Pat. No. 7,506,853, filed Nov. 3, 2004; and U.S. Pat. No. 6,994,306, filed Nov. 28, 2000. The entire disclosure of each of the above-mentioned patents and patent applications is hereby incorporated by reference herein.

According to some embodiments of the invention, methods for positioning an electronic display and a keyboard are provided. In one example, a method includes selecting a support member having a generally planar surface (e.g., horizontal or inclined) and attaching a positioning apparatus to the support member proximate the edge of the support member. In some cases the attachment is about the edge of the support member. The positioning apparatus can have a riser with a bracket and a support column movably coupled together, an attachment member coupled to the riser and configured to attach the riser proximate the edge of the support member, a display mount coupled to the riser, and a keyboard tray coupled to the riser. After being attached to the support member, the bracket and the support column are movably coupled through a vertical range of travel relative to the support member. The method further includes supporting the electronic display with the display mount, supporting the keyboard with the keyboard tray, and moving the electronic display and the keyboard relative to the support member within the vertical range of travel. In some cases the movement includes moving the electronic display and the keyboard relative to the support member between a sitting position and a standing position and/or moving the electronic display simultaneously with the keyboard.

In some cases a method for positioning an electronic display and a keyboard includes selecting an existing support member having a generally horizontal, planar surface and providing a positioning apparatus, such as one of the apparatuses described herein. The method further includes attaching the positioning apparatus to the support member, supporting the electronic display with the display mount, supporting the keyboard with the keyboard tray, and moving the support column between a sitting position and a standing position relative to the support member. In some cases the method may also include moving the electronic display simultaneously with the keyboard and/or with respect to the keyboard. In some cases the method includes adjusting an angle of the keyboard and/or the electronic display relative to the support member and/or attaching the positioning apparatus about an edge of the support member.

Figure 29:
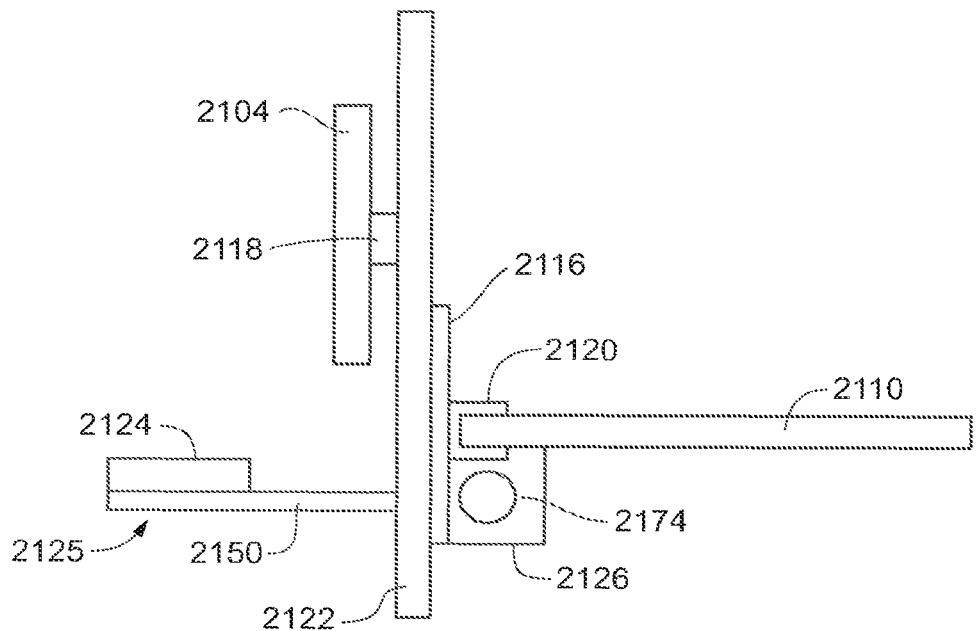
FIG. 29 is a side cross-sectional representation of a positioning apparatus and system in accordance with an embodiment of the invention.

In some embodiments one or more parts of a lift/balance mechanism can be incorporated into and/or positioned within one or more portions of the positioning apparatus. For example, referring to FIGS. 28A and 28B, in some cases a portion of the balance mechanism such as the cam 2174 may be positioned within a cam housing 2126 external to the support column 2122. The cam housing 2126 can be positioned in any convenient or suitable placement. As shown in FIGS. 28A-28B, in some cases the cam housing 2126 is attached to the bracket 2116 adjacent the attachment member 2120 and on top of the support member 2110. Turning to FIG. 29, in some cases the cam housing 2126 is attached to the bracket 2116 and instead positioned below the support member 2110. As will be discussed further herein, in some cases the riser support column may remain stationary with respect to the support member and the cam housing is attached to the support column. See, for example, FIGS. 35A-35E. The cam housing can also be located adjacent to the support member (e.g., FIGS. 28A-29), or in some cases may be positioned more remotely, such as in the examples shown in FIGS. 35A-35E. In further examples, the cam housing may be attached to the movable portion of the riser, such as the support column in FIGS. 32A-32B, 39B, 39D, and 40A-40B.

In some cases one or more parts of a lift/balance mechanism may also be located at least partially within the riser support column. For example, FIGS. 14-18 illustrate some cases in which an energy storage member, one or more direction changing pulleys, and/or a flexible element such as a rope, wire, line, or other tensioning member are located within the support column. It should be appreciated that numerous arrangements of the lift/balance mechanism are possible, including in which the lift mechanism is located partially within the support column and partially external to the support column, at least partially within a cam housing external to the support column, and/or attached to the support column. In addition, the cam may be positioned within the attachment member.

Figure 30A:
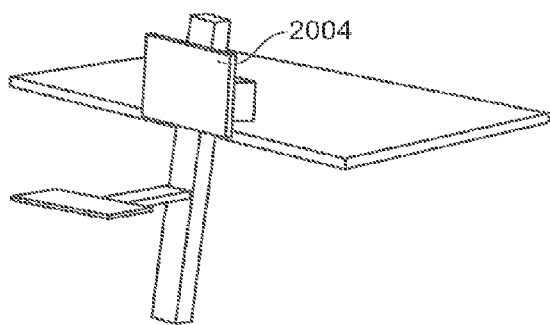
FIGS. 30A-D are perspective representations of multiple positioning apparatuses and systems having different equipment configurations in accordance with embodiments of the invention.
Figure 30B:
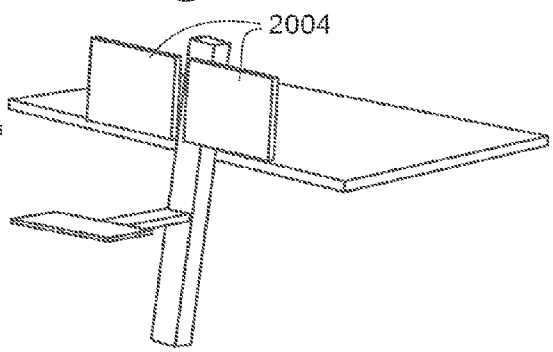
Figure 30C:
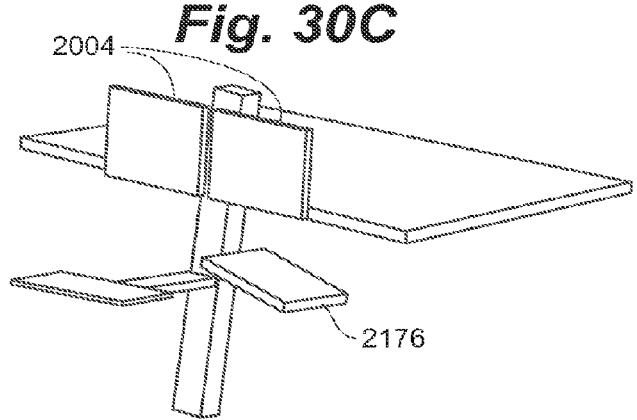
Figure 30D:
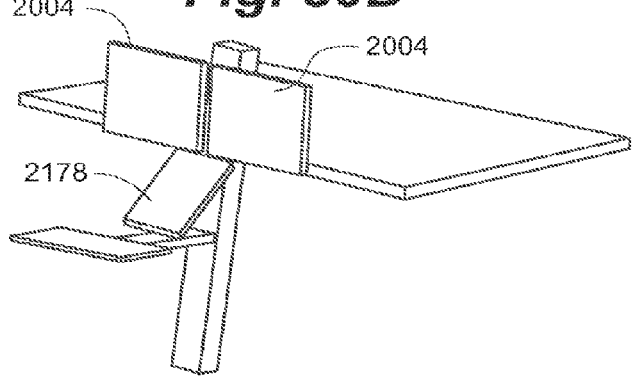

As shown in FIGS. 27A and 27B, some preferred embodiments of the positioning apparatus 2002 include a mounting configuration configured to support the electronic display 2004, the laptop 2006, and the keyboard tray 2025. It should be appreciated that a number of optional and/or alternative mounts and supports for attaching and otherwise supporting equipment and other items can be included. FIGS. 30A-30D provide just a few examples of other combinations of equipment that can be supported by a positioning apparatus. For example, referring to FIGS. 30A-30B, any number of displays such as one, two, three or more displays can be mounted on a positioning apparatus, with or without a laptop. As shown in FIG. 30C, some positioning apparatuses may include a fixed and/or movable tray, work surface, or platform 2176. As shown in FIG. 30D, some positioning apparatuses may include a document holder 2178. Of course a wide variety of pieces of equipment can be supported by a positioning apparatus, including without limitation, an electronic display mount, a keyboard tray, a mouse tray, a document holder, a movable work surface, and a telephone holder, among others.

Some embodiments of the invention can provide positioning apparatuses that include one or more display mounts without a keyboard tray. For example, any of the positioning apparatuses described herein that include both display mounts and keyboard trays may be configured with only a display mount and no keyboard tray. Such a configuration can be useful for situations requiring information display but not input, or for situations in which the display also acts as an input device. For example, a positioning apparatus may not include a keyboard tray, but can include a display mount that enables use of a touch sensitive display. Such a configuration can provide height adjustability for the display through the vertical range of travel without needing additional space for a keyboard tray.

Figure 31A:
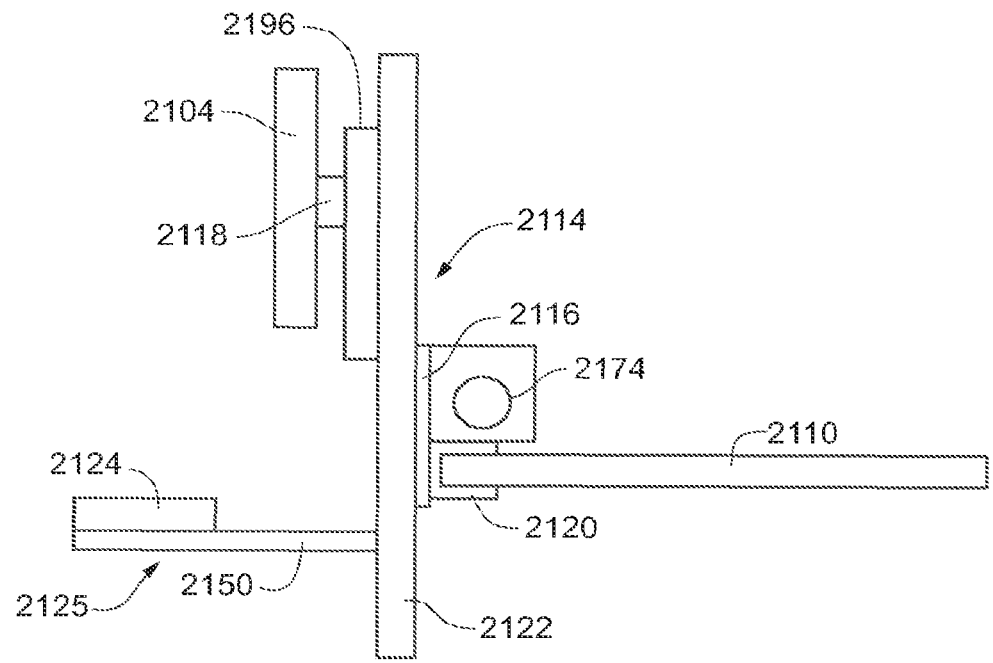
FIG. 31A is a side cross-sectional representation of a positioning apparatus and system with a second lift mechanism in accordance with an embodiment of the invention.

According to some embodiments, the positioning apparatus may provide one or more degrees of additional adjustability for attached equipment. Turning to FIG. 31A, in some embodiments a secondary lift mechanism 2196 (e.g., within a secondary riser) may be coupled between the display mount 2118 and the support column 2122 to provide the display mount 2118 with additional vertical adjustability with respect to the support column 2122 and the keyboard tray 2125. Secondary lift mechanisms may also movably couple one or more other types of mounting devices to the riser 2114 in any desired combination. For example, the secondary lift mechanism 2196 may couple multiple display mounts, a notebook tray, a keyboard tray, a work surface, a document holder, and/or a telephone holder to the support column 2122. FIG. 6 illustrates one example of a secondary lift mechanism 1022 that provides an adjustable range of travel for a display mount (and an attached electronic display) to be moved vertically relative to the keyboard tray. The secondary lift mechanism 1022, also sometimes referred to as a display lift mechanism, can be useful for providing monitor/keyboard arrangements for differently sized operators.

Figure 31B:
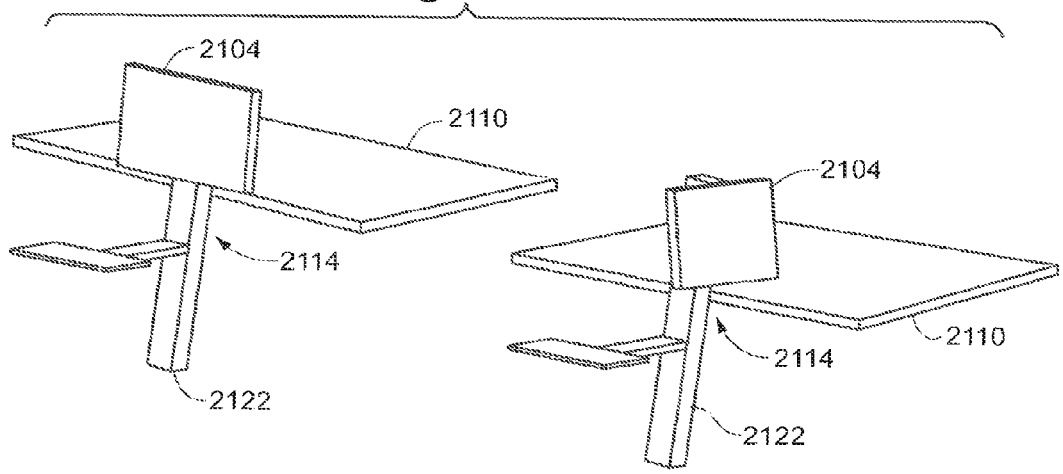
FIG. 31B are side cross-sectional representations of a positioning apparatus and system with swiveling capability in accordance with an embodiment of the invention.

Referring to FIG. 31B, according to some embodiments a display 2104 may be coupled to the riser 2114 with a rotation or swivel mechanism. For example, the display mount 2118 may include or be coupled with a swivel mechanism that allows the display 2104 to be swiveled generally about the axis of the support column 2122. Any degree of swivel may be provided (e.g., between about 0 degrees and 180 degrees, or between about 0 degrees and about 360 degrees).

Figure 31C:
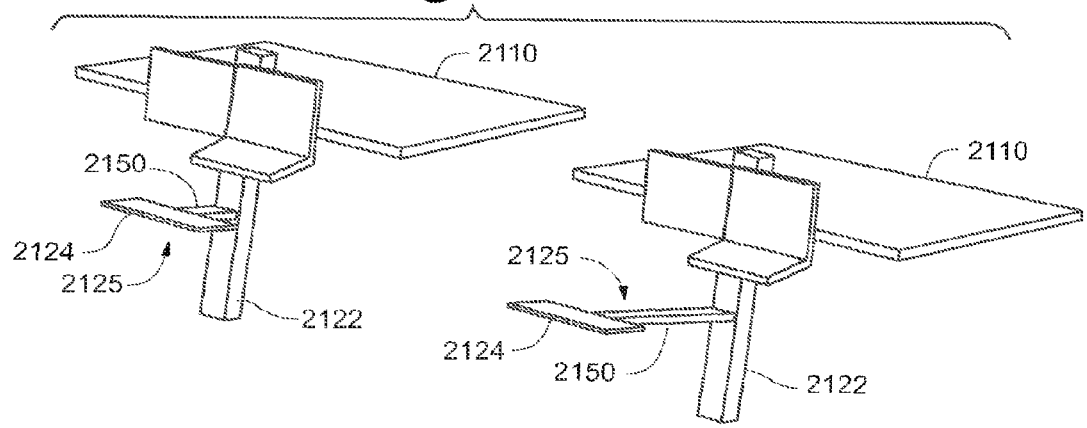
FIG. 31C are side cross-sectional representations of a positioning apparatus and system with an extendible keyboard tray in accordance with an embodiment of the invention.

Referring to FIG. 31C, in some embodiments the keyboard tray 2125 is coupled to the support column 2122 with an extension arm 2150. The extension arm 2050 can have any suitable configuration and shape. In some cases the extension arm 2150 includes an adjustable extension mechanism that allows the keyboard tray 2125 to be supported and also moved along a horizontal range of travel with respect to the support column 2122. Such adjustability can provide increased comfort for an operator by positioning the keyboard tray 2125 (and the keyboard 2124 supported on the tray) at an optimum distance from and more ergonomic relationship to the position of an attached electronic display. A number of mechanisms can be used to provide horizontal adjustability, including for example, drawer slides.

In addition, the keyboard tray 2125 may be coupled to the riser 2114 with a tilt mechanism (e.g., as shown in FIG. 3) that allows an operator to adjust the tilt of the keyboard tray 2125 relative to the attachment member 2120 and the support member 2110. In some embodiments the equipment mount also or alternatively includes a folding mechanism that allows the keyboard tray 2125 to be folded closer to the support column 2122 and the attachment member 2120. A folding mechanism can thus allow an operator to reduce the overall size of the positioning apparatus by folding the keyboard tray away when not in use. In some embodiments the tilt mechanism includes a hinge with a generally horizontal axis. Such a hinge may be provided with a friction mechanism.

Figure 32A:
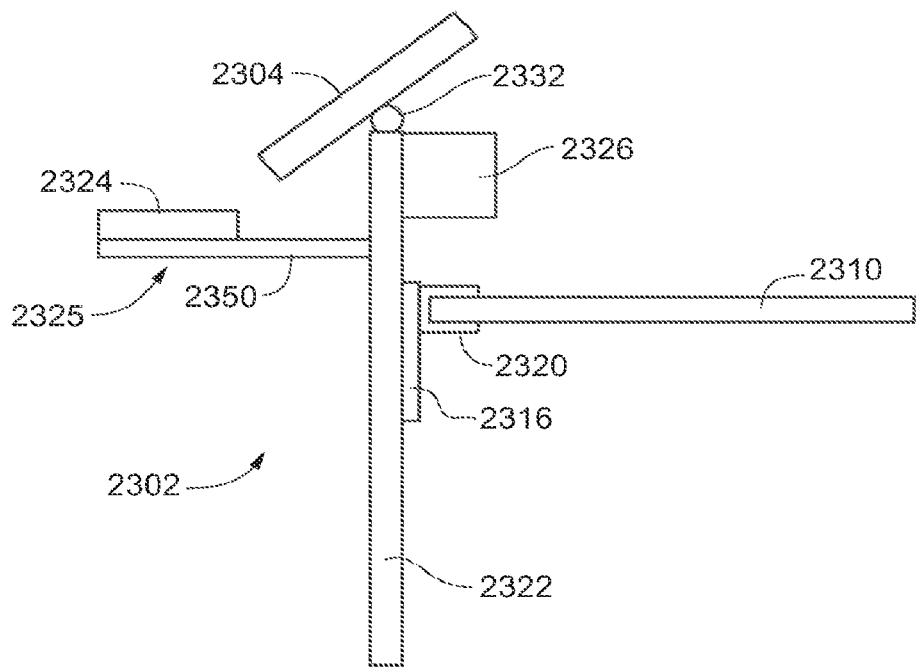
FIG. 32A-B are side cross-sectional representations of positioning apparatuses and systems including tilt functionality in accordance with an embodiment of the invention.
Figure 32B:
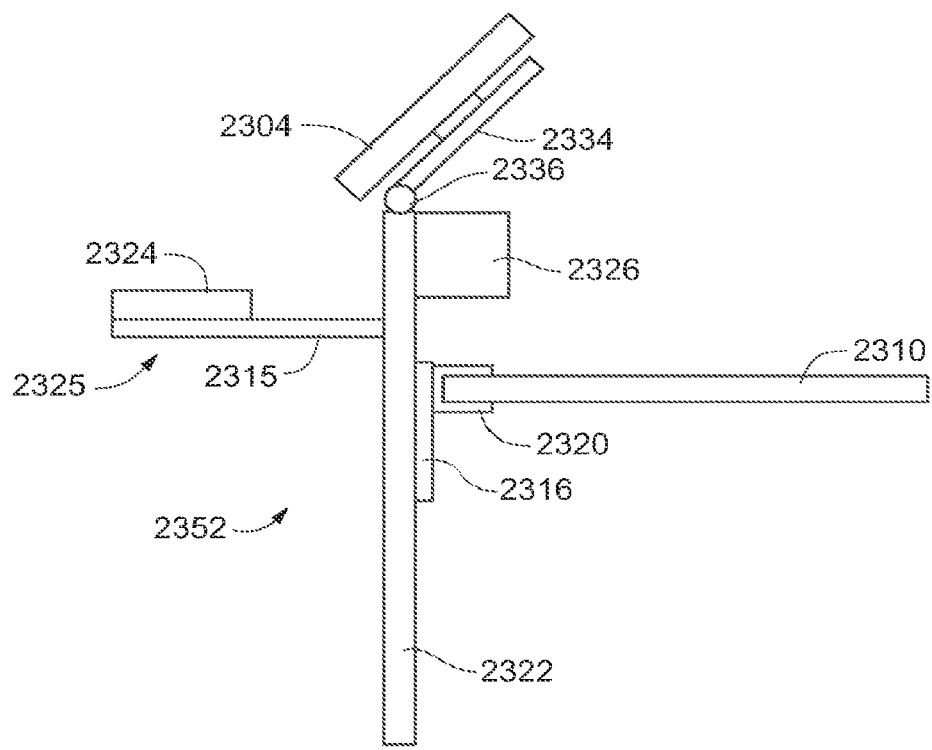

Turning to FIG. 32A, in some embodiments a positioning apparatus 2302 is provided with a tilt mechanism for tilting a display 2304 relative to the riser 2314 (e.g., relative to the support column 2322). For example, in some cases a tilt mechanism 2332 may couple the display 2304 with the support column 2322 as shown in FIG. 32A. Turning to FIG. 32B, in some cases a positioning apparatus 2352 includes a display 2304 that is mounted to an independent riser or lift mechanism portion 2334 of the support column 2322, which in turn is coupled to the support column 2322 with an inline tilt mechanism 2336. This configuration can provide an inline tilt in which the axis of rotation/tilt is located proximate to one end of the display rather than centered on the display 2304.

The tilt mechanism 2332 can be any suitable tilt mechanism, and in some cases may include a counterbalanced spring system (e.g., a torsion spring mechanism), a gravity tilt mechanism, a friction tilt mechanism, or a ball and socket mechanism, among other possibilities. U.S. Pat. No. 6,997, 422, filed Aug. 20, 2003; U.S. Pat. No. 7,252,277, filed Jan. 17, 2004; and US Patent Application Publication US 2006/ 0185563 A1, filed Sep. 28, 2005, provide examples of possible tilt and rotation mechanisms, the entire disclosure of each of which is hereby incorporated herein by reference.

Figure 33:
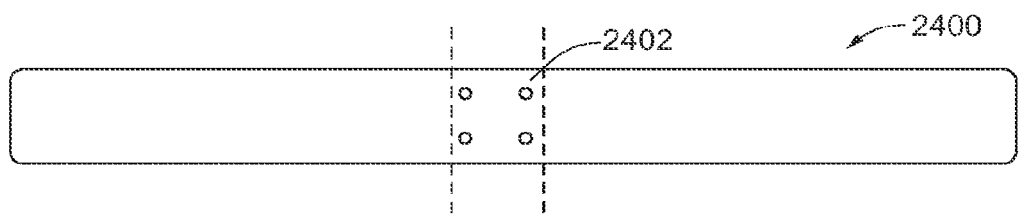
FIGS. 33 and 34A-B are elevation views of crossbars in accordance with embodiments of the invention.

As discussed elsewhere herein, some embodiments of the invention provide a positioning apparatus with one or more crossbars for mounting multiple pieces of equipment to a riser. Some examples of a crossbar are discussed, for example, with respect to FIGS. 2B-2C and FIGS. 13A-13B. FIG. 33 is an elevation view of another crossbar 2400 according to an embodiment of the invention. The crossbar 2400 is generally configured as an elongated arm with a riser mounting portion 2402, in this case positioned centrally along the crossbar 2400. One or more displays or other types of equipment may be mounted directly to the crossbar 2400 or indirectly with a suitable coupling mechanism.

Figure 34A:
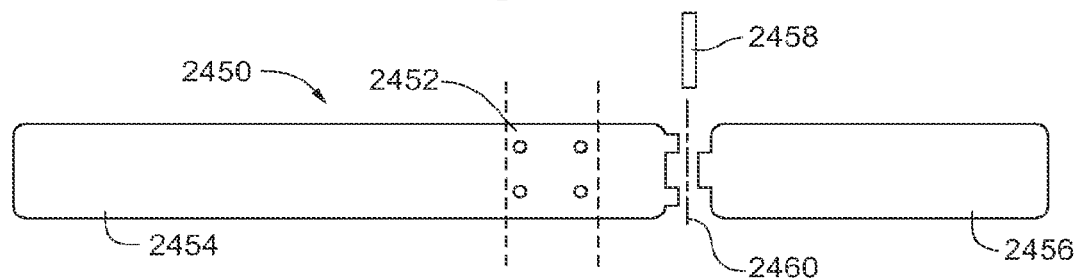
Figure 34B:
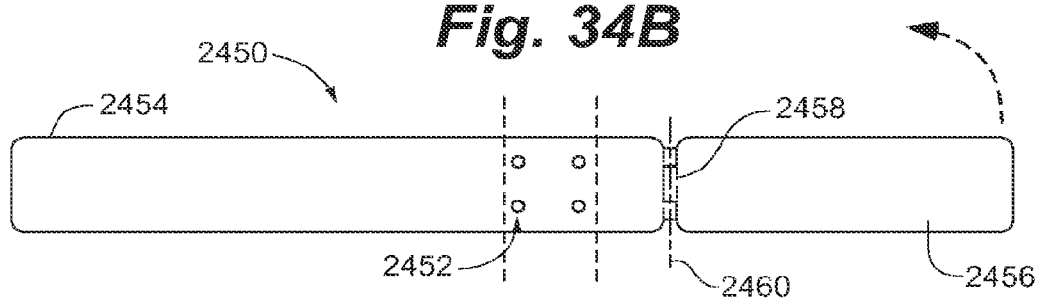

FIGS. 34A-34B are elevation views of another crossbar 2450 that can be used to support one or more pieces of equipment upon a positioning apparatus. The crossbar 2450 is configured as an elongated arm assembly with a riser mounting portion 2452 that includes four bolt holes for mounting the crossbar 2450 to a riser. The arm assembly includes a first stationary portion 2454 that remains stationary with respect to the riser mounting portion 2452, and a movable portion 2456 that is coupled to the stationary position with a pin 2458. The movable portion 2456 rotates at one end about an axis 2460 located at the pin 2458. Thus a display or other piece of equipment mounted to the movable portion 2456 of the arm assembly can be moved (i.e., panned) with respect to the stationary portion 2454 of the arm assembly. The movable portion can be provided on the left side or the right side of the riser.

As discussed with respect to FIGS. 28A-38B, in some cases an attachment member 2120 couples a riser 2114 to the support member 2110 such that the riser bracket 2116 remains stationary while the riser support column 2122 is movable with respect to the support member 2110. Turning to FIGS. 35A-35E, in some embodiments a riser is coupled to the support member such that the riser bracket moves while the riser support column remains stationary.

Figure 35A:
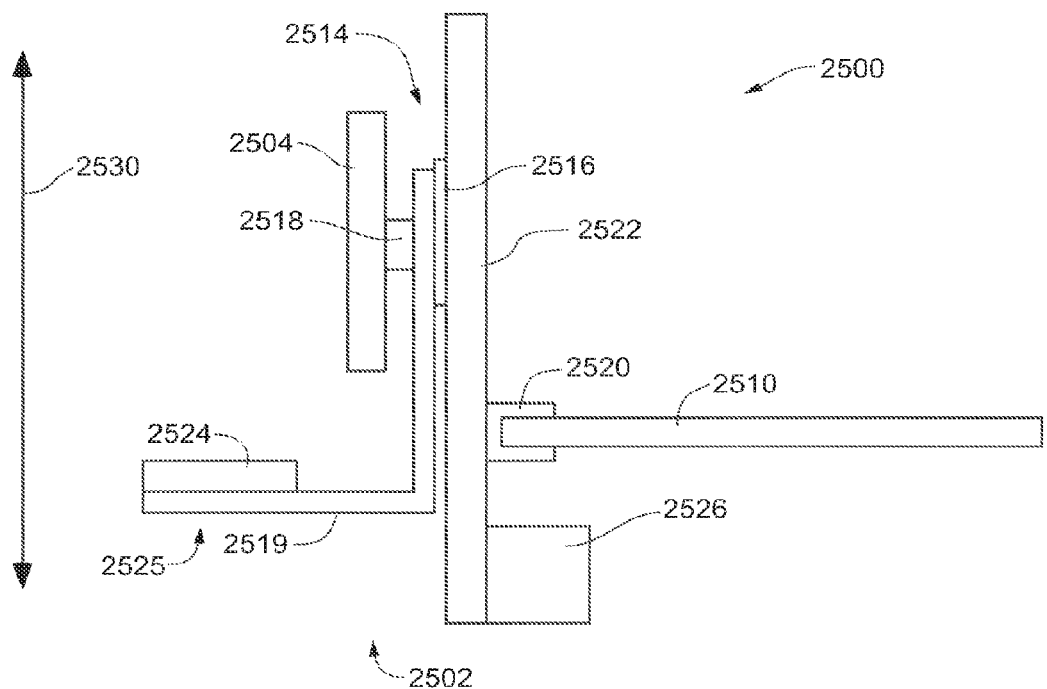
FIGS. 35A-B are side cross-sectional representations of a positioning apparatus and system in accordance with embodiments of the invention.
Figure 35B:
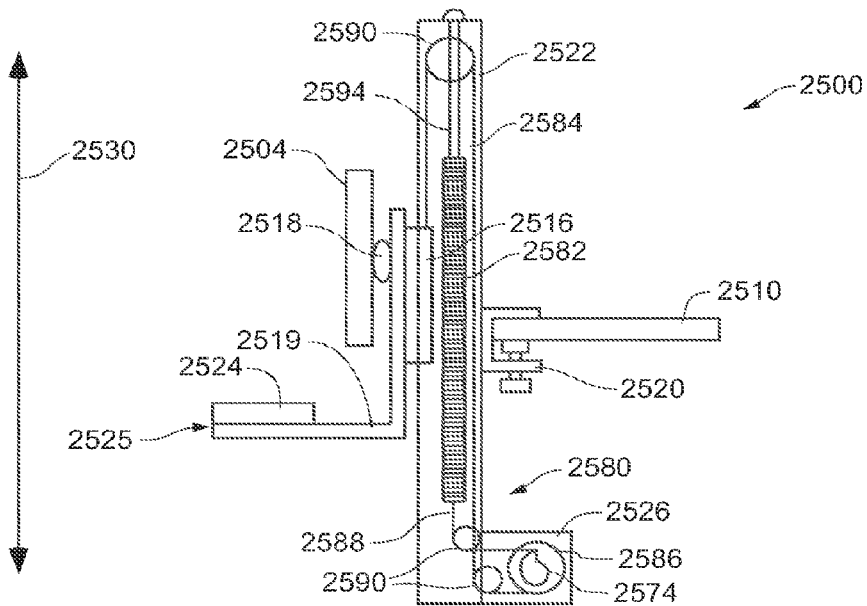

FIG. 35A is a schematic cross-sectional representation of a positioning system 2500 and apparatus 2502 in accordance with another embodiment of the invention. FIG. 35B illustrates a schematic representation of the positioning apparatus 2502 with an integrated balanced lift mechanism 2580 according to an embodiment of the invention. The positioning apparatus 2502 includes a riser 2514 that is configured to provide a display 2504 and a keyboard tray 2525 with vertical adjustability. The riser 2514 generally includes a bracket 2516 moveably coupled with a support column 2522, for example, via rollers and/or slides. The apparatus 2502 also includes an attachment member 2520 coupled to the riser 2514 and configured to attach the riser 2514 to the support member 2510. In this example, the support column 2522 is coupled to the attachment member 2520, and thus remains stationary with respect to the support member 2510 while the bracket 2516 is movable through a vertical range of travel 2530 relative to the support column 2522, the attachment member 2520, and the support member 2510.

The generally vertical range of travel 2530 allows the positioning apparatus 2502 to move various items, including the display 2504 and the keyboard tray 2525, relative to the support member 2510. Accordingly, the positioning apparatus 2502 can allow an operator to adjust the position of equipment relative to the support member 2510. Mounting the positioning apparatus 2102 to such a stationary support member (e.g., a work surface) can thus provide a multi-position workstation.

The positioning apparatus 2502 also includes a display mount 2518 (e.g., optionally including a tilt, rotate, swivel, or other adjustment mechanism) configured to support the display 2504 and a keyboard tray 2525 configured to support a keyboard 2524, similar in some respects to those shown in FIG. 2A. In this embodiment the display mount 2518 and keyboard tray 2525 are coupled to a common mounting frame 2519, which in turn is coupled to the riser bracket 2516, allowing the display and keyboard to move with the bracket 2516 through the vertical range of travel 2530. The mounting frame 2519 may be configured in any desirable form that is useful for locating equipment (e.g., the display and the keyboard) relative to a user. In some embodiments the mounting frame 2519 has similarities to the frame discussed with respect to FIGS. 1A and 1B.

Continuing with reference to FIG. 35B, as with some other embodiments, the positioning apparatus 2502 includes a balanced lift mechanism 2580 that movably couples the support column 2522 and the bracket 2516. The balanced lift mechanism 2580 includes an extension spring 2582 that provides lift assistance for moving the bracket 2516 relative to the support member 2510, and a cam 2574 that balances the varying force created by the extension spring 2582. A first tension member 2584 is connected between the bracket 2516 and a wheel 2586. The wheel 2586 rotates with the cam 2574 within the cam housing 2526. As the support column moves down relative to the cam housing 2126, the first tension member 2584 rotates the wheel 2584 and the cam 2574 clockwise. As the cam rotates, it pulls a second tension member 2588 coupled to the extension spring 2582, which provides a force countering the downward movement of the support column 2522. Directional pulleys 2590 fixed to the support column 2522 guide the first and the second tension members. When moving the support column upward, the tension members, wheel, and cam move in opposite directions and the extension spring contracts, providing a force assisting the support column's upward movement. In some cases a weight adjustment screw 2594 can tighten or loosen the extension spring 2582 for lifting different sized loads.

An example of a lift/balance mechanism 116 that can be used is described with respect to FIGS. 14-26. Another example of a balanced lift mechanism that can be configured for use with embodiments of the present invention is described with respect to presently co-owned U.S. Patent Application Publication US 2006/0185563 A1, filed Sep. 28, 2005. According to some embodiments, the lift mechanism may be provided according to embodiments described in one or more of presently co-owned US Patent Application Publication US 2008/0026892 A1, filed Jul. 26, 2007; US Patent Application Publication US 2007/0259554 A1, filed May 4, 2007; U.S. Pat. No. 6,997,422, filed Aug. 20, 2003; U.S. Pat. No. 7,506,853, filed Nov. 3, 2004; and U.S. Pat. No. 6,994,306, filed Nov. 28, 2000. The entire disclosure of each of the above-mentioned patents and patent applications is hereby incorporated by reference herein. While a few examples of possible configurations for a lift/balance mechanism are described herein, it should be appreciated that a wide variety of lift mechanisms and/or balanced lift mechanisms can be used.

Figure 35C:
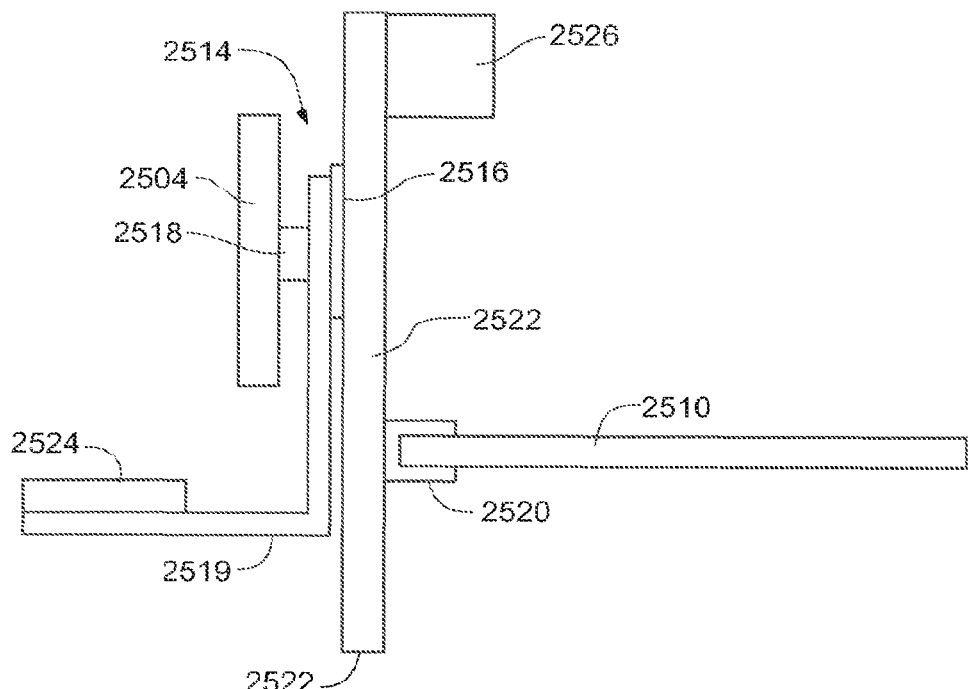
FIGS. 35C-D are side cross-sectional representations of a positioning apparatus and system in accordance with embodiments of the invention.
Figure 35D:
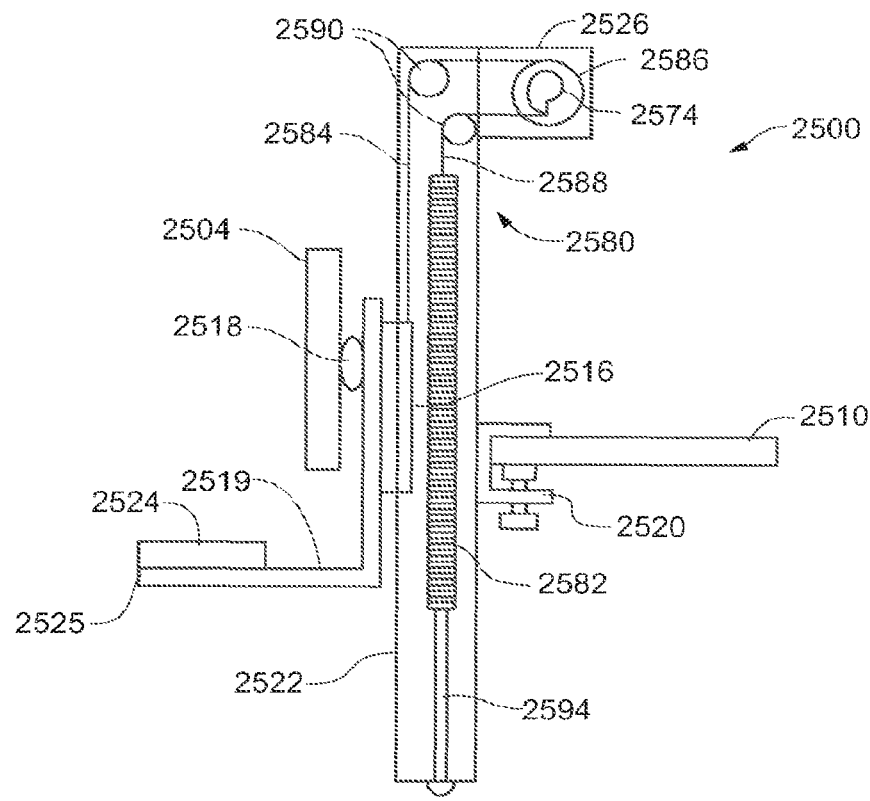
Figure 35E:
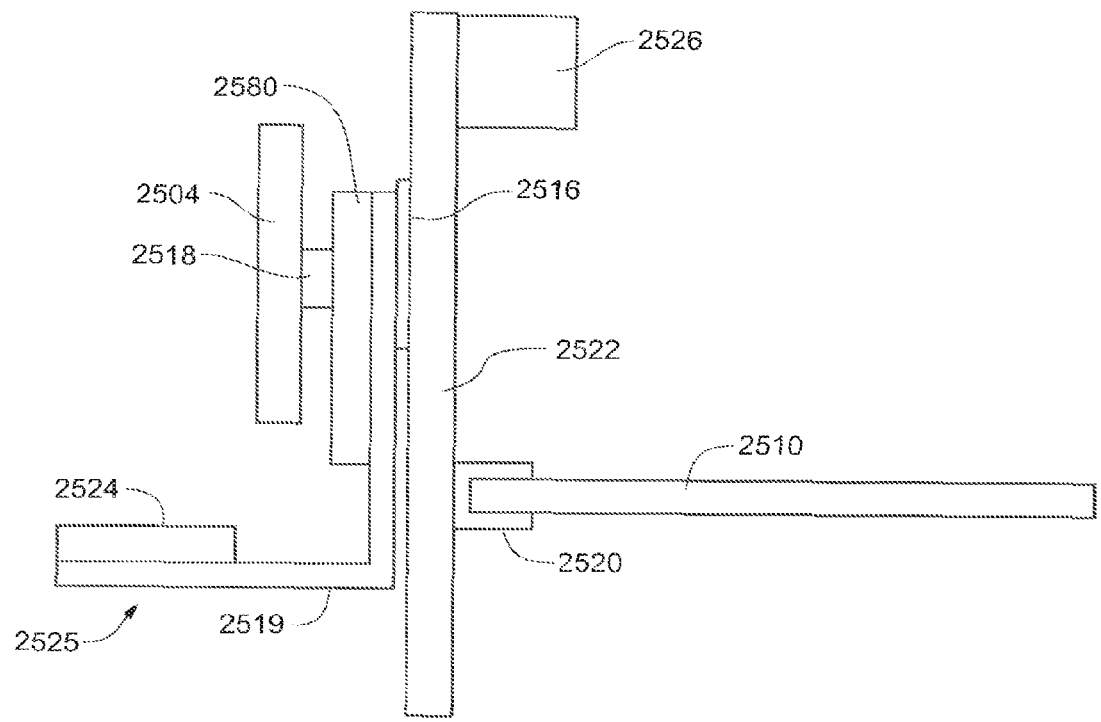
FIG. 35E is a side cross-sectional representation of a positioning apparatus and system in accordance with embodiments of the invention.

FIGS. 35C-35D and 35E illustrate variations of the positioning apparatus 2502 including an alternate position for the cam housing 2526 (FIG. 35C-D) and a secondary lift mechanism 2580 (FIG. 35E). Of course other variations in the configuration of the positioning apparatus 2502 are also contemplated depending upon desired functionality options.

FIG. 36A is a schematic, cross-sectional view of a positioning apparatus 2602 according to another embodiment of the invention. The positioning apparatus 2600 can include components and provide functionality similar in some aspects to other embodiments described herein. As shown, the positioning apparatus 2602 includes a telescoping riser 2614 that is configured to provide a display 2604 and a keyboard tray 2025 with vertical adjustability relative to the support member 2610.

The telescoping riser generally includes a first member that is slidingly received within a second member. As illustrated, the telescoping riser 2614 includes a support column 2622 and a bracket 2623 configured to receive the support column 2622 in a sliding engagement. The telescoping riser 2614 is attached to the support member 2610 via the attachment member 2620, and the support column 2622 and the bracket 2623 are movably coupled through a generally vertical range of travel 2630 relative to the support member 2610. For example, in some cases rollers, slides, and optionally a lift mechanism (e.g., any of those discussed herein) are provided to movably couple the support column 2622 and the bracket 2623. In this embodiment the bracket 2623 is attached to the support member 2610 via the attachment member 2620, and the support column 2622 moves relative to the bracket 2623 and support member 2610. However, in some embodiments the orientation of the riser 2614 may be rotated 180 degrees with the support column 2622 attached to the support member 2610 and the bracket 2623 moving relative to the support member.

FIG. 36B illustrates a schematic representation of a balanced lift mechanism 2680 that movably couples the support column 2622 and the bracket 2626. The balanced lift mechanism 2680 includes an extension spring 2682 that provides lift assistance for moving the support column 2622 relative to the support member 2610. The lift mechanism 2680 also includes a cam 2674 that balances the varying force created by the extension spring 2682. A first tension member 2684 is connected between the support column 2622 and a wheel 2686. The wheel 2686 rotates with the cam 2674 within the cam housing 2626 attached to the bracket. As the support column moves down relative to the bracket 2623 and the support member 2610, the first tension member 2684 rotates the wheel 2686 and the cam 2674 clockwise. As the cam rotates, it pulls a second tension member 2688 coupled to the extension spring 2682, which provides a force countering the downward movement of the support column 2622. Directional pulleys 2690 fixed to the bracket 2623 and a directional pulley 2692 fixed to the support column 2622 guide the first and the second tension members. When moving the support column upward, the tension members, wheel, and cam move in opposite directions and the extension spring contracts, providing a force assisting the support column's upward movement. In some cases a weight adjustment screw 2694 can tighten or loosen the extension spring 2682 for lifting different sized loads.

FIGS. 36C-36D illustrate a variation of the positioning apparatus 2602 including an alternate position for the cam housing 2626 directly beneath the support member 2610. Of course other variations in the configuration of the positioning apparatus 2602 are also contemplated depending upon desired functionality options.

FIG. 37A is a perspective view of a positioning system 2700 and an apparatus 2702 in accordance with an embodiment of the invention. The system 2700 includes the positioning apparatus 2702 attached to a support member 2710. According to some embodiments of the invention, the support member 2710 is configured as a mounting platform shaped and dimensioned to receive the attachment member 2720 of the positioning apparatus 2702. The mounting platform has a generally planar, horizontal surface 2742 and one or more edges. For example, in some cases the mounting platform may be a bracket or brace, or other framework including a planar surface and one or more edges for coupling with the attachment member 2720. In some cases the support member 2710 is horizontal and substantially parallel to a floor. In certain embodiments, however, the positioning apparatus 2702 may be configured to be attached to a slightly inclined support member. As shown, the support member may be relatively narrow (e.g., having a depth of between about 3 and about 20 inches). When such a narrow support member is positioned proximate a wall and the apparatus is attached to its front edge, it allows the system to be relatively flush with one or more adjacent work surfaces 2760, 2762.

According to some embodiments, the system 2700 includes a wall 2750 to which the support member 2710 is attached. For example, the support member 2710 may be attached to and supported by any wall providing a sufficient level of structural integrity and load bearing capacity for the positioning apparatus 2702. In some embodiments, the wall 2750 may be a portion of a cubicle or other temporary office space. The support member 2710 may be attached to the wall 2750 by any suitable mounting mechanism, including hooks, fasteners, brackets, braces, etc. Referring to FIG. 37B, in some embodiments a system 2800 includes a wall 2850 with several partitions 2852 or segments that are assembled and held together by vertical support bars 2854. In some cases a support member 2810 may be configured to attach to one, two, or more vertical support bars 2854. Referring again to FIG. 37A, in some cases one or more adjacent work surfaces 2760, 2762 may also provide sufficient mounting structure for securing the support member 2710 between the work surfaces via, e.g., clamps, brackets, framing or the like.

Although not depicted herein, in some embodiments the positioning apparatus 2702 may couple directly to the wall 2750 without the need for a separate, distinct support member. In some cases the support column or riser bracket of the riser 2714 may couple directly to the wall 2750 through the use of one or more clamps, brackets, hooks, or other fastening mechanisms known in the art. For example, in some cases a first or top end 2761 of the support column may include a clamp that can attach about a top edge 2773 of the wall such that the positioning apparatus hangs from the top edge adjacent the wall 2750. In another example, the support column or the riser bracket may be attached directly to surface of the wall 2750, or to one or more of the vertical support bars 2854.

According to some embodiments, a positioning apparatus is provided with a movable work surface in addition to or instead of a variety of other equipment options. For example, referring to FIGS. 38A-38B, perspective views show positioning systems 2900A, 2900B including positioning apparatuses 2902A, 2902B, respectively, including a movable work surface 2980 in accordance with an embodiment of the invention. The positioning system 2900 generally includes the positioning apparatus 2902 attached to a support member 2910, and optionally includes a wall 2950 for mounting the support member 2910 and/or one or more additional work surfaces 2960, 2962. The positioning apparatus 2902 includes a support column 2922 configured to support a display 2904 and a laptop 2906, along with a keyboard tray 2925, that are movable through a vertical range of travel 2930 relative to the support member 2910.

In addition, in some cases the positioning apparatus 2902 also includes the movable work surface 2980, which is also movable within the vertical range of travel 2930. In this case, the work surface 2980 is attached to the support column 2922 and positioned between a display mount (not shown) supporting the display 2904 and the laptop 2906, and the keyboard tray 2925. In some cases the work surface 2980 is attached directly to the support column 2922 and moves with the support column 2922 and the display(s)/keyboard relative to the support member 2910 in a manner similar to the apparatuses depicted in FIGS. 27A-28C. In some cases the support column 2922 remains stationary with respect to the support member 2910 and the work surface 2980 is attached to a riser bracket that moves relative to the support member 2910 in a manner similar to the apparatuses depicted in FIGS. 35A-35E.

According to some embodiments, the movable work surface 2980 is sized and shaped to replace an existing work surface. For example, referring to FIGS. 38A-38B, in some cases an existing work surface may be removed from between two other work surfaces 2960, 2962, leaving a gap between the work surfaces. In this case a support member 2910 can advantageously be mounted to the wall 2950 (or directly to the work surfaces) between the adjacent work surfaces 2960, 2962, allowing the positioning apparatus 2902 to be mounted between the adjacent work surfaces 2960, 2962. In some embodiments, the movable work surface 2980 is sized and shaped to extend between the adjacent work surfaces 2960, 2962 to provide a substantially continuous work surface 2982 from the first work surface 2960 to the movable work surface 2980 to the second work surface 2962. For example, the combination of work surfaces may provide a larger, generally level work surface with small separations between adjacent work surfaces portions making up the larger work surface.

FIGS. 39A, 39B, 39C, and 39D are schematic, side cross-sectional representations of various positioning systems and positioning apparatuses incorporating a movable work surface in accordance with embodiments of the invention. According to some embodiments, the positioning apparatuses illustrated in these figures incorporate several components and/or features in common with other embodiments described herein and thus some details are left out here. As illustrated, each of the illustrated positioning apparatuses in FIGS. 39A-39D also includes a movable work surface that can be moved along a vertical range of travel to provide an adjustable work station.

Figure 39A:
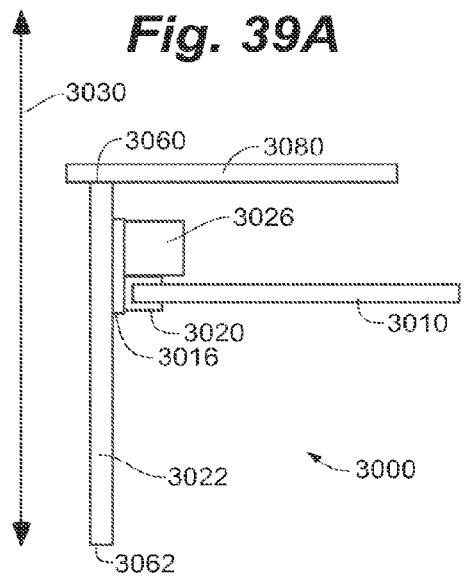
FIGS. 39A-D are side cross-sectional representations of multiple positioning apparatuses and systems in accordance with embodiments of the invention.
Figure 39B:
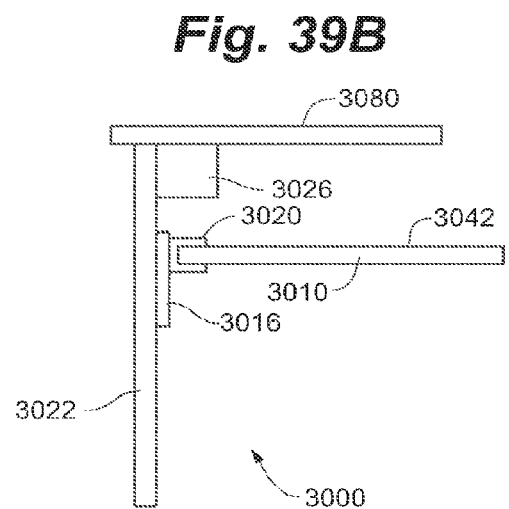
Figure 39C:
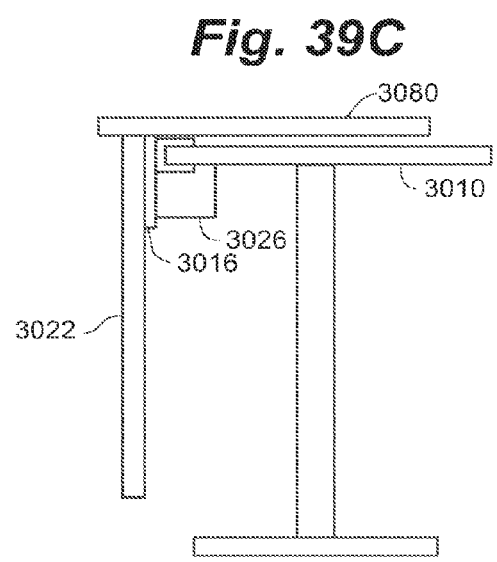
Figure 39D:
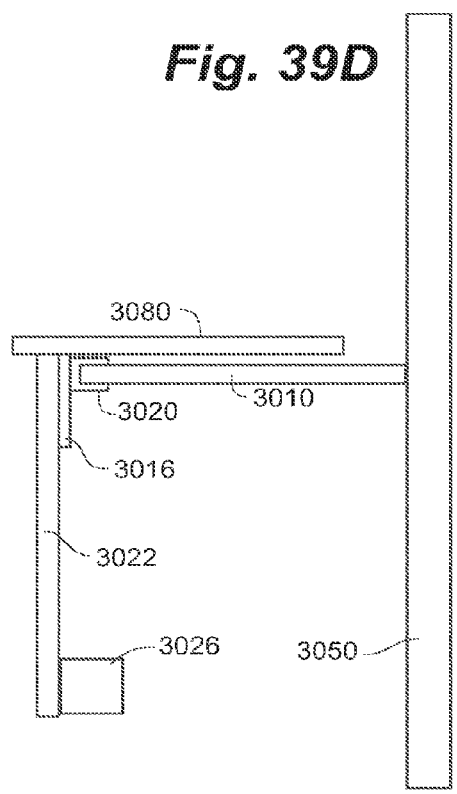

FIG. 39A illustrates a positioning system 3000 with a positioning apparatus 3002 in a lower position along a vertical range of travel 3030 relative to a support member 3010. The positioning apparatus 3002 includes a support column 3022 movably coupled to an attachment member 3020 through the vertical range of travel 3030. As shown in FIG. 39D, in some embodiments the support member 3010 may be attached to and supported by a wall 3050. Referring to FIG. 39C, in some embodiments the support member 3010 may be incorporated into a table or some other suitable structure providing a secure foundation for the support member 3010.

Continuing with reference to FIGS. 39A-39D, some positioning apparatuses include a movable work surface 3080. The movable work surface 3080 can in some cases be mounted to a first end 3060 of the support column 3022, and extend out over the support member 3010. Of course a wide variety of configurations are available and embodiments of the invention are not limited to any one configuration for the movable work surface. In some embodiments, the vertical range of travel 3030 extends both above and below a top surface 3042 of the support member 3010. For example, in some cases the first end 3060 of the support column 3022 extends above the support member 3010 when the support column 3022 is at an uppermost height along the range of travel 3030, while a second end 3062 of the support column 3022 extends below the support member 3010 when the support column 3022 is at a lowermost height along the range of travel 3030. In some embodiments, the first end 3060 remains level with or above a surface of the support member 3010 (in this case the top surface 3042) and the second end 3062 remains below a surface of the support member (e.g., the top surface 3042) as the support column 3022 moves throughout the vertical range of travel 3030. According to some embodiments, the positioning apparatus 3002 may be provided with a lift mechanism (not shown) that movably couples the support column 3022 to the attachment member 3020 through the range of travel 3030. Any of the lift mechanisms described herein can be configured for use with the embodiments depicted in FIGS. 39A-39D.

Referring to FIG. 39A, in some cases the cam housing 3026 of a positioning apparatus is positioned proximate a top surface 3042 of the support member 3010, proximate an edge of the support member. For example, the attachment member may be fixedly attached to the top surface of the support member and/or removably coupled about the surface edge while being primarily located on the top surface. It should be appreciated though, that this is just one example of an attachment between the attachment member and the support member and that other methods of attachment (both removable and fixed) are possible. Referring to FIGS. 39C-39D, in some cases the cam housing 3026 may be fixedly attached to the bottom surface of the support member 3010 or attached at another location along the riser support column 3022.

Figure 40A:
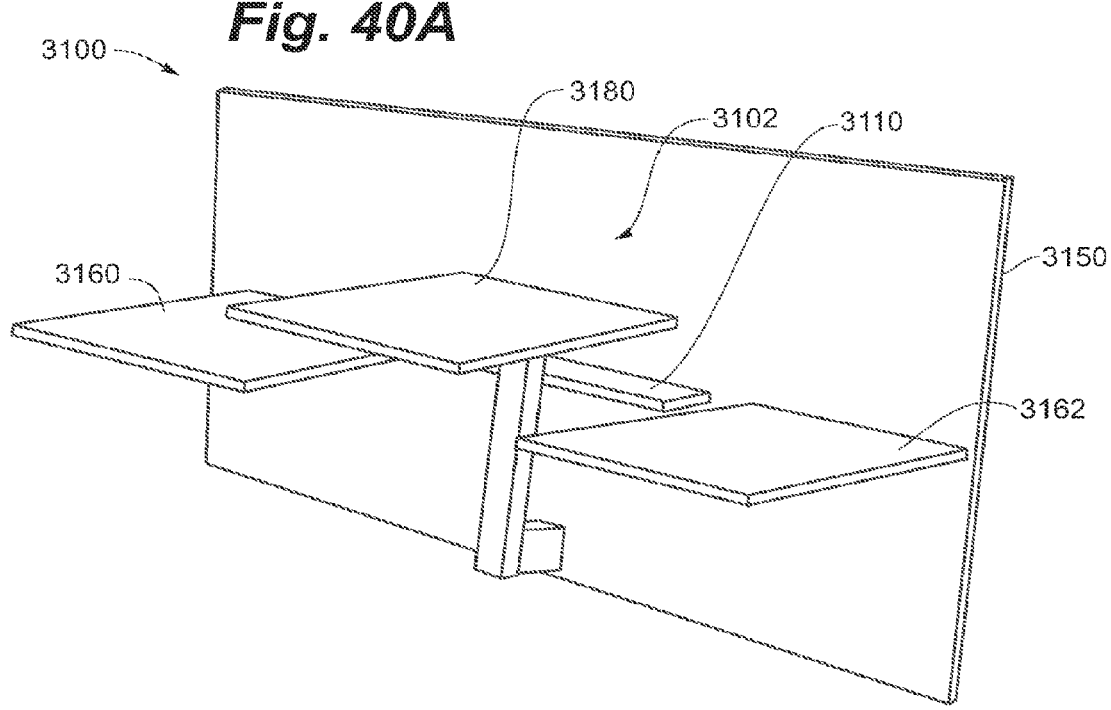
FIG. 40A is a perspective representation of a positioning apparatus and system in accordance with an embodiment of the invention.
Figure 40B:
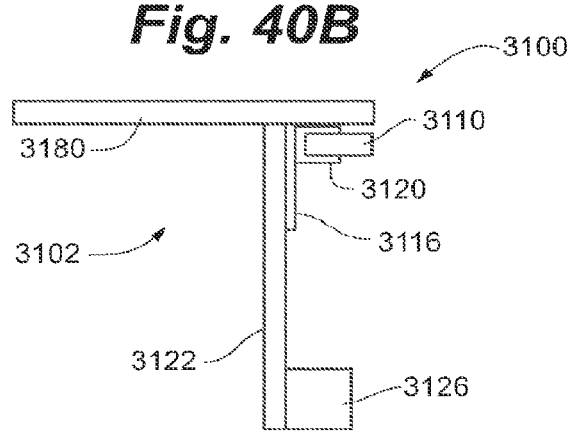
FIG. 40B is a side cross-sectional representation of a positioning apparatus and system in accordance with an embodiment of the invention.

FIG. 40A is a perspective representation and FIG. 40B is a schematic, cross-sectional representation of a positioning system 3100 and apparatus 3102 in accordance with another embodiment of the invention. As will be appreciated, the positioning apparatus 3102 includes several components and features similar to those in the embodiments illustrated in FIGS. 39A-39D. The positioning apparatus 3102 generally includes a riser including a support column 3122 movably coupled with a bracket 3116 and attachment member 3120 for attaching the positioning apparatus 3102 with a support member 3110 in the form of a mounting platform, such as those described with respect to FIGS. 37A-37B and 38A-38B.

The positioning apparatus 3102 includes a movable work surface 3180 sized and shaped to replace an existing work surface, similar to the embodiment described with respect to FIGS. 38A-38B. For example, in some cases an existing work surface may be removed from between two other work surfaces 3160, 3162, leaving a gap between the work surfaces. In this case a support member 3110 can advantageously be mounted to the wall 3150 (or directly to the work surfaces) between the adjacent work surfaces 3160, 3162, allowing the positioning apparatus 3102 to be mounted between the adjacent work surfaces 3160, 3162. In some embodiments, the movable work surface 3180 is sized and shaped to extend between the adjacent work surfaces 3160, 3162 to provide a substantially continuous work surface from the first work surface 3160 to the movable work surface 3180 to the second work surface 3162. For example, the combination of work surfaces may provide a larger, generally level work surface with small separations between adjacent work surfaces portions making up the larger work surface.

An example of a positioning apparatus incorporating a lift/balance mechanism, an attachment member, and several other features will now be discussed with respect to FIGS. 1A-13B.

FIG. 1A is a side view of one example of a positioning apparatus 1000. FIG. 1B is a side cross-section of the positioning apparatus 1000. The positioning apparatus 1000 includes a base 1002 and a support column 1004 extending upward from the base 1002. A mounting portion 1006 is movably coupled to the support column 1004 through a generally vertical range of travel 1008, allowing the mounting portion 1006 to move up and down relative to the base 1002 and the support column 1004. For example, in some cases a lift mechanism 1009 is provided that movably couples the mounting portion 1006 and the support column 1004. The mounting portion or frame 1006 is configured to support multiple pieces of equipment and in some cases is referred to as a common mounting frame. The mounting portion 1006 is configured to support equipment such as an electronic display and a keyboard and move them through the vertical range of travel 1008. In the example shown in FIGS. 1A and 1B, the mounting portion 1006 includes an electronic display mount 1010 configured to couple to and support an electronic display. In addition, the mounting portion 1006 includes a keyboard tray 1012 for supporting a keyboard.

The positioning apparatus 1000 is advantageously configured to sit on a wide variety of existing work surfaces such as the top surfaces of desks, tables, trays, counters, and the like. One example of a contemplated use includes transforming a traditional, stationary computer workstation into a multi-position (e.g., multi-height) computer workstation.

The base 1002 of the positioning apparatus 1000 is configured to sit on a horizontal or generally horizontal work surface. In some cases the base 1002 may also be configured to sit on a somewhat angled or inclined work surface. In some cases the base and positioning apparatus may be configured to simply sit/rest upon the work surface without being attached to the work surface. In certain embodiments, though, the base 1002 and positioning apparatus 1000 are configured to attach to a work surface. As shown, in some embodiments, the base 1002 includes a clamp 1020 for removably attaching the positioning apparatus 1000 about an edge of the work surface. In some embodiments, the base may also or instead be fixedly attached to the work surface with a more permanent type of fastener such as an adhesive and/or a screw/bolt and mounting hole.

Attaching the positioning apparatus 100 to a work surface can increase the functionality of the positioning apparatus and may optionally provide a positioning apparatus with one or more advantages over an apparatus that merely rests upon a work surface without being attached. For example, an attached positioning apparatus may have increased stability and be less prone to tipping than an unattached positioning apparatus. The increased stability may in some cases enable certain base configurations and/or ranges of motion for a positioning apparatus that would otherwise lead to undesirable instability, up to the point of not being able to include certain desirable features and/or configurations in an unattached positioning apparatus. For example, in some cases increased stability from attachment can enable use of a base with a reduced or limited footprint, which saves material and cost, frees more of a work surface for other uses, and can provide a more aesthetically pleasing configuration than large base configurations. In some cases attachment to a work surface enables a positioning apparatus to be moved through a greater vertical range of travel than an unattached positioning apparatus. The increased stability from attachment may also enable horizontal translating, panning, rotating, pivoting, and other kinds of movement for a positioning apparatus that might not be available for an unattached positioning apparatus.

The mounting portion 1006 illustrated in FIGS. 1A and 1B includes a frame to which the electronic display mount 1010 and the keyboard tray 1012 are attached. The frame may be formed in a variety of shapes. According to a preferred embodiment, the frame is configured to support the display mount 1010 and the keyboard tray 1012 in a spaced relationship, with the keyboard tray 1012 set apart from the display mount 1010 in order to allow an operator to comfortably use a keyboard on the tray while viewing a display attached to the mount. For example, the keyboard tray 1012 may be attached to the frame at a generally lower and more forward position (closer to the operator) than the display mount 1010.

According to some embodiments, the display mount 1010 may be attached to the mounting portion 1006 in an adjustable manner. In some cases, the mounting portion 1006 includes an optional secondary lift mechanism 1022 to which the display mount is attached. The secondary lift mechanism 1022 provides a different, adjustable range of travel that allows the display mount 1010 (and an attached electronic display) to be moved vertically relative to the keyboard tray 1012, which can be useful for providing monitor/keyboard arrangements for differently sized operators. According to some embodiments, the display mount 1010 attachment may include a tilt and/or rotation mechanism that allows an attached display to be tilted and/or rotated in a variety of directions.

The base 1002 of the positioning apparatus 1000 can encompass any structure that adequately supports the support column 1004 and the mounting portion 1006 upon a work surface. As shown in the figures, in some embodiments, the base 1002 includes a first end and a second end with a length extending between the first and the second ends. According to some embodiments, portions of the base are formed with a low profile, thus minimizing any obstruction caused by the base and maximizing the range of travel of the mounting portion 1006. For example, in some cases a front elongated portion 1032 of the base 1002 in front of the support column 1004 extending between the end of the base and the support column has a thickness of about 1 inch or less. In addition, the base 1002 can also include a housing portion 1034 that houses some or all of the apparatus' lift mechanism 1009. According to some embodiments, the base 1002 includes one or more stabilizing portions extending out from the housing portion 1034 and/or the front elongated portion 1032 to assist in making the base 1002 stable upon the work surface. In the example shown in FIGS. 1A-2C, the stabilizing portion includes legs 1030 that extend out from the housing portion 1034 at the second end of the base. The legs 1030 extend out at an angle toward the first end of the base, though it is contemplated that in some cases the legs 1030 could extend perpendicularly or at an angle away from the first end 1031 of the base.

In some cases the elongated section 1032 of the base is generally parallel to a plane defined by movement of the mounting portion 1006 through the vertical range of travel (e.g., the plane of cross-section in FIG. 1B). In some cases the base may be configured to be attached to the work surface at the first and/or second ends of the base in front of and/or behind the support column, respectively, from the perspective of an operator. Such a configuration can advantageously reduce the footprint of the base 1002 upon the work surface, thus leaving more room for other activities as well as reducing the visual impact of the positioning apparatus from, e.g., the operator's perspective. In some cases the base 1002 includes a clamp 1020 at the first end of the base that allows the base 1002 to be attached about a front edge of the work surface. Although not shown, a clamp may be provided at the second (e.g., back) end of the base 1002, allowing the base to be attached about a back edge of a work surface. In addition, it is contemplated that the base may in some cases be configured to attach to one or more sides of a work surface through, for example, clamps located at the side of the base. In addition, the elongated section 1032 of the base may be oriented in a direction perpendicular or otherwise angled to the plane including vertical movement of the mounting portion.

According to some embodiments, the support column 1004 comprises a separate component that is attached to the base 1002 using, e.g., mounting brackets or other hardware. The support column 1004 can be formed integrally with the base 1002. The support column and the base 1002 are attached/formed together at an angle other than 90 degrees (although in some embodiments the angle is 90 degrees). For example, as shown in FIGS. 1A and 1B, the support column 1004 extends upward from the base 1002 at an obtuse angle 1040 with respect to the base 1002 (and a work surface positioned below the base). The obtuse angle 1040 is useful for positioning the center of gravity of the display and/or other equipment carried by the positioning apparatus at a desired position with respect to the base 1002 to enhance stability. A range of angles may be used depending upon the design and intended use for a particular embodiment. In some cases the obtuse angle 1040 is equal to or less than about 120 degrees. In some cases, the obtuse angle 1040 is equal to or less than about 100 degrees. In some embodiments the support column 1004 and the base are formed at an acute angle (e.g., less than 90 degrees), which can allow movement of the mounting portion, display, and keyboard upward and toward an operator at the same time.

The support column 1004 can be dimensioned to provide the positioning apparatus with a vertical range of travel 1008 of any desired length, thus allowing the mounting portion 1006 to be moved through a wide range of heights. As will be appreciated, in cases where the support column 1004 is positioned at an angle with respect to the base, the apparatus may also provide an amount of horizontal movement as the mounting portion moves through the vertical range of travel 1008. In one example, the vertical range of travel of a positioning apparatus attached to a work surface extends between a sitting height and a standing height, thus allowing an operator to use the workstation from both a sitting position and a standing position. For example, in certain embodiments the vertical range of travel is at least about 14 inches. In some cases the vertical range of travel is between about 14 inches and about 24 inches. The lift mechanism 1009 in the positioning apparatus may also provide multiple positions at intermediate heights between the lowest and highest extents of the range of travel 1008, thus accommodating other working positions and/or operators of different heights. In some cases a discrete number of intermediate positions are provided. In some cases the lift mechanism 1009 provides an infinite number of intermediate positions within the vertical range of travel 1008.

Turning to FIGS. 2A-2C, perspective views are shown of positioning apparatuses with various mounting options. Although some preferred embodiments of the invention are configured to support an electronic display and a keyboard, some positioning apparatuses can be configured with a number of optional and/or alternative mounts and supports for attaching and otherwise supporting other items. For example, in some cases the mounting portion of a positioning apparatus can include at least one of an electronic display mount, a keyboard tray, a mouse tray, a document holder, a movable work surface, and a telephone holder. In some cases a positioning apparatus includes multiple display mounts for supporting two or more electronic displays such as computer monitors. A positioning apparatus may also optionally include a notebook tray and/or a notebook docking station instead of or in addition to other mounts and supports.

FIG. 2A illustrates an example of a positioning apparatus 1100 that includes a mounting portion 1106 that has a single display mount 1110 and a keyboard tray 1112. The mounting portion 1106 also supports a mouse tray 1120 that is attached to the keyboard tray 1112. As shown in FIGS. 2B and 2C, a crossbar can also be attached to a mounting portion for attaching two or more items. FIG. 2B illustrates an example of a positioning apparatus 1150 that includes a mounting portion 1106 that has dual display mounts 1110 mounted to a crossbar 1152. The apparatus 1150 also includes a keyboard tray 1112 and a mouse tray 1120. FIG. 2C illustrates an example of a positioning apparatus 1176 that includes a mounting portion 1106 that has a single display mount 1110 and a notebook tray 1180 mounted to a crossbar 1178. The apparatus 1150 also includes a keyboard tray 1112 and a mouse tray 1120. As shown in FIGS. 2B and 2C, items can be mounted to a crossbar through various configurations, including a center mount (FIG. 2B) and/or a mount above the crossbar (FIG. 2C).

FIG. 3 is an enlarged view of the side cross-sectional view of FIG. 1B, showing details of the keyboard tray 1012. The mounting portion 1006 includes an extension arm 1200 extending downward to couple with the keyboard tray 1012. Within a range of lower positions of the mounting portion 1006 (e.g., including the lowest position in the vertical range of travel 1008), the mounting portion 1006 extends down in front of the first end of the base 1002 and the work surface (not shown). The mounting portion 1006 thus extends from above the work surface to below the work surface when the tray is in one of these downward positions. Such embodiments can also obscure the base from view. The positioning apparatus 1000 thus enables positioning of the keyboard tray 1012 below the level of the work surface when the mounting portion is positioned at a lower height (e.g., the lowest height position within the range of travel). The positioning apparatus 1000 also enables positioning of the keyboard tray 1012 level with the work surface 1018. Conversely, the positioning apparatus 1000 enables positioning of the keyboard tray 1012 above the level of the work surface 1018 when the mounting portion is positioned at a greater height (e.g., the highest position within the range of travel).

Thus, the positioning apparatus enables positioning of the keyboard tray 1012 at or below the level of the work surface, even though the base 1002 of the positioning apparatus sits on the work surface. (See, e.g., FIGS. 12A and 13A.) Such adjustability can provide increased comfort for an operator by positioning the keyboard tray 1012 (and the keyboard supported on the tray) in a more ergonomic relationship to the position of an attached electronic display and/or an operator sitting in a chair. For example, positioning the keyboard tray 1012 at or below the work surface may make it easier for an operator to maintain his or her elbows and forearms level with or slightly above a supported keyboard in a sitting position, thus helping to reduce and/or avoid unnecessary strain on an operator's wrists.

In the illustrated example, the keyboard tray 1012 is attached to the mounting portion 1006 with a tilt mechanism 1202 that allows an operator to adjust the tilt of the keyboard tray 1012 relative to the base and the work surface. For example, in some cases the tilt mechanism 1202 allows the keyboard to be oriented at an angle ranging from about −15 degrees to about +15 degrees with respect to the work surface. The mounting portion 1006 also or alternatively includes an optional folding mechanism that allows the keyboard tray 1012 to be folded closer to the base 1002. The folding mechanism can thus allow an operator to reduce the overall size of the positioning apparatus by folding the keyboard tray away from the operator and toward the support column when not in use. In some embodiments the tilt mechanism includes a hinge with a generally horizontal axis. Such a hinge may be provided with a friction mechanism.

Figure 4:
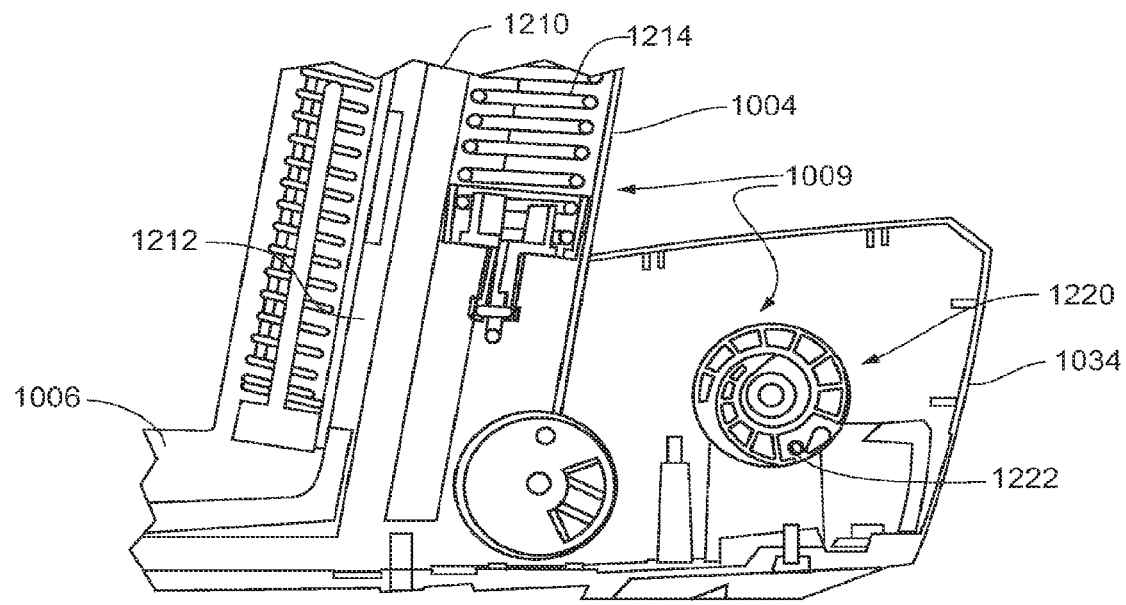
FIG. 4 is an enlarged view of a portion of a lift mechanism shown in FIG. 1B.
Figure 8B:
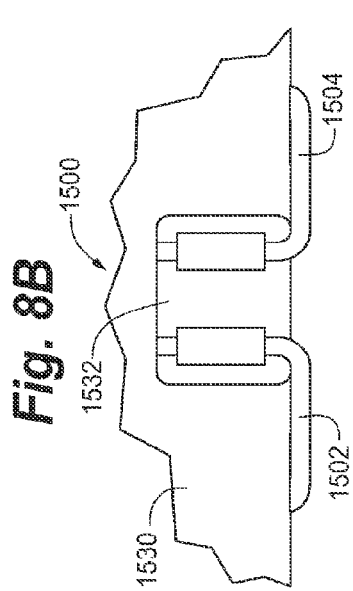
FIG. 8B is a top view of the screw clamp of FIG. 8A.
Figure 8D:
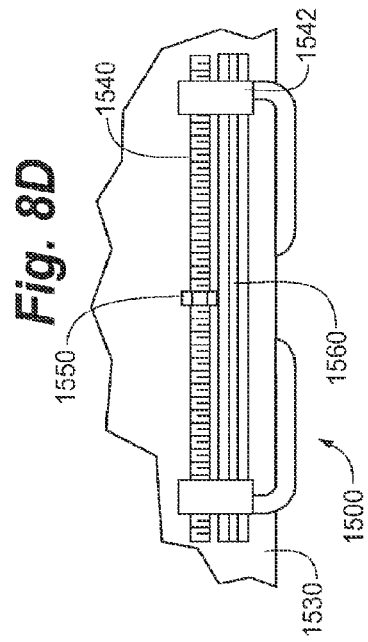
FIG. 8D is a bottom view of the screw clamp of FIG. 8A.
Figure 8E:
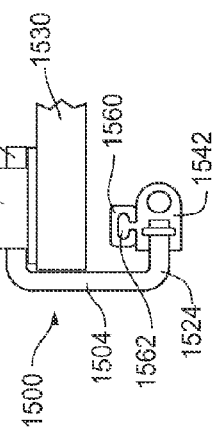
FIG. 8E is a side view of the screw clamp of FIG. 8A.
Figure 8A:
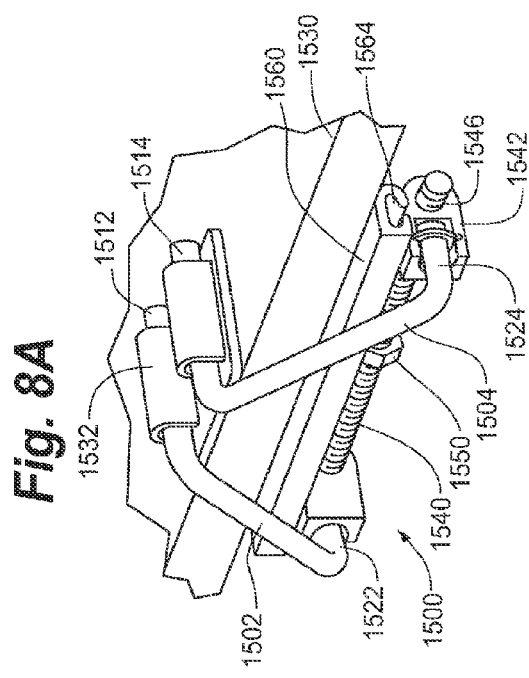
FIG. 8A is a perspective view of another screw clamp.
Figure 8C:
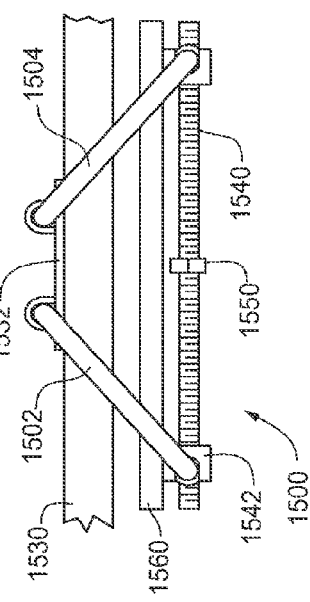
FIG. 8C is a front view of the screw clamp of FIG. 8A.

FIGS. 4 and 5 show enlarged cross-sectional views of the lift mechanism 1009 that movably couples the mounting portion 1006 to the support column 1004. In some cases, the lift mechanism 1009 includes one or more rails 1210 attached to the support column 1004 and a truck 1212 (e.g., movable bracket) having wheels or sliders that engage the rails. FIGS. 4, 5 and 6 show enlarged cross-sectional views of the lift mechanism 1009. In some cases the lift mechanism 1009 is located partially within the support column 1004 and partially within the base 1002 (e.g., within the housing portion 1034). The lift mechanism 1009 may also be located wholly within the support column 1004, attached to an external surface of the support column 1004, or otherwise mounted in a useful manner.

In some cases, the lift mechanism 1009 can also provide an operator with a degree of assistance to move the mounting portion 1006 through the range of travel 1008. For example, in some embodiments an energy storage member 1214 such as an extension spring provides a biasing force that aids an operator in adjusting the height of the mounting portion 1006. In some cases an extension spring member is adjustably mounted within the support column 1004 using a retainer plug 1230 and a weight adjustment screw 1232 which can be turned to tighten and loosen the spring. The lift mechanism 1009 may provide a discrete number of height positions along the vertical range of travel, or in some cases may provide an infinite number of height positions along a continuous vertical range of adjustability.

In this case the lift mechanism 1009 includes a balance mechanism 1220 incorporating the energy storage member 1214 that can counterbalance some or all of the weight of an electronic display and/or other equipment supported by the mounting portion 1006. As just one example, the lift mechanism 1009 can incorporate a cam (e.g., a rotary cam) 1222 that is coupled to the energy storage member 1214 and the truck 1212 with one or more flexible tension members (e.g., a line, cable, rope, chain, etc., not shown). One example of such a balance mechanism is described in presently co-owned US Patent Application Publication US 2006/0185563 A1, which application was filed Sep. 28, 2005, the entire contents of which is incorporated by reference herein. The lift mechanism 1009 includes a balance mechanism having a dual cam as described below with reference to FIGS. 14-26.

While a few examples of possible configurations for a lift mechanism are described herein, it should be appreciated that a wide variety of lift mechanisms can be used to movably couple the mounting portion 1006 with the support column 1004 to provide the vertical range of travel 1008 and that the scope of the invention is not limited to a particular lift configuration. For example, in some cases a lift mechanism includes a telescoping support column. In some cases the lift mechanism includes a rotary cam coupled with an energy storage member such as an extension spring, a compression spring, a torsion spring, or a spiral spring. In some cases the lift mechanism includes a constant force spring and/or a gas spring. The lift mechanism may also be provided as described in one or more of presently co-owned US Patent Application Publication US 2008/0026892 A1, filed Jul. 26, 2007; US Patent Application Publication US 2007/0259554 A1, filed May 4, 2007; U.S. Pat. No. 6,997,422, filed Aug. 20, 2003; U.S. Pat. No. 7,506,853, filed Nov. 3, 2004; and U.S. Pat. No. 6,994,306, filed Nov. 28, 2000. The entire disclosure of each of the above-mentioned patents and patent applications is hereby incorporated by reference herein.

FIG. 6 includes an enlarged cross-sectional view of the secondary lift mechanism 1022 first shown in FIGS. 1A and 1B. The secondary lift mechanism 1022 provides an adjustable range of travel 1300 that allows the display mount 1010 (and an attached electronic display) to be moved vertically relative to the keyboard tray (not shown). For example, the lift mechanism 1022 may in some cases provide from about 3 inches to about 8 inches of additional vertical adjustability. The lift mechanism 1022 can comprise any suitable design, including any of the examples described immediately above with respect to the lift mechanism 1009. For example, the secondary lift mechanism 1022 may include a balance mechanism that can counterbalance some or all of the weight of the attached display through the range of travel. In some cases the secondary lift mechanism 1022 includes a truck 1301 movably coupled with one or more rails providing a second range of vertical travel for the electronic display relative to the keyboard tray. An energy storage member 1302 such as an extension spring can provide a biasing force that aids an operator in adjusting the height of the display mount 1010. In some cases the tension of the energy storage member 1302 can be adjusted with the use of a weight adjustment screw or bolt 1304. In addition, the secondary lift mechanism 1022 can coupled with the mounting portion 1006 in any suitable manner, such as being attached to an external surface of a frame of the mounting portion, or located within or partially within a columnar portion of the mounting portion 1006.

The display mount 1010 is attached to the mounting portion 1006 in one or more other adjustable manners. The display mount 1010 attachment includes a tilt mechanism 1310 and rotation mechanism 1312 that allows an attached display to be tilted and/or rotated in a variety of directions with respect to the positioning apparatus. The tilt mechanism may include a counterbalanced spring system (e.g., a torsion spring mechanism), a gravity tilt mechanism, a friction tilt mechanism, or a ball and socket mechanism, among other possibilities. U.S. Pat. No. 6,997,422, filed Aug. 20, 2003; U.S. Pat. No. 7,252,277, filed Jan. 17, 2004; and US Patent Application Publication US 2006/0185563 A1, filed Sep. 28, 2005, provide examples of possible tilt and rotation mechanisms, the entire disclosure of each of which is hereby incorporated herein by reference.

Figures 7A, 7B, 7C, 7D, 7E:
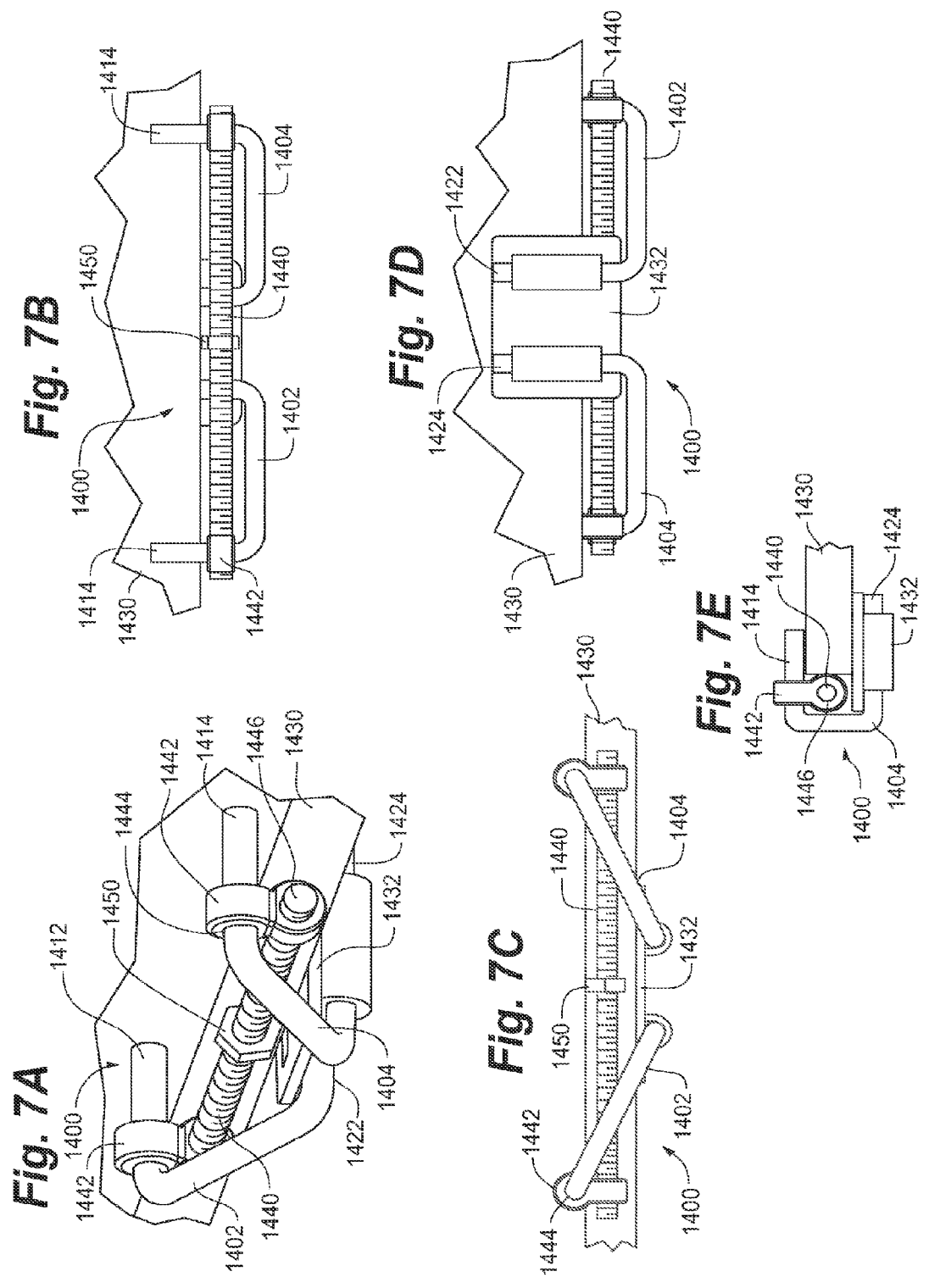

As discussed with reference to FIGS. 1A and 1B, the base 1002 of the positioning apparatus 1000 can be removably coupled to a work surface with the use of a clamp 1020. Many types of clamps can be used to removably attach a positioning apparatus to a work surface. FIG. 7A is a perspective view of a screw clamp 1400 that provides a clamping mechanism having several advantages over traditional clamps, including providing a low profile clamp while still accommodating work surfaces a wide range of thicknesses with the same clamp. FIGS. 7B, 7C, 7D, and 7E are top, front, bottom, and side views of the screw clamp 1400, respectively. The screw clamp 1400 includes two clamping elements 1402, 1404 (e.g., U-shaped bend wires) that include upper portions 1412, 1414 and lower portions 1422, 1424 that fit about the edge of a work surface 1430 and can be adjusted to clamp to the work surface 1430 by pressing together the bottom and top surfaces of the work surface 1430. The lower portions 1422, 1424 of the clamping elements are coupled together in a spaced relationship (e.g., with a bracket 1432) such that the upper portions 1412, 1414 are able to pivot around the fixed lower portions to clamp about the edge of the work surface 1430. In some embodiments, the bracket 1432 is attached to or formed as part of the base of a positioning apparatus, thus allowing the clamp 1400 to attach the positioning apparatus to the work surface 1430.

An adjustable screw 1440 is threadedly coupled to the upper portions of the first and the second clamping elements. Turning the screw 1440 loosens and tightens the clamp 1400 by pulling and pushing the upper portions of the clamping elements together and apart. A threaded insert 1442 is rotatably coupled to the upper portion of each clamping element through a slip fit hole 1444. The insert 1442 includes a threaded hole 1446, oriented perpendicular to the slip fit hole, that receives an end of the screw 1440. In some cases an adjustment nut 1450 is attached (e.g., welded or machined) to the screw 1440 to facilitate rotation of the screw 1440. Turning the nut 1450 and the screw 1440 in a first direction moves the upper portions 1412, 1414 of the clamping elements apart to decrease the space between the upper and lower portions of the clamping elements 1402, 1404 and thus tighten the clamp 1400 about the edge of the work surface 1430. Turning the nut 1450 and the screw 1440 in an opposite, second direction moves the upper portions 1412, 1414 of the clamping elements together to increase the space between the upper and lower portions of the clamping elements 1402, 1404 and thus loosen the clamp 1400 about the edge of the work surface 1430. Fixed bracket 1432 can be placed on top of a work surface and the bracket is formed as part of the base 1002.

FIGS. 8A-8E are various views of another type of screw clamp 1500 that can be useful for removably coupling a positioning apparatus about the edge of a work surface. The screw clamp 1500 includes two clamping elements 1502, 1504 (e.g., U-shaped bent wires) that include upper portions 1512, 1514 and lower portions 1522, 1524 that fit about the edge of a work surface 1530 and can be adjusted to clamp to the work surface 1530. The upper portions 1512, 1514 of the clamping elements are coupled together in a spaced relationship (e.g., with a bracket 1532) such that the lower portions 1522, 1524 are able to pivot around the fixed upper portions to clamp about the edge of the work surface 1530. In some cases, the bracket 1532 is attached to or formed as part of the base of a positioning apparatus, thus allowing the clamp 1500 to attach the positioning apparatus to the work surface 1530.

An adjustable screw 1540 is threadedly coupled to the lower portions of the first and the second clamping elements. Turning the screw 1540 loosens and tightens the clamp 1500 by pulling and pushing the lower portions of the clamping elements together and apart. A threaded insert 1542 is rotatably coupled to the lower portion of each clamping element. The insert 1542 includes a threaded hole 1546, oriented perpendicular to the lower portion, that receives an end of the screw 1540. In some cases an adjustment nut 1550 is attached (e.g., welded or machined) to the screw 1540 to facilitate rotation of the screw 1540. In addition, in some cases an extrusion 1560 is slidingly mounted to the threaded inserts 1542 and provides a flat surface above the adjustable screw for engaging the bottom of the work surface. For example, each threaded insert 1542 may have a "T" shaped extension 1562 that fits within a slot 1564 of the extrusion 1560. Turning the nut 1450 and the screw 1540 in a first direction moves the lower portions 1522, 1524 of the clamping elements apart to decrease the space between the upper and lower portions of the clamping elements 1502, 1504 and thus tighten the extrusion 1560 against the bottom of the work surface 1530. Turning the nut 1550 and the screw 1540 in an opposite, second direction moves the lower portions 1522, 1524 of the clamping elements together to increase the space between the upper and lower portions of the clamping elements 1502, 1504 and thus loosen the clamp 1500 about the edge of the work surface 1530. In some cases bracket 1532 can be formed as an integral part of the base 1002.

In addition to providing a relatively low profile above the work surface 1530, the screw clamp 1500 shown in FIGS. 8A-8E also occupies a minimum area at the side of the work surface 1530 since the adjustable screw 1540 and the extrusion 1560 are positioned below the work surface 1530.

Figure 9:
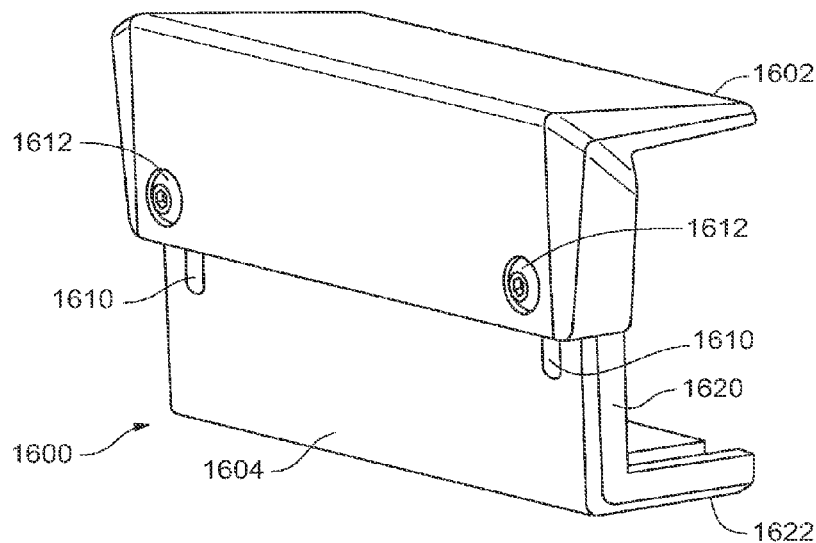
FIG. 9 is a perspective view of a c-clamp.

FIGS. 9-11 are various views of a C-clamp 1600 that can removably couple a positioning apparatus about the edge of a work surface according to some embodiments of the invention. The C-clamp 1600 includes an upper bracket 1602 coupled to a lower bracket 1604. In certain embodiments the upper and lower brackets each have two legs formed at a right angle, which allows the brackets to clamp about the edge of a work surface 1630 by pressing on the top surface 1632 and the bottom surfaces 1634 of the work surface 1630. In addition, the lower bracket 1604 (or alternatively the upper bracket) may include mounting slots 1610 that provide an adjustable sliding engagement with the upper bracket such that the clamp 1600 can be adjusted to attach to work surfaces of different thicknesses. For example, screws/bolts 1612 can be inserted into the slots and paired with nuts to tighten together the upper and lower brackets. In some embodiments, upper leg 1602 can be formed as part of the base of a positioning apparatus. In such embodiments, the base extends forward and bends downward at the edge of the work surface to form the upper leg 1602.

Figure 10A:
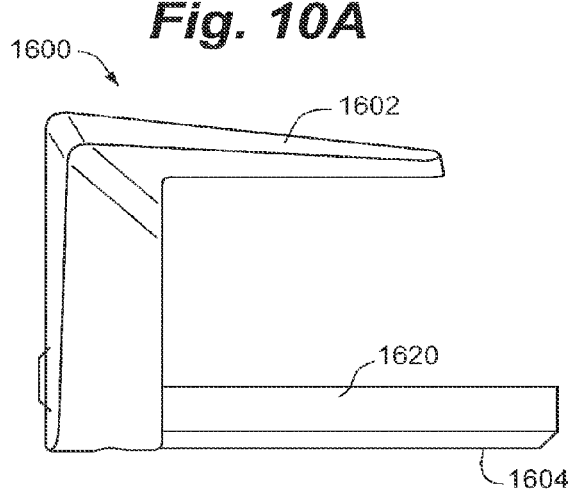
FIG. 10A is a side view of the c-clamp shown in FIG. 9 in a first configuration.
Figure 10B:
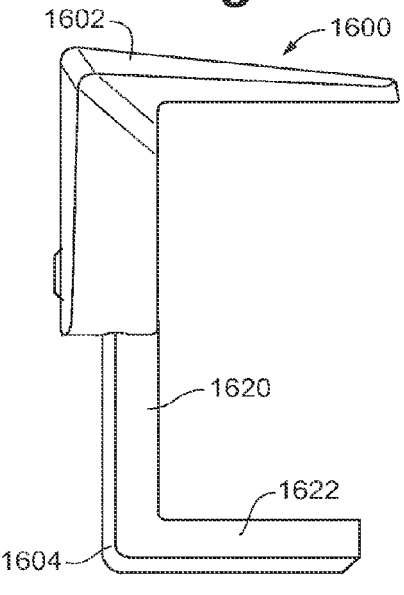
FIG. 10B is a side view of a c-clamp shown in FIG. 9 in a second configuration.

In certain embodiments, the lower bracket 1604 can be coupled with the upper bracket 1602 in more than one configuration in order to accommodate work surfaces with a greater range of thicknesses. Referring to FIG. 9, in some embodiments the lower bracket 1604 includes a first leg 1620 and a second leg 1622, and the length of the first leg 1620 is longer than the length of the second leg 1622. Turning to FIG. 10A, the short/second leg 1622 can be coupled with the upper bracket in some cases to clamp about work surfaces having a relatively small thickness. In certain cases the long/first leg 1620 can be coupled with the upper bracket as shown in FIG. 10B in order to clamp about work surfaces having a greater thickness. Accordingly, the C-clamp 1600 can be adjusted to attach a positioning apparatus to a wide variety of pre-existing work surfaces.

Turning to FIG. 11, in some embodiments an adjustable pressure mechanism 1650 can further enhance the operation of the C-clamp 1600 by providing a tighter clamp about an edge of the work surface 1630. For example, in some cases each of the first and the second legs of the lower bracket 1604 is adapted to threadedly receive a threaded rod 1660 of a screw knob 1662. The screw knob also includes a washer 1664 or other engaging member that presses into the bottom surface 1634 of the work surface 1630 as the screw knob 1662 is turned. According to this embodiment, it is possible to use the same C-clamp 1600 on a wide range of work surface thicknesses without using a screw knob having an extremely long threaded rod. Instead a screw knob having a shorter threaded rod can be used with additional adjustability provided by the various configurations of the upper and lower brackets 1602, 1604 and the adjustable coupling between the brackets. Accordingly, some embodiments provide a small profile clamp 1600 in which the screw knob 1662 sticks out a smaller amount when the clamp is mounted on a thinner desk surface.

Figure 12A:
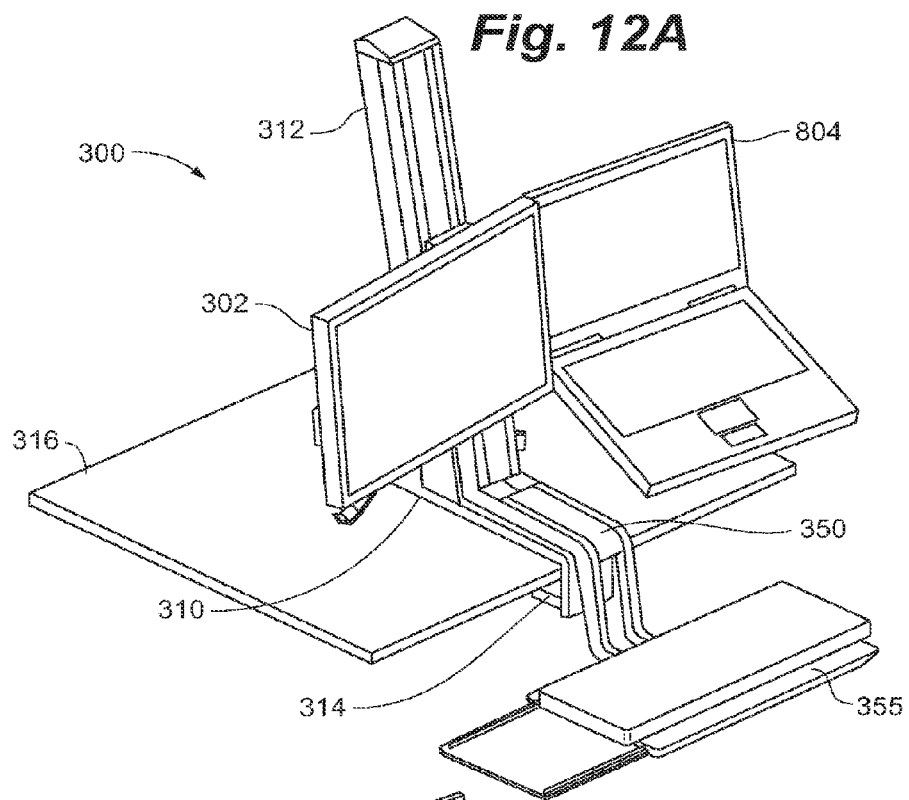
FIGS. 12A and 12B are front perspective views of a positioning apparatus in a lowered position and a raised position, respectively.

FIGS. 12A-13B illustrate various views of another exemplary positioning apparatus 300. FIGS. 12A and 12B show the positioning apparatus 300 from in a lowered position and a raised position, respectively, from a front perspective. According to some embodiments of the invention, the positioning apparatus 300 is useful in applications in which a single operator may wish to both sit and stand while using the same monitor and/or notebook. For convenience, the positioning apparatus 300 can be described for such uses as a "sit-stand" positioning apparatus. Such sit-stand apparatuses can be useful in situations in which operators desire to perform operations in various postures, which may be required or desired to be performed at the same workstation. For example, one may desire to perform some operations in a seated position and other operations in a standing position. Certain embodiments of the invention provide a unique sit-stand positioning apparatus that is compatible with an existing, independent work surface (e.g., a desk top, table top, counter top, etc.) to form a sit-stand workstation. The positioning apparatus allows an operator to use the workstation at multiple heights if desired without the need for separate work surfaces at multiple heights. Accordingly, an operator does not need to move to a different workstation, but can adjust the height of the sit-stand workstation and continue using the existing work station at the new height. Further, some embodiments allow for relatively large ranges of travel while occupying a smaller footprint on a work surface where space is valuable, as described elsewhere herein.

Figure 12B:
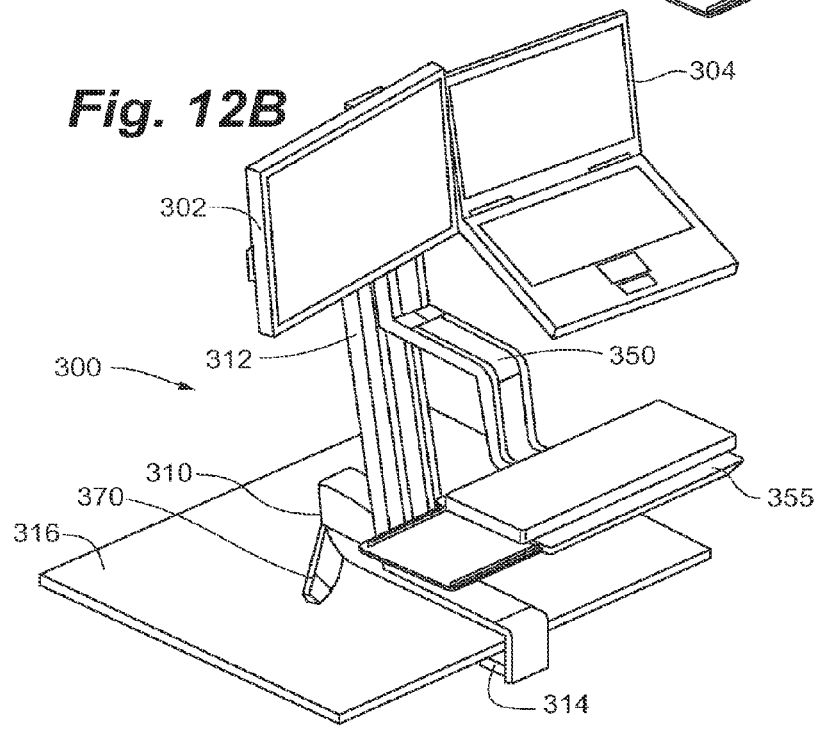

FIGS. 13A and 13B are rear perspective views of the positioning apparatus 300 in a lowered position and a raised position, respectively without the supported display and notebook. Referring to FIGS. 12A and 12B, the positioning apparatus 300 supports an electronic display in the form of a computer monitor 302, in addition to a notebook computer 304 in accordance with an embodiment of the invention. The positioning apparatus 300 includes a base 310 and a generally vertical support column 312 connected to the base 310. A movable mounting portion 350 is movably coupled to the support column 312 and attaches the monitor 302 and notebook 304 to the apparatus. In some cases the mounting portion 350 may also movably couple a keyboard tray 355 and a mouse tray to the support column 312.

Referring to FIGS. 13A and 13B, the apparatus 300 includes a crossbar 360 attached to the mounting portion 350 for mounting various equipment. For example, in some cases a monitor mount 362 (e.g., a standard VESA connector), notebook tray 364, and/or other equipment mounts are attached to the crossbar 360, allowing the mounting portion 350 to support and move the monitor, notebook, and/or other equipment. It should be appreciated, however, that a wide variety of equipment can be moved by the mounting portion 350. For example, the mounting portion 350 could be configured to support and move a combination of one or more monitors and/or notebooks or other equipment. In some cases, the mounting portion 350 is configured to support and move a combination of monitors and notebooks (e.g., two monitors and a notebook, three monitors and a notebook). In some cases, the mounting portion 350 is configured to support and move multiple monitors, such as sets of two, three, or four or more monitors. (See FIGS. 2A-2C for some examples of mounting options.)

As shown in FIGS. 12A, 12B, 13A, and 13B, the positioning apparatus 300 can provide a wide range of travel for the attached monitor and notebook. The height of the equipment (and mounting portion 350) can be set to any one of an infinite number of heights within the range of travel. FIGS. 12A and 13A illustrate positioning apparatus 300 in a low position (e.g., for sitting), while FIGS. 12B and 13B illustrate positioning apparatus 300 in a high position (e.g., for standing). To provide such adjustability for the monitor 302 and the notebook 304, the positioning apparatus 300 may in some cases include a lift mechanism similar in respects to the lift mechanism 116 described in FIGS. 14-16 herein after. FIGS. 13A and 13B illustrate lift mechanism 116 incorporated into positioning apparatus 300. As can be seen, the wheel pulley 120, as well as first and second cams 124, 126, and pulley system 130 (not shown) are positioned within the base 310. The energy storage member 144, in this case an extension spring, is positioned within the support column 312 and coupled between the support column 312 and the remaining portion of the lift mechanism.

The mounting portion 350 can itself provide some degree of adjustability between attached components. For example, as shown in FIGS. 12A, 12B, 13A, and 13B, in some cases a second lift mechanism is incorporated within or attached to the mounting portion 350 as described above with respect to FIGS. 1A and 1B. This can advantageously allow, for example, the crossbar 360 and monitor 302 and the notebook 304 to be height adjusted with respect to the keyboard tray 355 to accommodate different operators.

In the example shown in FIGS. 12A and 12B, the support column 312 is connected to the base 310 at an angle, which is useful for positioning the center of gravity of the monitor 302 and notebook 304 at a desired location with respect to the base 310 to enhance stability. In some cases, the positioning apparatus 300 is advantageously configured to be used with an existing horizontal work surface 316, such as a desk or table. For example, base 310 may include multiple stabilizing legs 370 that hold the apparatus 300 upright on the work surface 316. In some cases base 310 includes a clamp 314 useful for attaching or securing the positioning apparatus 300 to the horizontal work surface 316.

As discussed above, a positioning apparatus can include a base encompassing any structure that adequately supports the support column and the mounting portion upon a work surface. With continuing reference to FIGS. 12A-13B, the base 310 includes a first end and a second end with an elongated section extending between the first and the second ends. Portions of the elongated section are formed with a low profile, thus minimizing any obstruction caused by the base and maximizing the range of travel of the mounting portion 350. In some cases the elongated section of the base 310 is generally parallel to the mounting portion 350.

In addition, in some cases the elongated section has a width approximately the same as a width of the mounting portion frame directly above the base and the support column 312. Such a configuration can advantageously reduce the footprint of the base 1002 upon the work surface, thus leaving more room for other activities as well as reducing the visual impact of the positioning apparatus. For example, in some cases the widths of the elongated section of the base, the frame of the mounting portion, and the support column 312 are equal to or less than about 5 inches. In some cases, the widths of the elongated section, the frame of the mounting portion, and the support column 312 are equal to or less than a width of an electronic display mount (e.g., a VESA mount) attached to the mounting portion.

Referring to FIGS. 12A-13B, one exemplary method for positioning an electronic display and a keyboard involves selecting an existing generally horizontal work surface 316 and providing a positioning apparatus such as the positioning apparatus 300. In some cases the positioning apparatus has a base 310 configured to sit on the work surface 316, a support column 312 extending upward from the base 310, and a mounting portion 350 movably coupled to the support column 312 through a vertical range of travel relative to the work surface 316. The method also includes attaching the positioning apparatus 300 to the work surface 316 and supporting an electronic display 302 and a keyboard with the mounting portion 350 of the apparatus. The method also includes moving the mounting portion 350 between a sitting position (e.g., FIG. 12A) and a standing position (e.g., FIG. 12B) relative to the work surface 316.

Positioning methods also include moving the electronic display 302 simultaneously with the keyboard (e.g., on the keyboard tray 355). In addition, one exemplary method also includes moving the electronic display 302 with respect to the keyboard. An operator may also adjust an angle of the keyboard and/or the electronic display relative to the work surface 316 by, e.g., manipulating an articulating mount such as a tilt and/or rotation mechanism. Another positioning method includes attaching the positioning apparatus about one of a front edge, a back edge, and a side edge of the work surface 316.

As will be appreciated, multi-position workstations (one example being a sit-stand positioning apparatus) may be subjected to more frequent adjustment (e.g., several times in a work day) than more traditional, stationary monitor mounts. In some cases a lift mechanism is used that can increase the cycle life of the apparatus as it encounters increased articulation. An example of one such lift mechanism including a multi-cam balance mechanism is discussed in co-owned U.S. patent application Ser. No. 13/191,182, titled Cam Balance Systems and Methods, and filed Jul. 30, 2011. The entire content of the Ser. No. 13/191,182 application is hereby incorporated by reference herein in its entirety. Of course, many other types of lift mechanisms can be used as noted above. Referring now to FIGS. 14-26, an example including a lift/balance mechanism 116 incorporating the use of a dual surface cam is described.

Figure 14:
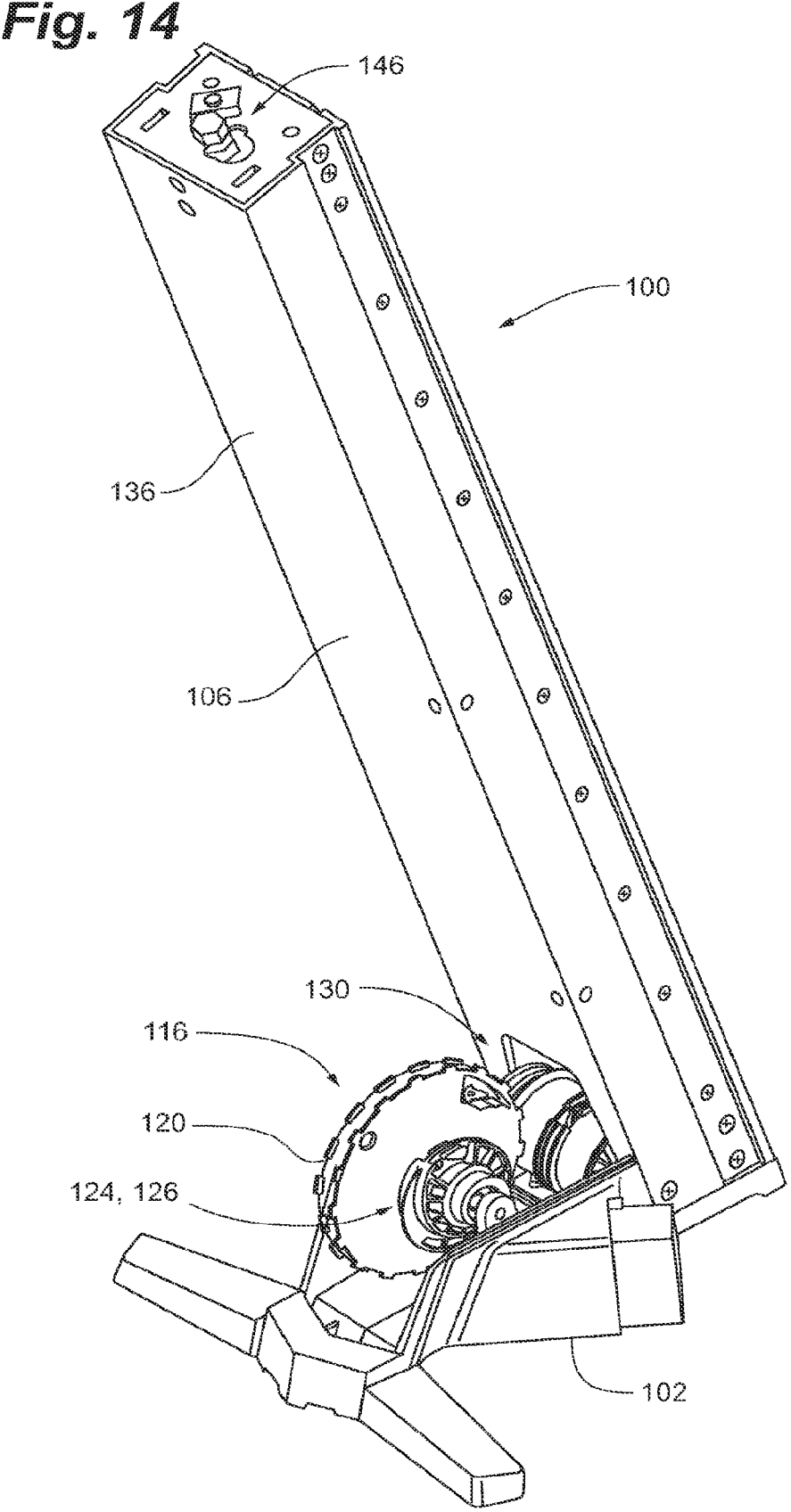
FIG. 14 is a perspective view of an apparatus.

FIG. 14 is an elevation view of one example of an apparatus 100. Apparatus 100 of FIG. 14 comprises a base 102 and a generally vertical support column 106 connected to the base 102, similar to examples described above with respect to FIGS. 1-13B. The base may include any structure for supporting the apparatus. The base may include a relatively flat horizontal surface useful for placement on a horizontal work surface or may include a clamp to clamp the apparatus to a horizontal surface or a wall bracket to attach the apparatus to a vertical wall. The support can be connected to the base by any suitable method. In some cases the support is pivotably connected to the base such that the support can pivot with respect to the base. In the example shown in FIG. 14, the support is connected to the base at an angle. The angle is useful for positioning the center of gravity of the monitor or other equipment carried by the support at a desired position with respect to the base to enhance stability.

Portions of a balance mechanism 116 can also be seen in FIG. 14. As will be described in more detail herein, the portions of the balance mechanism shown in FIG. 14 include a wheel pulley 120, a first cam 124 and a second cam 126, and a pulley system 130.

Figure 15:
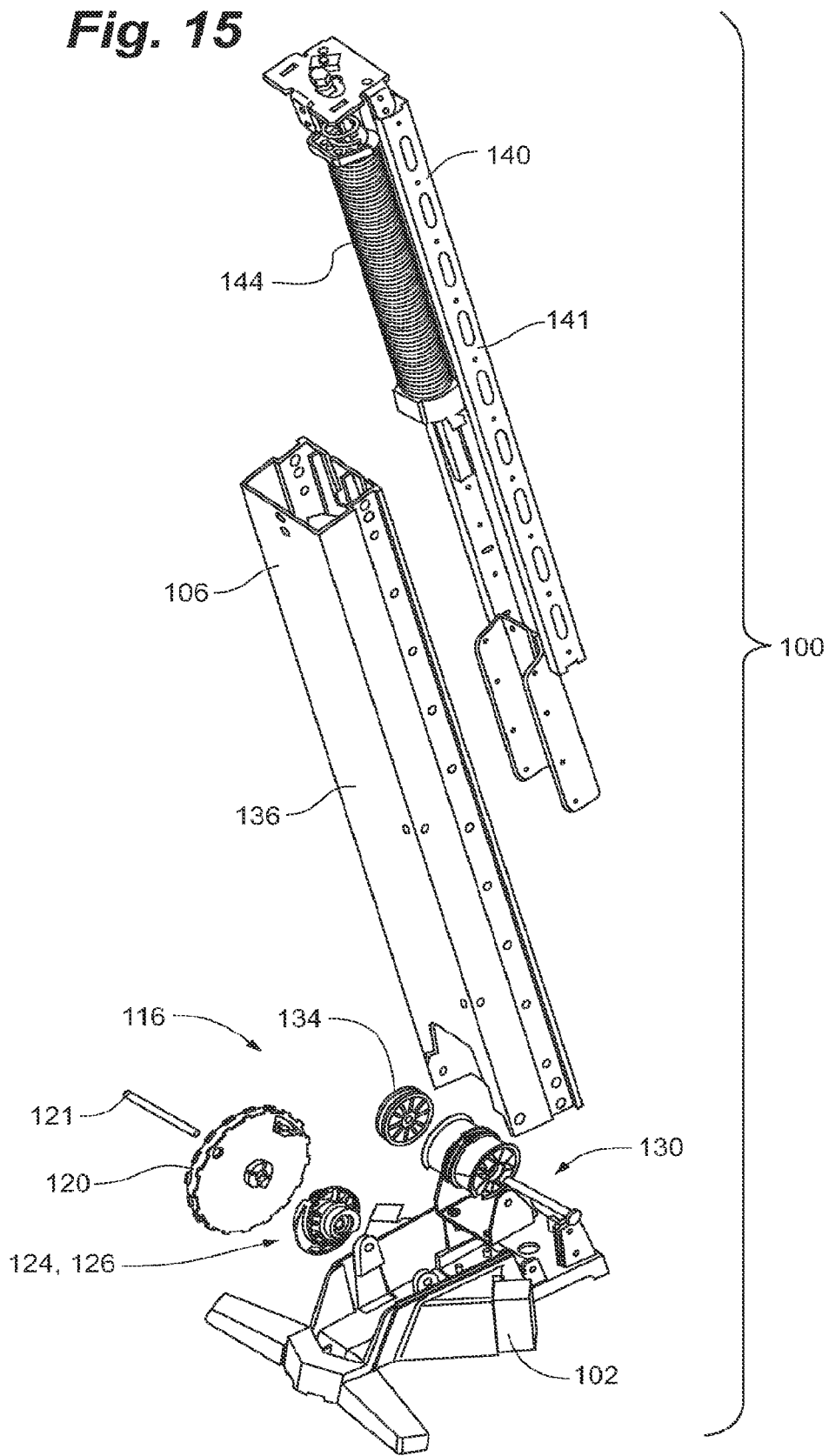
FIG. 15 is a partially exploded view of the apparatus of FIG. 14.
Figure 17:
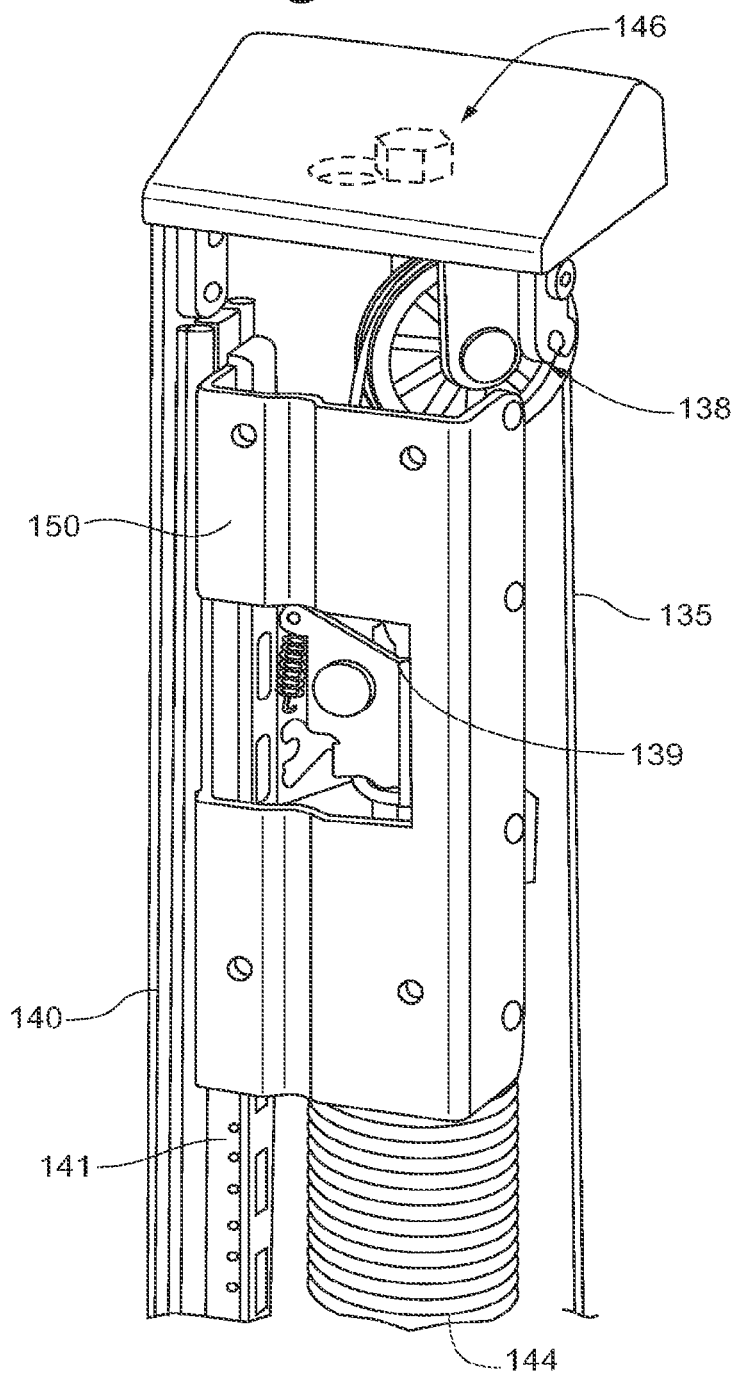
FIG. 17 is a partial elevation view of a top portion of an apparatus.

FIG. 15 is a partially exploded version of FIG. 14. In FIG. 15, it can be seen that the generally vertical support column 106 includes a first portion 136 and a second portion 140. As shown in FIG. 17, once fully assembled, a mounting portion 150 (e.g., sometimes referred to as a "truck") is coupled to the second portion 140. Mounting portion 150 and second portion 140 are disposed in sliding engagement with one another such that the mounting portion can translate with respect to second portion 140. For example, the second portion 140 may include rails 141 and the mounting portion 150 may include wheels that roll along the rails. In general, first portion 136 and second portion 140 are connected to base 102, and the movable portion 150 is connected to one or more monitors and/or other computing equipment that translate along with the mounting portion 150 with respect to first and second portions 136, 140. For example, the movable portion 150 may be coupled to or integrally include a mounting portion as discussed above with respect to FIGS. 1A and 1B. As shown in FIG. 15, an energy storage member 144 is coupled to second portion 140. The energy storage member 144 may include any device useful for storing potential energy, such as a spring (e.g., an extension spring, compression spring, torsion spring, etc.). The energy storage member may be adjustable by an energy storage member adjustment mechanism 146 (e.g., a threaded bolt with a bracket that changes the effective at rest length of the energy storage member when actuated).

The balance mechanism 116 provides a balancing force between the first and second portions of the support column and the mounting portion 150, such that an operator can position equipment attached to the mounting portion at any desired height along the range of travel having only to overcome the friction of the system. Further, because of the balancing force provided by the balance mechanism, the mounting portion will hold its set position without the operator having to engage any locks.

Figure 19B:
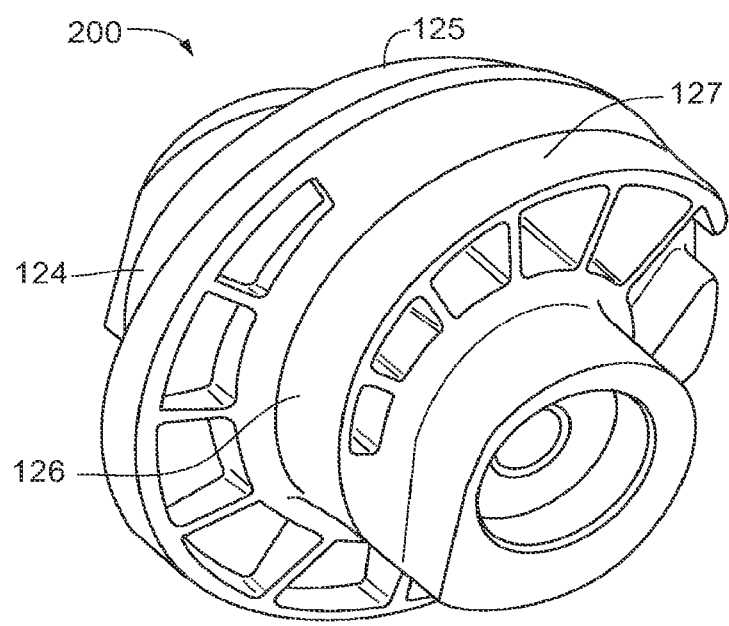
Figure 22:
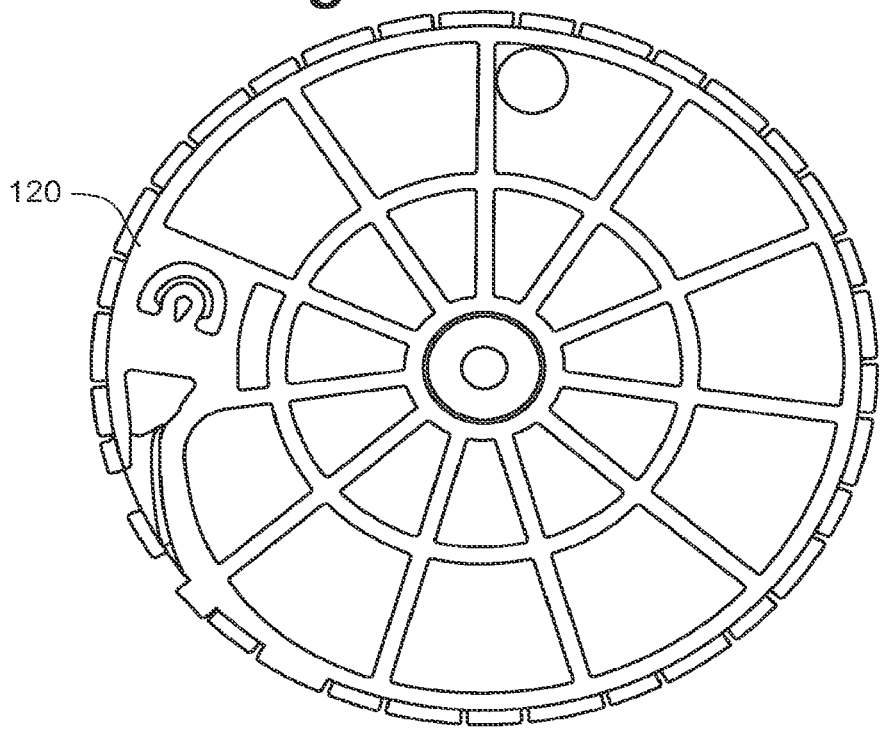
FIG. 22 is a side plan view of the wheel pulley of FIG. 21.

In the example shown in FIGS. 14 and 15, the wheel pulley 120 is coupled to first cam 124 and second cam 126, which rotate along with rotation of the wheel. As shown, first cam 124 and second cam 126 can be provided as a single integral cam member. In addition, the wheel pulley and cam member may be provided as different pieces connected directly together through axle 121. In another example, they may be integrally formed or separated by a distance when installed. In some embodiments the first and the second cams 3124, 3126 are formed using a die cast or molded polymer, such as ABS plastic or nylon. In certain embodiments the cams can be formed from machined aluminum. FIGS. 19A, 19B, and 20 provide perspective and side elevation views of a cam member including both first and second cams 124, 126. FIGS. 21 and 22 provide perspective and side elevation views of wheel pulley 120.

Figure 16A:
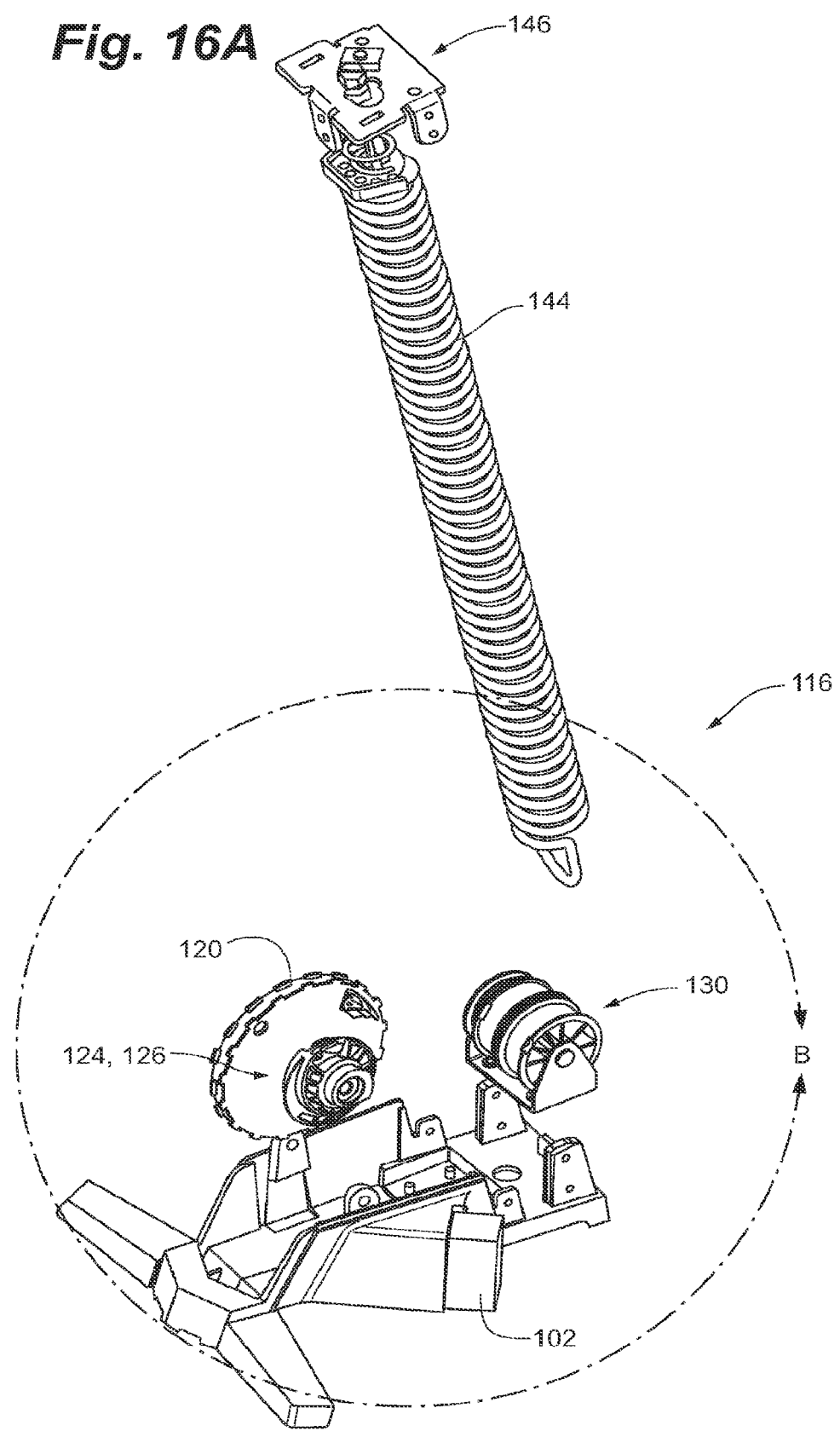
Figure 23:
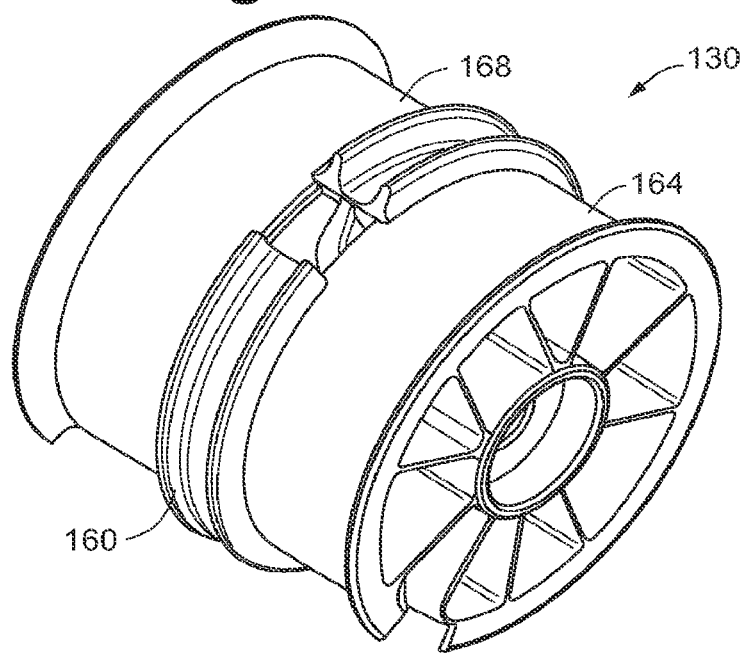
FIG. 23 is a perspective view of a pulley system.
Figure 24:
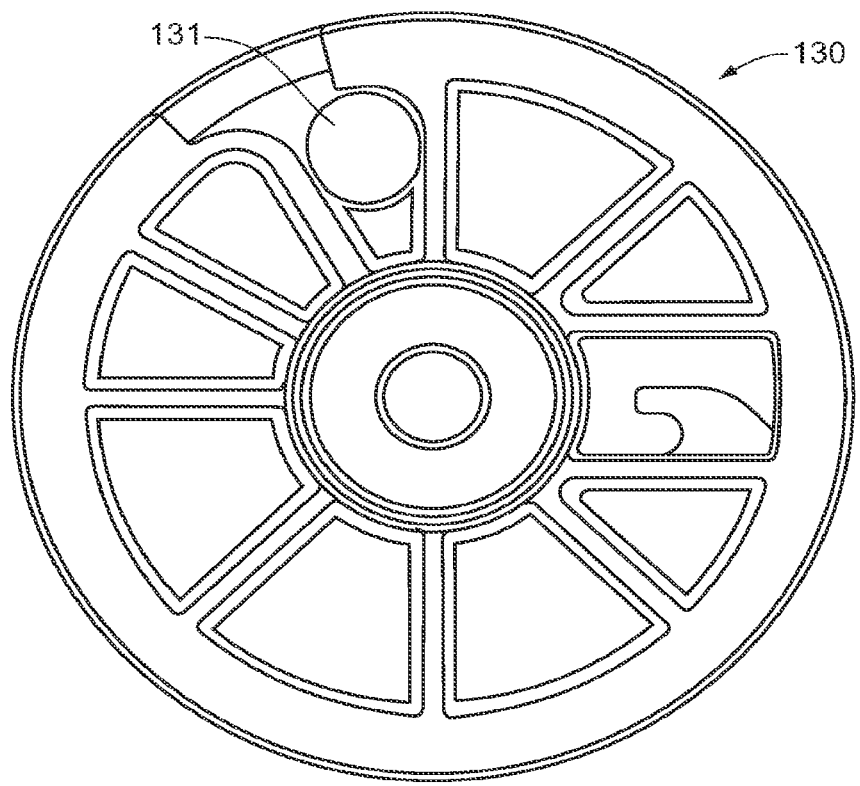
FIG. 24 is a side plan view of the pulley system of FIG. 23.

FIGS. 16A and 16B provide other perspective views of the balance mechanism 116, illustrating an arrangement of wheel pulley 120, first and second cams 124, 126, a pulley system 130, and energy storage member 144. In this case the first and second cams 124, 126 are directly coupled to the energy storage member 144 via one or more flexible elements (sometimes referred to as a tension or tensile member) that are routed around pulley system 130. The flexible element can be a rope or cable and can include any material useful for transmitting force, such as a tensile polymer. Referring to FIG. 16B, in some cases first cam 124 and second cam 126 are coupled indirectly to the energy storage member 144 via the pulley system 130. FIGS. 23 and 24 illustrate one embodiment of pulley system 130, which includes cam pulleys 164, 168, and an energy storage member pulley 160 coupled to the cam pulleys. As shown, in some cases the energy storage member pulley and the cam pulleys are provided in a single piece construction.

In some cases each of the first and second cams 124, 126 are coupled to one of the cam pulleys 164, 168 with an independent, separate flexible element, while energy storage member pulley 160 is coupled to the energy storage member 144 via a separate flexible element. Referring to FIG. 24, in some cases the pulley system 130 includes a through hole 131, through which a single flexible element 132 can be threaded and then coupled to the cams 124, 126, one at each end. Such an arrangement is illustrated in FIG. 16B. As the cams rotate and pull (or loosen) flexible element 132, the flexible element 132 engages with the cam pulleys, and is unwound from (or wound around, respectively) each of the cam pulleys.

In one case the wheel pulley 120 is coupled to the mounting portion 150 of the support with another flexible element 135 such that wheel pulley 120 rotates with respect to the base 102 as the mounting portion 150 moves with respect to the support. As shown in FIGS. 15 and 16B, an additional direction changing pulley 134 can direct the flexible element 135 between the wheel pulley 120 and the mounting portion 150. Turning to FIG. 17, the direction of flexible element 135 is again changed by upper pulley 138 and flexible element 135 is coupled to the mounting portion 150 using a hook 139 or another similar device known in the art.

FIG. 18 is a partial perspective view of a bottom portion of the apparatus 100, depicting the balance mechanism 116. As discussed above, energy storage member pulley 160 is coupled to the energy storage member 144 via a separate flexible element 161. In some cases the energy storage member 144 includes a hook 162 that allows for easily coupling the flexible element 161 to member 144. Member 144 is positioned within support column 106 such that hook 162 is generally aligned with the outer edge of pulley system 130, and specifically with energy storage member pulley 160. In the example shown, as energy storage member pulley 160 rotates, it winds or unwinds the flexible element 161, allowing energy storage member 144 to contract and extend. Accordingly, the force or weight of mounting portion 150 of the support, as well as any equipment coupled thereto, can be offset and balanced by the energy storage member, through the transmission and redirection of force through the flexible elements, pulleys, and cams to energy storage member 144.

FIGS. 19A and 19B provide perspective views, and FIG. 19C is a side view of a cam member 200 incorporating first and second cams 124, 126. As shown, first cam 124 and second cam 126 can be incorporated into the single integral cam member 200 in some cases, though this is not a requirement and the invention is not intended to be limited to this example. In some useful embodiments, the first and the second cams are cooperatively shaped and positioned to balance a force exerted on wheel 120 by the mounting portion 150 with forces exerted by the energy storage member 144 on the cams 124, 126. For example, the cams may be shaped and positioned so that a varying torque applied to the cams by flexible element 132 (via the varying linear force that the energy storage member exerts) is converted to a substantially constant torque applied to wheel 120. The wheel 120 then relays the constant torque to the flexible element 135, creating a constant linear force for lifting the mounting portion 150 relative to the support column 106. The opposite effect takes place as the mounting portion 150 is lowered, with the balance mechanism 116 creating a substantially constant resistance against downward movement of the mounting portion.

Also, in some cases the effective radius of each cam member may vary as a function of the displacement of an energy storage member of the balance mechanism. In some cases the two cams 124, 126 are mirror images of each other, and have the same profile of radius variation as a function of rotation. As shown in FIG. 6B, the cams 124, 126 each include a camming surface 125, 127 upon which the flexible elements wind. Cams 124, 126 are each designed to balance half of the weight of the mounting portion 150 and any attached equipment, which can decrease stress and fatigue on the flexible elements and increase the life of the apparatus.

In use, when an operator desires to change the position of a monitor or other device supported by a positioning apparatus, the operator can apply a force to the monitor and/or notebook. Movement of the monitor causes the mounting portion of the support, to which it is attached, to also move relative to the support column 312 of the apparatus. FIG. 25 is a perspective view of a portion of the balance mechanism 116 in a state corresponding to the low position of mounting portion 350, while FIG. 26 is a perspective view of a portion of balance mechanism 116 in a state corresponding to the high position of mounting portion 350. As is shown, the mounting portion 350 is attached to the wheel pulley 120 via flexible element 135, so that movement of the monitor/notebook causes the wheel 120 to turn about its axis. The first and second cams 124, 126, which are attached to the wheel 120, also rotate and cause the cam pulleys 164, 168 and energy storage member pulley 160 to rotate about their respective axes (which in this case are the same axis). Rotation of the energy storage member pulley member 160 pulls or loosens flexible element 161, causing the energy storage member 144 to contract or allowing the member to expand in length. Since the shape of the cams 124, 126 are designed to accommodate a changing energy storage member force (e.g., based on spring length), the operator only need apply a relatively constant force to overcome friction to move the monitor to any desired position, and the monitor will stay in the desired position without having to lock it into that position.

Thus, embodiments of the invention are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit and scope of the invention.

What is claimed is:

1. An apparatus for positioning an electronic device relative to a support member, the apparatus comprising:
    a horizontal planar work surface sized and shaped to support the electronic device resting on the work surface, wherein the electronic device is unattached to the work surface, and wherein the electronic device is distinct from the work surface;
    an attachment member removably coupleable to an edge of the support member;
    a bracket and a moveable support column, the bracket coupled between the attachment member and the support column, the support column slidably coupled to the bracket to allow the support column to move in an ascending and descending range of travel along a linear, vertical path, the support column having a top portion and a bottom portion, the top portion engaged to the work surface, and an energy storage member positioned within the support column, the energy storage member configured to provide a biasing force to assist an operator in adjusting a height of the work surface along the range of travel.

2. The apparatus of claim 1, further comprising:

a lift mechanism including a cam having a cam housing engaged to the support column to slidably couple to the bracket, the lift mechanism configured to move the support column through the range of travel.

3. The apparatus of claim 2, wherein the cam housing is fixedly attached proximate a top surface of the support member.

4. The apparatus of claim 2, wherein the cam housing is fixedly attached proximate a bottom surface of the support member.

5. The apparatus of claim 1, wherein the work surface is configured to extend over the support member.

6. The apparatus of claim 1, wherein the support member is supported by a wall.

7. The apparatus of claim 1, wherein the support member is incorporated into a table.

8. The apparatus of claim 1, wherein the support column has a first end and second end, wherein the first end of the support column extends above the support member when the support column is at an uppermost height along the range of travel, and wherein the second end of the support column extends below the support member when the support column is at a lowermost height along the range of travel.

9. The apparatus of claim 1, wherein the support column has a first end and second end, wherein the first end of the support column remains level with or above a surface of the support member and the second end remains below the surface of the support member as the support column moves throughout the range of travel.

10. The apparatus of claim 9, wherein the surface of the support member is a top surface of the support member.

11. The apparatus of claim 1, comprising:

at least one of rollers or slides to slidably couple the support column to the bracket.

12. An apparatus for positioning an electronic device relative to a support member, the apparatus comprising:

a horizontal planar work surface sized and shaped to support the electronic device resting on the work surface, wherein the electronic device is unattached to the work surface, and wherein the electronic device is distinct from the work surface;

an attachment member removably coupleable to an edge of the support member;

a bracket and a moveable support column, the bracket coupled between the attachment member and the support column, the support column slidably coupled to the bracket to allow the support column to move in an ascending and descending range of travel along a linear, vertical path, the support column having a top portion and a bottom portion, the top portion engaged to the work surface; and an energy storage member positioned within the support column, the energy storage member configured to provide a biasing force to assist an operator in adjusting a height of the work surface along the range of travel, wherein the support member is incorporated into a table.

13. The apparatus of claim 12, wherein the support column has a first end and second end, wherein the first end of the support column extends above the support member when the support column is at an uppermost height along the range of travel, and wherein the second end of the support column extends below the support member when the support column is at a lowermost height along the range of travel.

14. The apparatus of claim 12, wherein the support column has a first end and second end, wherein the first end of the support column remains level with or above a surface of the support member and the second end remains below the surface of the support member as the support column moves throughout the range of travel.

15. The apparatus of claim 12, wherein the surface of the support member is a top surface of the support member.

16. The apparatus of claim 12, comprising:

at least one of rollers or slides to slidably couple the support column to the bracket.

17. An apparatus for positioning an electronic device relative to a support member, the apparatus comprising:

a horizontal planar work surface sized and shaped to support the electronic device resting on the work surface, wherein the electronic device is unattached to the work surface, and wherein the electronic device is distinct from the work surface;

an attachment member removably coupleable to an edge of the support member;

a bracket and a moveable support column, the bracket coupled between the attachment member and the support column, the support column having a top portion and a bottom portion, the top portion engaged to the work surface;

a lift mechanism including a cam having a cam housing engaged to the support column, the lift mechanism slidably coupled to the bracket and allow the support column to move in an ascending and descending range of travel along a linear, vertical path, the lift mechanism configured to move the support column through the range of travel; and an energy storage member positioned within the support column, the energy storage member configured to provide a biasing force to assist an operator in adjusting a height of the work surface along the range of travel.

* * * * *

UNITED STATES PATENT AND TRADEMARK OFFICE
CERTIFICATE OF CORRECTION

PATENT NO. : 9,743,757 B2  
APPLICATION NO. : 14/685201  
DATED : August 29, 2017  
INVENTOR(S) : Ergun et al.

Page 1 of 2

It is certified that error appears in the above-identified patent and that said Letters Patent is hereby corrected as shown below:

On the Title Page

On page 4, in Column 1, under "Other Publications", Line 1, delete "Neo-Fiex" and insert --Neo-Flex-- therefor On page 4, in Column 1, under "Other Publications", Line 63, delete "Nov. 11," and insert --Nov. 6,-- therefor On page 6, in Column 1, under "Other Publications", Line 1, delete "1"U.S." and insert --"U.S.-- therefor In the Drawings Sheet 9 of 43, Fig. 12A, reference numeral 804, delete "804" and insert --304-- therefor In the Specification In Column 4, Line 65, delete "FIG." and insert --FIGS.-- therefor In Column 9, Line 7, delete "FIG." and insert --FIGS.-- therefor In Column 14, Line 11, delete "2050" and insert --2150-- therefor In Column 16, Line 18, delete "2584" and insert --2586-- therefor In Column 16, Line 52, delete "(FIG." and insert --(FIGS.-- therefor In Column 16, Line 57, delete "apparatus 2602" and insert --system 2600-- therefor In Column 16, Line 58, delete "2600" and insert --2602-- therefor Signed and Sealed this  
Eighteenth Day of June, 2019

Andrei Iancu  
*Director of the United States Patent and Trademark Office*

CERTIFICATE OF CORRECTION (continued)
U.S. Pat. No. 9,743,757 B2

In Column 16, Line 63, delete "2025" and insert --2625-- therefor

In Column 17, Line 20, delete "2626." and insert --2623.-- therefor

In Column 21, Line 39, delete "100" and insert --1000-- therefor

In Column 28, Line 33, delete "leg" and insert --bracket-- therefor

In Column 28, Line 36, delete "leg" and insert --bracket-- therefor

In the Claims

In Column 35, Line 2, in Claim 1, delete "surface," and insert --surface;-- therefor